US012801400B2

(12) United States Patent
Plaisted et al.

(10) Patent No.: US 12,801,400 B2
(45) Date of Patent: Nov. 17, 2026

(54) MANAGING DATA CENTER ORCHESTRATION USING SERVICE PLANS AND MANIFESTS

(71) Applicant: Oracle International Corporation, Redwood Shores, CA (US)

(72) Inventors: Rachel Ruthann Plaisted, Bellevue, WA (US); William Thomas Price, Weston-Super-Mare (GB); Owen Christopher Cliffe, Bath (GB); Ioana Madalina Patrichi, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 171 days.

(21) Appl. No.: 18/661,401

(22) Filed: May 10, 2024

(65) Prior Publication Data

US 2024/0385850 A1 Nov. 21, 2024

Related U.S. Application Data

(60) Provisional application No. 63/503,145, filed on May 18, 2023.

(51) Int. Cl.
*G06F 9/4401* (2018.01)
*G06F 9/50* (2006.01)

(52) U.S. Cl.
CPC .......... *G06F 9/4416* (2013.01); *G06F 9/4401* (2013.01); *G06F 9/5038* (2013.01); *G06F 9/5072* (2013.01)

(58) Field of Classification Search
None
See application file for complete search history.

(56) References Cited

U.S. PATENT DOCUMENTS

| | | | |
|---|---|---|---|
| 6,289,382 | B1 | 9/2001 | Bowman-Amuah |
| 6,759,836 | B1 | 7/2004 | Black, Jr. |

(Continued)

FOREIGN PATENT DOCUMENTS

| | | | |
|---|---|---|---|
| CN | 114091725 | A | 2/2022 |
| CN | 118312629 | A | 7/2024 |

(Continued)

OTHER PUBLICATIONS

International Application No. PCT/US2024/028744, International Search Report and Written Opinion mailed on Jul. 23, 2024, 16 pages.

(Continued)

*Primary Examiner* — Fahmida Rahman
(74) *Attorney, Agent, or Firm* — Kilpatrick Townsend & Stockton LLP

(57) ABSTRACT

A cloud infrastructure orchestration service (CIOS) may be used to create a service plan and manifest (SPAM) that defines a deterministic order of releases for bootstrapping a service (e.g., provisioning and deploying resources of the service) to a cloud computing environment (e.g., to a data center). A corresponding manifest may be used to identify the configuration files and artifacts to be. The manifest may be used to validate the service plan. The CIOS may be configured to validate the SPAM. If compatible, the SPAM may be added to a SPAM set. A SPAM set (a collection of SPAMs corresponding to respective services) may be used to derive a version set (identifying configuration file and artifact versions) with which a directed acyclic graph may be generated. CIOS may bootstrap various services within the data center based at least in part on traversing the directed acyclic graph.

19 Claims, 22 Drawing Sheets

1700

(56) References Cited

U.S. PATENT DOCUMENTS

| | | | |
|---|---|---|---|
| 9,876,703 B1 | 1/2018 | Arllen et al. | |
| 10,511,675 B1 | 12/2019 | Chud | |
| 11,321,137 B2 | 5/2022 | Barsalou et al. | |
| 11,379,353 B1 | 7/2022 | Marchetti et al. | |
| 11,558,245 B1 | 1/2023 | Kreger-Stickles et al. | |
| 11,574,316 B1 * | 2/2023 | Hoskins | G06Q 30/0609 |
| 11,593,251 B2 | 2/2023 | Chirkin et al. | |
| 11,604,672 B2 | 3/2023 | Subramanian et al. | |
| 12,208,521 B1 * | 1/2025 | Puranic | B25J 9/161 |
| 2005/0198331 A1 | 9/2005 | Okajima et al. | |
| 2010/0106678 A1 | 4/2010 | Pietrek et al. | |
| 2014/0280595 A1 | 9/2014 | Mani et al. | |
| 2015/0372938 A1 | 12/2015 | Patel et al. | |
| 2017/0228227 A1 * | 8/2017 | Winterfeldt | G06F 9/5066 |
| 2018/0203736 A1 | 7/2018 | Vyas et al. | |
| 2019/0114335 A1 | 4/2019 | Koenig et al. | |
| 2020/0004569 A1 | 1/2020 | Gupta et al. | |
| 2020/0244527 A1 | 7/2020 | Sharma et al. | |
| 2020/0244545 A1 | 7/2020 | Chaganti et al. | |
| 2021/0224076 A1 | 7/2021 | Dockter et al. | |
| 2021/0224122 A1 * | 7/2021 | Glass | G06F 11/327 |
| 2021/0224132 A1 | 7/2021 | Barsalou | |
| 2021/0382725 A1 | 12/2021 | Vemula et al. | |
| 2022/0210005 A1 | 6/2022 | Keane et al. | |
| 2022/0353133 A1 | 11/2022 | Shrestha et al. | |
| 2022/0365835 A1 | 11/2022 | Kandasamy et al. | |
| 2022/0398078 A1 | 12/2022 | Segler | |
| 2023/0011628 A1 | 1/2023 | Hurley et al. | |
| 2023/0014635 A1 | 1/2023 | Gross | |
| 2023/0105901 A1 | 4/2023 | Adogla et al. | |
| 2023/0108661 A1 | 4/2023 | Adogla et al. | |
| 2023/0133380 A1 | 5/2023 | Kreger-Stickles et al. | |
| 2023/0367654 A1 | 11/2023 | Kurian et al. | |
| 2024/0330069 A1 | 10/2024 | Atur et al. | |
| 2024/0345830 A1 * | 10/2024 | Vergara | G06F 8/71 |

FOREIGN PATENT DOCUMENTS

| | | |
|---|---|---|
| WO | 2021150306 A1 | 7/2021 |
| WO | 2021150366 A1 | 7/2021 |
| WO | 2021150435 A1 | 7/2021 |
| WO | 2022104395 A1 | 5/2022 |

OTHER PUBLICATIONS

International Application No. PCT/US2024/028788, International Search Report and Written Opinion mailed on Jul. 23, 2024, 16 pages.

U.S. Appl. No. 18/498,964, Non-Final Office Action mailed on Jul. 29, 2025, 23 pages.

U.S. Appl. No. 18/537,902, Non-Final Office Action, mailed on May 20, 2025, 10 pages.

"Developing System Services in Oracle Solaris 11.3", Oracle, Available Online at: https://docs.oracle.com/cd/E53394_01/pdf/E60814.pdf, Sep. 1, 2018, 76 pages.

Girola et al., "IBM Data Center Networking; Planning for Virtualization and Cloud Computing", Redbooks, May 9, 2011, 258 pages.

International Application No. PCT/US2024/028767, "International Search Report and Written Opinion", mailed Sep. 10, 2024, 13 pages.

International Application No. PCT/US2024/029210, "International Search Report and Written Opinion", mailed Sep. 16, 2024, 12 pages.

International Application No. PCT/US2024/029279, "International Search Report and Written Opinion", mailed Sep. 16, 2024, 12 pages.

International Application No. PCT/US2024/029417, "International Search Report and Written Opinion", mailed Sep. 16, 2024, 12 pages.

International Application No. PCT/US2024/030201, "International Search Report and Written Opinion", mailed Sep. 16, 2024, 12 pages.

International Application No. PCT/US2024/030208, "International Search Report and Written Opinion", mailed Sep. 16, 2024, 13 pages.

International Application No. PCT/US2024/030212, "International Search Report and Written Opinion", mailed Sep. 16, 2024, 12 pages.

U.S. Appl. No. 18/658,638, "Non-Final Office Action", mailed on Jul. 15, 2026, 11 pages.

U.S. Appl. No. 18/661,396, "Non-Final Office Action", mailed on Jul. 21, 2026, 13 pages.

* cited by examiner

600

```
BuildMilestones:
    Name: absent
    Description: This represents the starting point of building the service
    CapabilityPublications: []

    Name: service-partial
    Description: Service is partially up, supporting namespace creation.
    CapabilityPublications: [serviceA_namespace]

    Name: service-available
    Description: The service is available and its resources can be consumed
    CapabilityPublications: [serviceA_backend]

    Name: complete
    Description: All service onboarding is complete, can be marked as production
    CapabilityPublications: []
```

602, 604, 606, 608

*FIG. 6*

700

```
ExecutionUnits:
    From: absent
    To: service-partial
    ExternalCapabilityDependencies: [certificate_service_ready, capability_service_ready]  ← 705
    CapabilityPublications: [core_instance, dep_service_pool, dep_service_application, dep_service_deployment]  ← 707
    Steps:
      InfraAppPair:
          Infra:
            { ETAlias: flock_DP/phase_DP/alarms_et, Transition: absent→DP_complete_alarms_infra}
            { ETAlias: flock_DP/phase_DP/region_et, Transition: absent→DP_initial_region_infra}
          App:
            { ETAlias: flock_DP/phase_DP/alarms_et, Transition: absent→DP_complete_alarms_app}
            { ETAlias: flock_DP/phase_DP/region_et, Transition: absent→DP_initial_region_app}

    From: service-partial
    To: service-available
    ExternalCapabilityDependencies: [core_instance, dep_service_pool, dep_service_application, dep_service_deployment]
    Steps:  ← 710
       Serial:
           InfraAppPair:
               Infra:
                 { ETAlias: flock_CP/phase_CP/region_et, Transition: absent→CP_complete_region_infra}
               App:
                 { ETAlias: flock_CP/phase_CP/region_et, Transition: absent→CP_complete_region_app}
           InfraAppPair:
               Infra:
                 { ETAlias: flock_DP/phase_DP/alarms_et, Transition: DP_complete_alarms_infra→DP_complete_alarms_infra}
                 { ETAlias: flock_DP/phase_DP/region_et, Transition: DP_initial_region_infra→DP_complete_region_infra}
               App:
                 { ETAlias: flock_DP/phase_DP/alarms_et, Transition: DP_complete_alarms_app→DP_complete_alarms_app }
                 { ETAlias: flock_DP/phase_DP/region_et, Transition: DP_initial_region_app→DP_complete_region_app }
    ⋮
```

702 (first block), 706 (steps of first block), 704 (second block), 708 (steps of second block)

*FIG. 7*

MANAGING DATA CENTER ORCHESTRATION USING SERVICE PLANS AND MANIFESTS

CROSS-REFERENCE TO RELATED APPLICATIONS

This non-provisional application claims priority to U.S. Provisional Patent Application No. 63/503,145, filed on May 18, 2023, entitled “Region Build Orchestration using Skills and Capabilities,” the disclosure of which is herein incorporated by reference in its entirety for all purposes.

BACKGROUND

Today, cloud infrastructure services utilize many individual services to build a data center (e.g., to bootstrap various resources in a data center of a particular geographic region). A region is a logical abstraction corresponding to a localized geographical area in which one or more data centers are (or are to be) located. Building a data center (also referred to performing a “region build”) may include provisioning and configuring infrastructure resources and deploying code to those resources (e.g., to implement a variety of services). Any suitable number of data centers may be included in a region and therefore a region build may include operations for building multiple data centers. Bootstrapping operations for one service may depend on the availability of other functionality and/or services of the region. As the number of service teams and regions grows, the tasks performed for orchestrating provisioning and deployment drastically increase. Conventional tools for building a region require significant manual effort or automated techniques present drawbacks with respect to overhead, accuracy, and case of use. Improvements can be made.

BRIEF SUMMARY

Embodiments of the present disclosure relate to techniques for building a data center. Previous implementations had no centralized description from which to derive the operations needed to build a service. Instead, service build information was distributed across a myriad of configuration files. Current implementations lack a specification for how a service is built and include implementation details only. This leads to a lack of understanding of service builds and greatly increases the efforts required to unblock issues during a data center build. The present disclosure is directed to the use of service plans and manifests to generate or validate directed acyclic graphs with which orchestration operations are carried out. A service plan refers to a description of how to build a service in a data center. A “service manifest” details which configuration files (e.g., “flocks”) and artifacts (e.g., software) are to be utilized to build the service.

At least one embodiment is directed to a computer-implemented method (the “method,” for brevity). The method may comprise obtaining, by a cloud infrastructure orchestration system, a service plan defining a first order for executing one or more releases as part of a first process for bootstrapping a service within a cloud-computing environment. The method may comprise obtaining, by the cloud infrastructure orchestration service, a manifest identifying a configuration file that defines operations associated with executing a release of the one or more releases. The method may comprise generating, by the cloud infrastructure orchestration service, a directed acyclic graph based at least in part on a plurality of service plans comprising the service plan. The directed acyclic graph may define a second order for executing a set of releases comprising the release. The set of releases may be associated with a second process for bootstrapping the plurality of services within the cloud-computing environment. The method may comprise executing, by the cloud infrastructure orchestration service, a subset of releases of the set of releases associated with the second process for bootstrapping the plurality of services within the cloud-computing environment. In some embodiments, the subset of releases may be executed according to the second order based at least in part on traversing the directed acyclic graph.

The method may comprise validating, by the cloud infrastructure orchestration service, the service plan based at least in part on the manifest. In some embodiments, validating the service plan based at least in part on the manifest further comprises one or more of: 1) obtaining, by the cloud infrastructure orchestration service, static flock analysis data corresponding to the configuration file identified by the manifest, the static flock analysis indicating a first set of dependencies, 2) determining, by the cloud infrastructure orchestration service, a second set of dependencies based at least in part on the service plan, and 3) determining, by the cloud infrastructure orchestration service, that the first set of dependencies agree with the second set of dependencies.

The method may further comprise determining, by the cloud infrastructure orchestration service, that the service plan is consistent based at least in part on determining that first data corresponding to a first component of the service plan matches a second data corresponding to a second component of the service plan.

The method may further comprise determining, by the cloud infrastructure orchestration service, that the plurality of service plans are compatible based at least in part on 1) generating a directed graph based at least in part on the plurality of service plans and 2) determining that the directed graph lacks cycles. In some embodiments, the method may comprise adding, by the cloud infrastructure orchestration service, the service plan to a set of service plans comprising the plurality of service plans and the service plan. In some embodiments, the service plan is added to the set of service plans based at least in part on determining that the plurality of service plans are compatible. The method may comprise deriving, by the cloud infrastructure orchestration service, a version set identifying a plurality of configuration files to be during the second process for bootstrapping the plurality of services within the cloud-computing environment. The version set may be derived based at least in part on the set of service plans.

In some embodiments, the version set comprises a plurality of version set items, a first version set item of the plurality of version set items being associated with a corresponding service plan, and a second version set item of the plurality of version set items lacking any service plan associations.

In some embodiments, the method may further comprise determining, by the cloud infrastructure orchestration service, that the plurality of service plans are compatible based at least in part on determining that no duplicate capability publications exist between the plurality of service plans.

Another embodiment is directed to a cloud-computing service comprising one or more processors and memory storing instructions that, when executed by the one or more processors, cause the cloud-computing service to perform the method(s) disclosed herein.

Still another embodiment is directed to a non-transitory computer-readable medium storing computer-executable instructions that, when executed by one or more processors of a cloud-computing service, cause the cloud-computing service to perform the method(s) disclosed herein.

BRIEF DESCRIPTION OF THE DRAWINGS

To easily identify the discussion of any particular element or act, the most significant digit or digits in a reference number refer to the figure number in which that element is first introduced.

FIG. 6 is a block diagram depicting a build milestone entity of an example service plan and manifest, in accordance with at least one embodiment.

FIG. 7 depicts an example execution unit entity of an example service plan, in accordance with at least one embodiment.

DETAILED DESCRIPTION

Figure 1:
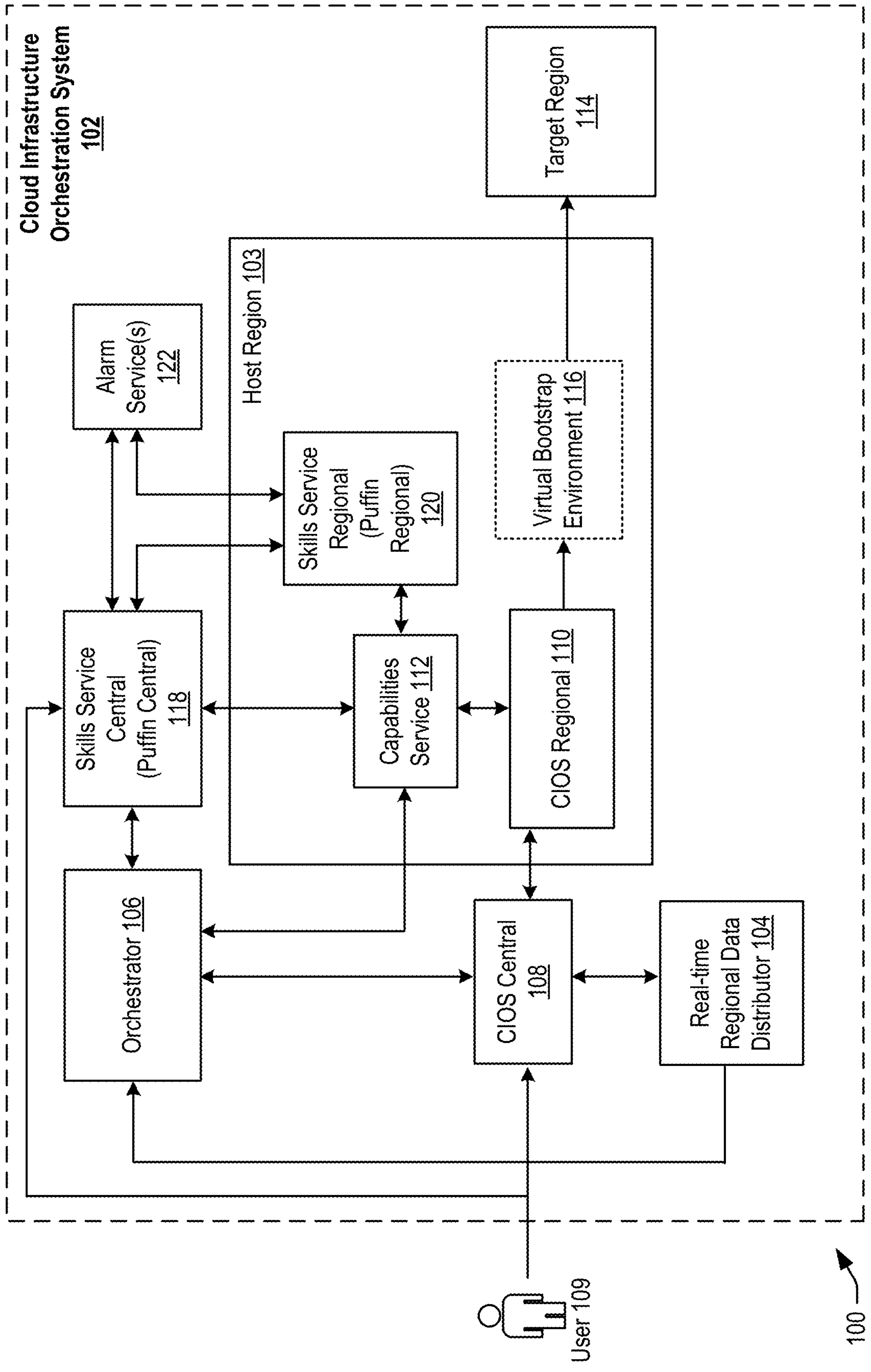
FIG. 1 is a block diagram of an environment in which a Cloud Infrastructure Orchestration System (CIOS may operate to dynamically bootstrap services in a region, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word “exemplary” is used herein to mean “serving as an example, instance, or illustration.” Any embodiment or design described herein as “exemplary” is not necessarily to be construed as preferred or advantageous over other embodiments or designs.

Example Automated Data Center Build (Region Build) Infrastructure

The adoption of cloud services has seen a rapid uptick in recent times. Various types of cloud services are now provided by various cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP’s infrastructure and which is used to provide a cloud service to a customer are separate from the customer’s own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

Data centers provided by a CSP may be hosted in different regions. A region is a localized geographic area and may be identified by a region name. Regions are generally independent of each other and can be separated by vast distances, such as across countries or even continents. Regions are grouped into realms. Examples of regions for a CSP may include US West, US East, Australia East, Australia Southeast, and the like.

A region can include one or more data centers, where the data centers are located within a certain geographic area corresponding to the region. As an example, the data centers in a region may be located in a city within that region. For example, for a particular CSP, data centers in the US West region may be located in San Jose, California; data centers in the US East region may be located in Ashburn, Virginia; data centers in the Australia East region may be located in Sydney, Australia; data centers in the Australia Southeast region may be located in Melbourne, Australia; and the like.

Data centers within a region may be organized into one or more availability domains, which are used for high availability and disaster recovery purposes. An availability domain can include one or more data centers within a region. Availability domains within a region are isolated from each other, fault tolerant, and are architected in such a way that data centers in multiple availability domains are very unlikely to fail simultaneously. For example, the availability domains within a region may be structured in a manner such that a failure at one availability domain within the region is unlikely to impact the availability of data centers in other availability domains within the same region.

When a customer or subscriber subscribes to or signs up for one or more services provided by a CSP, the CSP creates a tenancy for the customer. The tenancy is like an account that is created for the customer. In certain implementations, a tenancy for a customer exists in a single realm and can access all regions that belong to that realm. The customer's users can then access the services subscribed to by the customer under this tenancy.

As indicated above, a CSP builds or deploys data centers to provide cloud services to its customers. As a CSP's customer base grows, the CSP typically builds new data centers in new regions or increases the capacity of existing data centers to service the customers' growing demands and to better serve the customers. Preferably, a data center is built in close geographical proximity to the location of customers serviced by that data center. Geographical proximity between a data center and customers serviced by that data center lends to more efficient use of resources and faster and more reliable services being provided to the customers. Accordingly, a CSP typically builds new data centers in new regions in geographical areas that are geographically proximal to the customers serviced by the data centers. For example, for a growing customer base in Germany, a CSP may build one or more data centers in a new region in Germany.

Building a data center (or multiple data centers) in a region is sometimes also referred to as building a region. The term "region build" is used to refer to building one or more data centers in a region. Building a data center in a region involves provisioning or creating a set of new resources that are needed or used for providing a set of services that the data center is configured to provide. The end result of the region build process is the creation of a data center in a region, where the data center is capable of providing a set of services intended for that data enter and includes a set of resources that are used to provide the set of services.

Building a new data center in a region is a very complex activity requiring coordination between various service teams. At a high level, this involves the performance and coordination of various tasks such as: identifying the set of services to be provided by the data center, identifying various resources that are needed for providing the set of services, creating, provisioning, and deploying the identified resources, wiring the resources properly so that they can be used in an intended manner, and the like. Each of these tasks further have subtasks that need to be coordinated, further adding to the complexity. Due to this complexity, presently, the building of a data center in a region involves several manually initiated or manually controlled tasks that require careful manual coordination. As a result, the task of building a new region (i.e., building one or more data centers in a region) is very time consuming. It can take time, for example, many months to build a data center. Additionally, the process is very error prone, sometimes requiring several iterations before a desired configuration of the data center is achieved, which further adds to the time taken to build a data center. These limitations and problems severely limit a CSP's ability to grow in a timely manner responsive to increasing customer needs.

Bootstrapping operations have been coordinated and orchestrated by an orchestrator (e.g., a Multi-Flock Orchestrator, an orchestration service, etc.). In previous implementations, the orchestrator attempted to automatically detect dependencies between operations. The orchestrator utilized various versions of configuration files and/or software artifacts and attempted to intelligently and automatically identify the artifacts and manner in which a data center build was performed. As a data center was built, the orchestrator utilized capabilities (e.g., tags that could be toggled on or off to indicate availability of a resource or functionality) to drive these operations. However, both the automatic detection techniques and the use of capabilities included drawbacks.

Previous implementations of an orchestrator also lacked an exact plan of the work that may be needed (or is needed) to build a data center ahead of the actual build. The orchestrator utilized service build definitions that were spread across multiple flock configuration files ("flock configs") and interpreted by the orchestrator at runtime. This caused the orchestrator to execute a non-predetermined number of releases, in a non-predetermined order, each of which published a non-predetermined number of capabilities per release. To compensate for this indeterministic behavior, manually curated micro-schedules were generated and used to track the work and order of operations necessary to build the data center. These micro-schedules were not machine executable nor derived from code. Service teams were not prevented from changing their build automation which could cause the existing micro-schedules to be invalidated. Additionally, it was not possible to determine exact behavior of a service build when configuration files for that service rely on external data.

In previous implementations, tasks were triggered by publishing capabilities. Capability availability was not held constant over a release leading to non-determinism in the planned activity if any optional capabilities were published mid-release. The use of optional capabilities made it difficult to determine when a release was expected to publish a certain capability of if a resource was ever going to be created. Service teams could also introduce changes that created unsatisfiable cyclic dependencies between services causing the build to deadlock or depend upon a capability that would never be published. For at least these reasons, it was impossible to determine when dependent releases would be unblocked. Heterogeneity in different regions also meant that there was no single plan for how a service should be bootstrapped. Rather, a different plan existed for each region furthering compounding the difficulty in understanding how the service is built, as capabilities might be depended upon or published in certain types of regions and not others.

Embodiments of the present disclosure relate to the utilization of service plans and manifests (SPAMs) that individually serve as a deterministic specification for the bootstrapping process of a single service. A service plan and manifest (SPAM) provides a complete service build description that specifies the releases and the deterministic/explicit order of those releases that may be necessary (or are necessary) to build a service. The SPAM may include clear expectations for the progress expected by each transition (e.g., each release execution corresponding to a particular phase/execution target). One or more services (e.g., all services to be bootstrapped within the region) may be associated with a corresponding SPAM. Information provided by these SPAMs may be utilized to eliminate various errors that can occur in a data center build by identifying issues early in the build lifecycle (e.g., upon SPAM submission) rather than at build time. SPAMs may be composed together by an orchestrator (e.g., a Multi-Flock Orchestrator, an orchestration service, etc.) and used to form a directed acyclic graph (DAG) of work (e.g., releases) that identifies the expected order of release executions that may be needed (or in some instances, is needed) to build the data center and capability dependencies between those releases. The defined graph may be pre-validated for abnormalities such as cycles on creation and on subsequent region updates. The graph may be used to support improved error detection both prior to and during a build. The graph generated from SPAMs may be used to drive region build operations and/or it may be used to validate a different graph (e.g., one generated from flock configs as in previous implementations) that is used to drive the region build. The SPAM provides a deterministic specification of a build implementation for a given service that reduces, if not eliminates, the non-deterministic drawbacks present in previous implementations that utilized multiple flock configs to identify the releases that may be needed (or is needed) to build a service. This improves observability and understanding of the region build and reduces the time and complexity of identifying root cause when an error is experienced during region build.

Certain Definitions

A "region" is a logical abstraction corresponding to a geographical location. A region can include any suitable number of one or more execution targets.

A "phase" refers to a group of execution targets that can be execute at the same time.

An "execution target" refers to a unit of change for executing a release. An execution target may be specific to a region and a tenancy. Execution targets may be aggregated into one or more phases. For some services, an execution target represents an "instance" of a service. A single service can be bootstrapped to each of one or more execution targets. An execution target may be associated with a set of devices (e.g., a data center).

A "release" refers to a representation of an intent to orchestrate a specific change to a service (e.g., deploy version 8, "add an internal DNS record," etc.). In some embodiments, a release corresponds to an instance of infrastructure provisioning or application deployment. A release may target one or more phases or execution targets.

"Bootstrapping" is intended to refer to the collective tasks associated with provisioning and deployment of any suitable number of resources (e.g., infrastructure components, artifacts, etc.) corresponding to a single service.

A "service" refers to functionality provided by a set of resources. A set of resources for a service includes any suitable combination of infrastructure, platform, or software (e.g., an application) hosted by a cloud provider that can be configured to provide the functionality of a service. A service can be made available to users through the Internet.

An "artifact" refers to code being deployed to an infrastructure component (e.g., a physical or virtual host) or a Kubernetes engine cluster, this may include, but is not limited to, software (e.g., an application), configuration information (e.g., a configuration file) for an infrastructure component, or the like.

A "flock configuration file" or "flock config," for brevity refers to a configuration file that describes a set of resources (e.g., infrastructure components and artifacts, also referred to as a "flock") associated with a single service. A flock config may correspond to a single release (e.g., provisioning and/or deployment tasks that are to be performed as a unit). A flock config may correspond to an infrastructure release or an application release. A service may be built using any suitable number of releases and corresponding flock configs. A flock config may include declarative statements that specify one or more aspects corresponding to a desired state of the resources of the service for that release.

A "flock" refers to a set of CIOS managed resources or a set of execution targets that can be deployed as a unit. A flock may exist within an organizational unit referred to as a "project."

"Service state" refers to a point-in-time snapshot of every resource (e.g., infrastructure resources, artifacts, etc.) associated with the service. The service state indicates status corresponding to provisioning and/or deployment tasks associated with service resources.

IaaS provisioning (or "provisioning") refers to acquiring computers or virtual hosts for use, and even installing needed libraries or services on them. The phrase "provisioning a device" refers to evolving a device to a state in which it can be utilized by an end-user for their specific use. A device that has undergone the provisioning process may be referred to as a "provisioned device." Preparing the provisioned device (installing libraries and daemons) may be part of provisioning; this preparation is different from deploying new applications or new versions of an application onto the prepared device. In most cases, deployment does not include provisioning, and the provisioning may need to be performed first. Once prepared, the device may be referred to as "an infrastructure component."

IaaS deployment (or "deployment") refers to the process of providing and/or installing a new application, or a new version of an application, onto a provisioned infrastructure component. Once the infrastructure component has been provisioned (e.g., acquired, assigned, prepared, etc.), additional software may be deployed (e.g., provided to and installed on the infrastructure component). The infrastructure component can be referred to as a "resource" after provisioning and deployment has concluded. Examples of resources may include, but are not limited to, virtual machines, databases, object storage, block storage, load balancers, and the like.

A "virtual bootstrap environment" (ViBE) refers to a virtual cloud network that is provisioned in the overlay of an existing region (e.g., a "host region"). Once provisioned, a ViBE is connected to a new region using a communication channel (e.g., an IPsec Tunnel VPN). Certain essential core services (or "seed" services) like a deployment orchestrator, a public key infrastructure (PKI) service, and the like can be provisioned in a ViBE. These services can provide the capabilities required to bring the hardware online, establish a chain of trust to the new region, and deploy the remaining services in the new region. Utilizing the virtual bootstrap environment can prevent circular dependencies between bootstrapping resources by utilizing resources of the host region. Services can be staged and tested in the ViBE prior to the physical region (e.g., the target region) being available.

A "Cloud Infrastructure Orchestration Service" (CIOS) may refer to a system configured to manage provisioning and deployment operations for any suitable number of services as part of a region build.

A "host region" refers to a region that hosts a virtual bootstrap environment (ViBE). A host region may be used to bootstrap a ViBE.

A "target region" refers to a region under build.

A "capability" identifies is a resource used during region build that signals that another resource, service, or feature is available, or that an event has occurred. By way of example, a capability can be published indicating that a resource is available for authorization/authentication processing (e.g., a subset of the functionality to be provided by a service). As another example, a capability can be published indicating the full functionality of the service is available. Capabilities may be used to identify functionality on which a resource or service depends and/or functionality of a resource or service that is available for use. A capability may be associated with an alphanumeric identifier and may be used to indicate the capability is available or unavailable.

"Publishing a capability" refers to "publishing" as used in a "publisher-subscriber" computing design or otherwise providing an indication that a particular capability is available (or unavailable). The capabilities are "published" (e.g., collected by a Capabilities Service, provided to a Capabilities Service, pushed, pulled, etc.) to provide an indication that functionality of a resource/service is available or that an event has occurred. In some embodiments, capabilities may be published/transmitted via an event, a notification, a data transmission, a function call, an API call, or the like. An event (or other notification/data transmission/etc.) indicating availability of a particular capability can be broadcasted/addressed (e.g., published) to a Capabilities Service.

A "Capabilities Service" may be a service configured to monitor and maintain capabilities data that indicates which capabilities are current available in a region. A Capabilities Service may be provided within a Cloud Infrastructure Orchestration System and may be used to identify what capabilities, services, features have been made available in a region, or which events have occurred within the region. The described Capabilities Service may service as a central repository/authority of all capabilities that have been published in the region (e.g., during a region build).

An "Orchestrator" is intended to refer to a service or system that initiates tasks involved in bootstrapping one or more services during a region build. A Multi-Flock Orchestrator (MFO), an example of an orchestrator, may be a computing component (e.g., a service) configured to coordinate events between components of the CIOS to provision and deploy services to a target region (e.g., a new region). An orchestrator may track relevant events (e.g., indicated through capabilities and/or skills as described herein) for each service of the region build and takes actions in response to those events (e.g., based on determining upstream dependencies have been met for a given release/skill, etc.).

A "Real-time Regional Data Distributor" (RRDD) may be a service or system configured to manage region data. This region data can be injected into flock configs to dynamically create execution targets for new regions.

A "Telemetry Service" may be a service or system that is configured to manage/monitor time series data associated with one or more services/resources and trigger (e.g., publish, store, etc.) various alarms and/or corresponding alarm states based at least in part on analyzing the time series data.

A "Skills Service" (also referred to as "Puffin") may be a service or system that is configured to store planned and/or actual dependency relationships between services, resources, or units of functionality (also referred to as "service functionality"). It should be appreciated that the unit of functionality may relate to functionality provided by a computing component other than a service.

A "skill" may represent a functional unit that a service exposes and offers to consumers (e.g., other services). This functional unit (also referred to as "service functionality") can include all or a subset of the total functionality associated with a service. In some embodiments, skills may be scoped where access is controlled based on access and/or authorization policies and/or based on an association with a particular namespace. A skill may be provided in multiple versions in which one or more aspects of the skill differs from other versions, where each skill version represents a specific implementation of the skill. Each skill version may be identifiable using a unique skill identifier. Skills are intended to replace (some or all) capabilities and enable enhanced and more accurate progress tracking of a region build as well as improved root cause analysis functionality when errors or unexpected events occur in the build. In some embodiments, a skill may be associated with one or more previously defined capabilities to provide backward compatibility with previous capabilities-based region build implementations. A skill may be monitored for health and may be configured to maintain health data. A "skill" may collectively refer to any suitable number of data structures (e.g., the skill metadata 404 of FIG. 4) in which data defining the skill may be maintained.

A "fleet" refers to a logical environment (e.g., preproduction, production, etc.) to which a skill can be scoped. By way of example, a skill associated with a production fleet may be separate from a skill of the same name utilized with a preproduction fleet. A "project" may be similarly utilized to scope skills. In some embodiments, a skill may be scoped/applied to a particular environment based at least in part on any suitable combination of attributes such as skillID, skillversionID, compartmentID, namespaceID, producerServiceID, skillName, fleet, project, or the like, that collectively identify a particular application of a skill.

A "service plan specification" or "service plan," for brevity, refers to a specification for a build implementation of a service. A service plan may include any suitable combination of build milestones, execution units, and flock configurations. A service plan details specific releases that may be needed (or that are needed) to build a service and the order by which the releases are to be performed to build the service. A service plan may separate inter-service coordination and intra-service coordination. A service plan may specify the expected state of a service at any suitable point of a region build.

A "service manifest" or "manifest," for brevity, identifies the versions for flock configs and artifacts that are to be used to build a service. A service manifest may include a collection of service manifest items, each service manifest item identifying a particular flock config or artifact that may be needed (or is needed) to build a service. In some embodiments, a service manifest item may be associated with a git commit hash of the flock and all version declarations for any artifact that is required in application releases for that service's build.

A "SPAM" (also referred to as a "service build description") refers to a combination of a service plan and a manifest that collectively provide a deterministic specification of the process for building a service. In some embodiments, a SPAM details a combination and order of releases that may be needed (or is needed) to build the service. A manifest of the SPAM may define all resources to be used for the releases, while the service plan specifies an order of release execution based on capability dependencies. A SPAM may be used to track compliance of a region build. A SPAM details the releases that may be necessary (or are necessary) to build a service where each release may be associated with pre- and post-conditions. The preconditions may refer to capabilities that may (or in some instances, must) be present such that a release can be created that will result in the postconditions being satisfied. The post-conditions may be capabilities that should (or in some cases, must) be published as a consequence of the release succeeding. SPAMs may be created by service teams and are derived from YAML files they author. The SPAM may be delineated into discrete sections, including execution units which define transitions between well-defined points in the service's build, known as "build milestones." A service may transition from one build milestone to the next by performing the releases defined by an execution unit. Execution units may specify the external dependencies (capabilities) that may be (or are) required to perform the releases defined within the unit. Build milestones may specify the capabilities published by the service that should (or in some cases, must) be made available once the service has reached that milestone. In some embodiments, that the capabilities specified by a build milestone include capabilities that are intended for consumption by other services.

A "SPAM set" refers to a collection on SPAMs that are mutually compatible and/or that are previously associated with one another. A SPAM set may be used to derive a version set with which a directed acyclic graph may be generated and used to drive operations for building a data center. In some embodiments, a SPAM set may be associated with a scope and/or a regional context.

A "build milestone" refers to an entity defined in a service plan that identifies a synchronization point between the service build (e.g., the process for building a particular service) and the rest of the data center build. Build milestones may be defined coarsely to limit their number and provide a high-level overview of the process for building a service. As a non-limiting example, a set of build milestones for a service may include "absent" (e.g., a default starting milestone), "service functionality X available," "service available," and "service build complete."

An "execution unit" refers to another entity of a service plan. One or more execution units may describe the process for transitioning from one build milestone to the next via a directed acyclic graph of CIOS releases (e.g., infrastructure and/or application releases).

An "execution target checkpoint" or "ET checkpoint," for brevity, refers to a defined point in the data center build of a given execution target. An ET checkpoint may be associated with certain preconditions (e.g., required capability dependencies) and postconditions (capability publications) that should have met upon reaching that ET checkpoint. In some embodiments, steps identified within an execution unit may reference ET checkpoint transitions that may map logically to expected CIOS releases (e.g., infrastructure or application releases).

A "region archetype" may represent an overall structure of a region (e.g., an ONSR region, a single-availability-domain-region, a first region in a realm) that could be used to impact a service's installation. In some embodiments, a service plan may reference dimensions of a region archetype to conditionally change the service plan definition.

A "version set" may be used to define all flock configuration file and artifact versions across all services in a specific regional context (e.g., given a specific region such as "region1" and a specific version set identifier such as "golden" or "break glass"). A version set may be composed of many version set items, each of which may specify a flock and the artifacts for that flock. These entities may identify the existence of SPAMs and SPAM sets. By way of example, in some embodiments, a version set may be associated with a corresponding SPAM set. Any suitable version set item may be associated with a SPAM from which it was derived and/or corresponding to a common service.

"Static flock analysis" refers to an execution of a static analysis of code (e.g., that identifies data center infrastructure components as objects using a declarative configuration language) to infer capability publications and/or dependencies. In some embodiments, a static flock analysis may be performed utilizing an infrastructure-as-code software tool (e.g., Terraform®). In some embodiments, this software tool may generate one or more data structures (e.g., directed acyclic graphs) that represent these dependencies/publications. Each node in the graph may correspond to a flock config and/or a release, with edges identifying capability publications and/or dependencies between releases.

In some examples, techniques for implementing a Cloud Infrastructure Orchestration Service (CIOS) are described herein. Such techniques, as described briefly above, can be configured to manage bootstrapping (e.g., provisioning and deploying software to) infrastructure components within a cloud environment (e.g., a region). In some instances, the CIOS can include computing components (e.g., a CIOS Central and a CIOS Regional) that may be configured to manage bootstrapping tasks (provisioning and deployment) for a given service and an Orchestrator (e.g., a multi-flock orchestrator) configured to initiate/manage region builds (e.g., bootstrapping operations corresponding to multiple services in a region/data center).

CIOS enables region/data center building and world-wide infrastructure provisioning and code deployment with minimal manual run-time effort from service teams (e.g., beyond an initial approval and/or physical transportation of hardware, in some instances). The high-level responsibilities of CIOS include, but are not limited to, coordinating region builds in an automated fashion with minimal human intervention, providing users with a view of the current state of resources managed by the CIOS (e.g., of a region, across regions, world-wide, etc.), and managing bootstrapping operations for bootstrapping resources within a region.

The CIOS may provide view reconciliation, where a view of a desired state (e.g., a desired configuration) of resources may be reconciled with a current/actual state (e.g., a current configuration) of the resources. In some instances, view reconciliation may include obtaining state data to identify what resources are actually running and their current configuration and/or state. Reconciliation can be performed at a variety of granularities, such as at a service level.

CIOS can perform plan generation, where differences between the desired and current state of the resources are identified. Part of plan generation can include identifying the operations that would need to be executed to bring the resources from the current state to the desired state. Once the user is satisfied with a plan, the plan can then be marked as approved or rejected. Thus, users can spend less time reasoning about the plan and the plans are more accurate because they are machine generated. Plans are almost too detailed for human consumption; however, CIOS can provide this data via a sophisticated user interface (UI).

In some examples, CIOS can handle execution of change management by automatically executing the approved plan. Once an execution plan has been created and approved, engineers may no longer need to participate in change management unless CIOS initiates roll-back. CIOS can handle rolling back to a previous service version by automatically generating a plan that returns the service to a previous (e.g., pre-release) state (e.g., when CIOS detects service health degradation while executing).

CIOS can measure service health by monitoring alarms and executing integration tests. CIOS can help teams quickly define roll-back behavior in the event of service degradation, which it can later execute automatically. CIOS can automatically generate and display plans and can track approval. CIOS can combine the functionality of provisioning and deployment in a single system that coordinates these tasks across a region build. CIOS can discover dependencies between execution tasks at every level (e.g., resource level, execution target level, phase level, service level, etc.) through a static analysis (e.g., including parsing and processing content) of one or more configuration files. Using these dependencies, CIOS can generate various data structures from these dependencies that can be used to drive task execution (e.g., tasks regarding provisioning of infrastructure resources and deployment of artifacts across the region).

Today, during Large Scale Events (LSEs) (e.g., events in which a substantial error, blockage, or delay is experienced in a region build), incident management and region build operators frequently incur wide-spread overhead and sometimes delays, e.g., in collecting status, attribution of the issue, assessment of impacts, and the recovery of services, due to the heavily human-based and non-systemic approach of conventional approaches. Due to the complexity of the various dependencies between services, it can be extremely difficult and time intensive for operators to identify the contributing cause of the event. This causes delays in remediation as well as the ability to assess when an event has concluded. Similarly, building a region includes challenges in which human involvement may be utilized to troubleshoot and/or detect of failures or blocking situations. Conventionally, it is difficult for service teams to determine what dependencies exist for their service. Both the dependencies the service may have on other services, and vice versa. Additionally, service teams have incomplete indicators ahead of an actual region build as to whether their region build design will have critical issues (such as cyclic dependencies) that prevent or delay the build of their service.

FIG. 1 is a block diagram of an environment 100 in which a Cloud Infrastructure Orchestration System (CIOS) 102 in which a Cloud Infrastructure Orchestration System (CIOS may operate to dynamically bootstrap services in a region/data center, according to at least one embodiment. CIOS 102 can include, but is not limited to, the following components: Real-time Regional Data Distributor (RRDD) 104, Orchestrator 106, CIOS Central 108, CIOS Regional 110, Capabilities Service 112, Virtual Bootstrap Environment 116, Puffin Central 118, Puffin Regional 120, and Alarm Service(s) 122. Specific functionality provided by CIOS Central 108 and CIOS Regional 110 is described in more detail in U.S. application Ser. No. 17/016,754, entitled "Techniques for Deploying Infrastructure Resources with a Declarative Provisioning Tool," the entire contents of which are incorporated in its entirety for all purposes. In some embodiments, any suitable combination of the components of CIOS 102 may be provided as a service. In some embodiments, some portion of CIOS 102 may be deployed to a region (e.g., a data center represented by host region 103). In some embodiments, CIOS 102 may include any suitable number of cloud services (not depicted in FIG. 1) discussed in further detail below with respect to FIGS. 2 and 3.

Real-time Regional Data Distributor (RRDD) 104 may be configured to maintain and provide region data that identifies realms, regions, execution targets, and availability domains. In some cases, the region data may be in any suitable form (e.g., JSON format, data objects/containers, XML, etc.). Region data maintained by RRDD 104 may include any suitable number of subsets of data which can individually be referenceable by a corresponding identifier. By way of example, an identifier "all_regions" can be associated with a data structure (e.g., a list, a structure, an object, etc.) that includes a metadata for all defined regions. As another example, an identifier such as "realms" can be associated with a data structure that identifies metadata for a number of realms and a set of regions corresponding to each realm. In general, the region data may maintain any suitable attribute of one or more realm(s), region(s), availability domains (ADs), execution target(s) (ETs), and the like, such as identifiers, DNS suffixes, states (e.g., a state of a region), and the like. The RRDD 104 may be configured to manage region state as part of the region data. A region state may include any suitable information indicating a state of bootstrapping within a region. By way of example, some example region states can include "initial," "building," "production," "paused," or "deprecated." The "initial" state may indicate a region that has not yet been bootstrapped. A "building" state may indicate that bootstrapping of one or more flocks within the region has commenced. A "production" state may indicate that bootstrapping has been completed and the region is ready for validation. A "paused" state may indicate that CIOS Central 108 or CIOS Regional 110 has paused internal interactions with the regional stack, likely due to an operational issue. A "deprecated" state may indicate the region has been deprecated and is likely unavailable and/or will not be contacted again.

CIOS Central 108 is configured to provide any suitable number of user interfaces with which users (e.g., user 109) may interact with CIOS 102. By way of example, users can make changes to region data via a user interface provided by CIOS Central 108. CIOS Central 108 may additionally provide a variety of interfaces that enable users to: view changes made to flock configs and/or artifacts, generate and view plans, approve/reject plans, view status on plan execution (e.g., corresponding to tasks involving infrastructure provisioning, deployment, region build, and/or desired state of any suitable number of resources managed by CIOS 102. CIOS Central 108 may implement a control plane configured to manage any suitable number of CIOS Regional 110 instances. CIOS Central 108 can provide one or more user interfaces for presenting region data, enabling the user 109 to view and/or change region data. CIOS Central 108 can be configured to invoke the functionality of RRDD 104 via any suitable number of interfaces. Generally, CIOS Central 108 (also referred to as a "provisioning and deployment manager") may be configured to manage region data, either directly or indirectly (e.g., via RRDD 104). CIOS Central 108 may be configured to compile flock configs (and/or SPAMs) to inject region data as variables within the flock configs (and/or SPAMs). CIOS Central 108 may be instructed (e.g., by Orchestrator 106) to perform one or more releases (e.g., infrastructure or application releases) corresponding to flock configs.

Each instance of CIOS Regional 110 may correspond to a module configured to execute bootstrapping tasks that are associated with a single service of a region (e.g., a data center such as host region 103). CIOS Regional 110 can receive desired state data from CIOS Central 108. In some embodiments, desired state data may include a flock config that declares (e.g., via declarative statements) a desired state of resources associated with a service. CIOS Central 108 can maintain current state data indicating any suitable aspect of the current state of the resources associated with a service. In some embodiments, CIOS Regional 110 can identify, through a comparison of the desired state data and the current state data, that changes that may be (or are) needed to one or more resources. For example, CIOS Regional 110 can determine that one or more infrastructure components need to be provisioned, one or more artifacts deployed, or any suitable change that may be (or is) needed to the resources of the service to bring the state of those resources in line with the desired state. As CIOS Regional 110 performs bootstrapping operations, it may publish data indicating various capabilities of a resource as they become available. A "capability" identifies a unit of functionality associated with a service. The unit could be a portion, or all of the functionality to be provided by the service. By way of example, a capability can be published indicating that a resource is available for authorization/authentication processing (e.g., a subset of the functionality to be provided by the resource). As another example, a capability can be published indicating the full functionality of the service is available. Capabilities can be used to identify functionality on which a resource or service depends and/or functionality of a resource or service that is available for use. In some embodiments, CIOS Regional 110 may transmit data indicating a state transition of a skill. By way of example, in some embodiments, CIOS Regional 110 performs bootstrapping operations which result in publishing a skill (e.g., transmitting skill metadata including a skill state value indicating the skill is installed). The skill metadata may be transmitted to Puffin (e.g., Puffin Regional 120) and used to update the skill state of the corresponding skill.

Capabilities Service 112 is configured to maintain capabilities data that indicates 1) what capabilities of various services are currently available, 2) whether any resource/service is waiting on a particular capability, 3) what particular resources and/or services are waiting on a given capability, or any suitable combination of the above. Capabilities Service 112 may provide an interface with which capabilities data may be requested. Capabilities Service 112 may provide one or more interfaces (e.g., application programming interfaces) that enable it to transmit capabilities data to Orchestrator 106, CIOS Regional 110 (e.g., each instance of CIOS Regional 110), Puffin Regional 120, and/or Puffin Central 118. In some embodiments, Capabilities Service 112 may store capabilities data in a data store that is accessible to one or more components of CIOS 102. Orchestrator 106, CIOS Regional 110 (e.g., each instance of CIOS Regional 110), Puffin Regional 120, and/or Puffin Central 118, and/or any suitable component or module of CIOS Regional 110 may be configured to request capabilities data from Capabilities Service 112 or otherwise obtain capabilities data (e.g., from a data store configured to store capabilities data generated by the Capabilities Service 112). Although the Capabilities Service 112 is depicted as being a separate component of CIOS 102, it should be appreciated that, in some embodiments, the functionality provided by Capabilities Service 112 may be provided, in whole or in part, as part of the Skills Service via any suitable combination of Puffin Central 118 and Puffin Regional 120.

In some embodiments, each regional component such as CIOS Regional 110, Capabilities Service 112, Puffin Regional 120, and/or Virtual Bootstrap Environment 116 may be one of many regional components. Each regional component may be specific to a given region (e.g., as depicted in FIG. 1, Host Region 103). Therefore, another region may include similar, but separate, components that are specific to that region. In some embodiments, central components (e.g., Orchestrator 106, CIOS Central 108, RRDD 104, and Puffin Central 118) may include one or more components that are configured to manage build operations corresponding to one or more regions. By way of example only, a single orchestrator (Orchestrator 106) may be utilized to manage bootstrapping operations for building any suitable number of data centers, or multiple instances of Orchestrator 106 may be utilized, each driving the bootstrapping operations for a subset of those data centers or a single data center.

In some embodiments, Orchestrator 106 (an example of which may be a multi-flock orchestrator, an orchestration service, etc.) may be configured to drive region build efforts. In some embodiments, Orchestrator 106 can manage information that describes which flock config versions and/or artifact versions are to be utilized to bootstrap a given service within a region (or to make a unit of change to a target region). In some embodiments, Orchestrator 106 may manage any suitable combination of flock configs and/or service plans. In some embodiments, Orchestrator 106 may be configured to monitor (or be otherwise notified of) changes to the region data managed by Real-time Regional Data Distributor 104. In some embodiments, receiving an indication that region data has been changed may cause a region build to be triggered by Orchestrator 106. In some embodiments, Orchestrator 106 may collect various flock configs, artifacts, and/or SPAMs to be used for a region build. Some, or all, of the flock configs and/or SPAMs may be configured to be region agnostic. That is, the flock configs and/or SPAMs may not explicitly identify what regions to which the flock is to be bootstrapped. In some embodiments, Orchestrator 106 may trigger a data injection process through which the collected flock configs and/or SPAMs are recompiled (e.g., by CIOS Central 108). During recompilation, operations may be executed (e.g., by CIOS Central 108) to cause the region data maintained by Real-time Regional Data Distributor 104 to be injected into the config files and/or SPAMs. Flock configs and/or SPAMs can reference region data through variables/parameters without requiring hard-coded identification of region data. The flock configs and/or SPAMs can be dynamically modified at run time using this data injection rather than having the region data be hardcoded, and therefore, and more difficult to change.

In some embodiments, Orchestrator 106 can perform a static flock analysis in which the flock configs and/or service plans are parsed to identify dependencies between resources, execution targets, execution target checkpoints, phases, and flocks, and in particular to identify circular dependencies that need to be removed. In some embodiments static flock analysis (SFA) data corresponding to this analysis may be stored (e.g., via DB 312) for subsequent use. In some embodiments, Orchestrator 106 can generate any suitable number of data structures based on the dependencies identified. These data structures (e.g., directed acyclic graph(s), linked lists, etc.) may be utilized by CIOS 102 to drive operations for performing a region build. By way of example, these data structures may collectively define an order by which services are bootstrapped within a region. An example of such a data structure is discussed further below with respect to Build Dependency Graph 338 of FIG. 3. If circular dependencies (e.g., service A requires service B and vice versa) exist and are identified through the static flock analysis and/or graph, Orchestrator 106 may be configured to notify any suitable service teams that changes are required to the corresponding flock config to correct these circular dependencies. Orchestrator 106 can be configured to traverse one or more data structures to manage an order by which services are bootstrapped to a region. Orchestrator 106 can identify (e.g., using data obtained from Capabilities Service 112) capabilities available within a given region at any given time. Orchestrator 106 may utilize this data to identify when it can bootstrap a service, when bootstrapping is blocked, and/or when bootstrapping operations associated with a previously blocked service can resume. Based on this traversal, Orchestrator 106 can perform a variety of releases in which instructions are transmitted by Orchestrator 106 to CIOS Central 108 to perform bootstrapping operations corresponding to any suitable number of flock configs. In some examples, Orchestrator 106 may be configured to identify that one or more flock configs may require multiple releases due to circular dependencies found within the graph. As a result, Orchestrator 106 may transmit multiple instruction sets to CIOS Central 108 for a given flock config to break the circular dependencies identified in the graph.

In some embodiments, one or service plan and manifests (SPAMs) may be utilized by the Orchestrator 106. A service plan and manifest may provide a deterministic specification of a build description for a service than previously provided by one or more flock configs. While flock configs specify aspects of a single release associated with a single service, a service plan may provide a single specification of the order and conditional requirements for executing all of the releases that may be needed (or are needed) to build a given service. Previous implementations of flock configs included optional dependencies which allowed for a degree of indeterministic behavior with respect to the order of operations performed during a region build. The inclusion of optional dependencies may require the Orchestrator 106 to perform multiple passes of the build dependency graph, resulting in wasteful processing. These types of dependencies make it difficult, if not impossible, for the system to track region build progress, identify remaining operations yet to be performed, and/or identify build completion. Service plans and manifests (SPAMs) may be utilized to eliminate at least some of the drawbacks to previous indeterministic approaches.

SPAMs (one SPAM corresponding to one service to be bootstrapped in the region) allow service teams to describe the corresponding operations that may be needed (or are needed) to build their service and may allow for separation between internal coordination (e.g., coordination of operations internal to the service) and external coordination (e.g., coordination of operations between components of different services). A number of visualizations may be provided (e.g., via Orchestrator 106 or any suitable component of CIOS 102) via one or more user interfaces. One visualization may depict a directed acyclic graph describing the build operations internal to a given service, and a separate visualization may depict a directed acyclic graph describing the order of build operations corresponding to multiple services (e.g., all services of the region/data center). As a specific example, one or more visualization can present a region-level directed acyclic graph (DAG) including only external coordination (e.g., an order of operations corresponding to coordination between services) while omitting operations that are internal with respect to each service. This DAG, for example, may depict nodes corresponding to one service's capabilities (or skills) on which other services depend, while excluding nodes corresponding to capability (or skill) dependencies between service components/functional units of the same service.

A SPAM may include an external interaction interface that includes a service build definition that includes a number of build milestones. Each build milestone may be associated with a set of capabilities (and/or skills) that the service is expected to publish upon reaching a given milestone. To transition between build milestones, the SPAM may include execution units that encapsulate a directed acyclic graph (DAG) of one or more releases, each release being equivalent to operations previously defined with a single flock config. Each execution unit may define a set of build time dependencies that identify one or more capabilities (and/or skills) that are required by at least one of the releases of the execution unit.

A SPAM may include a service build implementation. An execution unit of the SPAM may describe one or more releases that may be needed (or are needed) to build a service, with potentially multiple execution units being defined. Each execution unit may be associated with one or more execution target checkpoint transitions, each of which may be used to specify the expected capabilities that should be available before the time of the release and the capabilities that should be published as the result of performing the release.

In some embodiments, the Orchestrator 106 may be configured to aggregate SPAMs corresponding to each service to be deployed in a region to generate a larger directed acyclic graph (e.g., the Build Dependency Graph 338 of FIG. 3) which may capture all of the operations necessary to build a region/data center. The collection of SPAMs identified from this aggregation may be referred to as a "SPAM set." In some embodiments, the Orchestrator 106 may utilize the DAG generated from a SPAM set to validate a DAG and/or operations performed using flock configs, while the DAG generated from flock configs is used to drive build operations/release execution. Alternatively, the Orchestrator 106 may utilize the DAG generated from the SPAM set to drive build operations/release execution. The utilization of a SPAM/SPAM set may be utilized by the system to generate a deterministic execution plan with which the region build may be executed.

In some embodiments, Puffin Central 118 may provide a number of user interfaces with which one or more skills can be defined. A skill may be used with, or in lieu of, previously capabilities and enables improvements over previous capabilities-based implementations. In contrast with capabilities, skills may be scoped (e.g., controllable through access and authorization policies), versioned, and attributed to a particular service and/or contact. Skills may be associated with a lifecycle and may be monitored for health and are designed to be more highly visible/accessible than capabilities. Puffin Central 118 may provide an authoritative registry for skills. Various user interfaces managed by Puffin Central 118 may be utilized to define, maintain, and manage skills that each service offers, as well as their dependency relationships with other services. Puffin Central 118 may be utilized to declare and persist strongly defined metadata of services in a versioned manner. This metadata may be used to generate a blueprint for build-time and run-time dependencies. These blueprints can be used to validate build plans, to drive orchestration decisions during region build, and to improve time-to-engage and time-to-diagnose measures during region build and/or Large-Scale Events (LSEs).

Puffin Central 118 may be configured to serve as a source of truth for services and may maintain metadata including each service's upstream and downstream dependencies and service team contact information and methods for each service across regions and realms (e.g., a set of regions). Each skill may represent a function unit that a service exposes and offers to consumers (e.g., other services). In some embodiments, skills may be scoped where access is controlled based on access and/or authorization policies and/or based on an association with a particular namespace. A skill may be associated with multiple versions in which one or more aspects of the skill differs from previous versions, where each skill version represents a specific implementation of the skill. Each skill version may be identifiable using a unique skill identifier. In some embodiments, Puffin Central 118 may be configured to generate a skill corresponding to a previously defined capability in order to provide backward compatibility with previous capabilities-based region build implementations.

In some embodiments, Puffin may maintain compatibility between skills and capabilities, such that any suitable combination of the two may be utilized to define a process by which a service is to be built. Based on maintaining a mapping between skills and/or capabilities a service publishes, Puffin may ensure that a skill may be transitioned based on capabilities and/or a capability may be published due to a state change of a corresponding skill. In some embodiments, Puffin may generate "shadow skills" (e.g., system-generated skills that represent corresponding capabilities) and/or shadow capabilities (e.g., system-generated capabilities that publish when a corresponding skill is transitioned to an installed state). These features, provided by Puffin, enable the orchestrator to use any suitable combination of skills and/or capabilities to drive orchestration during a region build (e.g., during a process for building a data center).

In some embodiments, a skill may be mapped to one or more capabilities. Puffin Regional 120 may be configured to publish and/or store skills metadata based on capabilities data published (or stored) by the Capabilities Service 112. In some embodiments, Puffin Regional 120 may publish capabilities data to the Capabilities Service 112 and/or store such data based at least in part on publishing a skill or identifying a skill has transitioned to or is otherwise associated with a particular state. In some embodiments, some services may utilize flock configurations that express progress using capabilities, while other services may utilize a service plan and manifest that defines a deterministic build process in which progress is expressed with capabilities and/or skills. Using the mapping (or multiple mappings) between skills and capabilities, Puffin Regional 120 may enable a region build to be performed using any suitable combination of capabilities and/or skills to indicate that 1) service or resource functionality is available, 2) a particular event has transpired, 3) a particular fact is true, 4) a condition has been met, or any suitable combination of the above. This mapping or mappings enable CIOS 102 to perform a region build/data center build using any suitable combination of capabilities and/or skills, enabling service teams to transition from capabilities-based implementations to skills-based implementations gradually.

In some embodiments, any suitable computing component of the Puffin Service (e.g., Puffin Central 118 and/or Puffin Regional 120) may be configured to monitor the health and/or lifecycle of a skill according to a predefined skill lifecycle. Health monitoring may be performed using one or more alarms that are associated with a given skill. In some embodiments, a telemetry service (e.g., an example of alarm service(s) 122) may utilize an application programming interface provided by the Puffin Service (including Puffin Central 118 and/or Puffin Regional 120) when an alarm is triggered. As another example, the Puffin Service (e.g., Puffin Regional 120) may request alarm data from the alarm service(s) 122 and/or from storage locations at which the alarm service(s) 122 store the alarm data. The Puffin Service may present, via one or more user interfaces, information related to the health of a skill based on the alarms corresponding to the alarm data obtained and their corresponding association to a given skill.

In some embodiments, the Puffin Service (e.g., Puffin Central 118 and/or Puffin Regional 120) may expose one or more application programming interfaces (APIs) with which validation operations may be performed. By way of example, a SPAM describing the build process with respect to one or more services may be provided via a given API (e.g., by the Orchestrator 106). The Puffin Service (e.g., Puffin Central 118) may execute any suitable operations for validating that all services and skills identified in the SPAM have been previously registered with the Puffin Service and that the build process defined in the SPAM does not violate previously defined dependency relationships maintained by the Puffin Service. Additionally, or alternatively, Orchestrator 106 may perform any suitable validation check such as determining whether each flock config and/or artifact identified in a given service's manifest is referenced within the service's corresponding service plan and/or that no flock config and/or artifact is referenced within the service plan that is not referenced within the manifest. Orchestrator 106 may perform validation operations (e.g., a static analysis including parsing the service plan) to determine that a service plan lacks circular dependencies. If a circular dependency is found within a service plan, Orchestrator 106 may provide a notification and/or restrict the service plan and corresponding manifest from being utilized. In some embodiments, such restrictions may include restricting the service plan and manifest from being added to a SPAM set (e.g., a set of SPAMs to be used to perform a region build). In some embodiments, the Orchestrator 106 may perform any suitable validation operations to ensure that SPAMs of a SPAM set and/or a SPAM that is being considered as an addition to a preexisting SPAM set are mutually compatible. This may include analyzing the SPAM set (alone or with a SPAM that is being considered for addition) to ensure that the SPAMs of the SPAM set do not include circular dependencies.

In some embodiments, a user can request that a new region (e.g., target region 114) be built. This can involve bootstrapping resources corresponding to a variety of services. In some embodiments, target region 114 may not be communicatively available (and/or secure) at a time at which the region build request is initiated. Rather than delay bootstrapping until such time as target region 114 is available and configured to perform bootstrapping operations, CIOS 102 may initiate the region build using a virtual bootstrap environment (e.g., Virtual Bootstrap Environment (ViBE) 116. ViBE 116 may be an overlay network that is hosted by host region 103 (a preexisting region that has previously been configured with a core set of services and which is communicatively available and secure). Orchestrator 106 can leverage resources of the host region 103 to bootstrap resources to the VIBE 116 (generally referred to as "building the ViBE"). By way of example, Orchestrator 106 can provide instructions through CIOS Central 108 that cause an instance of CIOS Regional 110 within a host region (e.g., host region 103) to bootstrap another instance of CIOS Regional within the VIBE 116. Once the CIOS Regional within the ViBE is available for processing, bootstrapping the services for the target region 114 can continue within the ViBE 116. When target region 114 is available to perform bootstrapping operations, the previously bootstrapped services within ViBE 116 may be migrated to target region 114. Utilizing these techniques, CIOS 102 can greatly improve the speed at which a region is built by drastically reducing the need for any manual input and/or configuration to be provided. In some embodiments, any suitable combination of the components depicted as part of CIOS 102 may individually be examples of the cloud services of FIGS. 13-17 (e.g., 1356 of FIG. 13) and may be configured to operate in any suitable infrastructure pattern such as the examples described below in connection with FIGS. 13-17.

Figure 2:
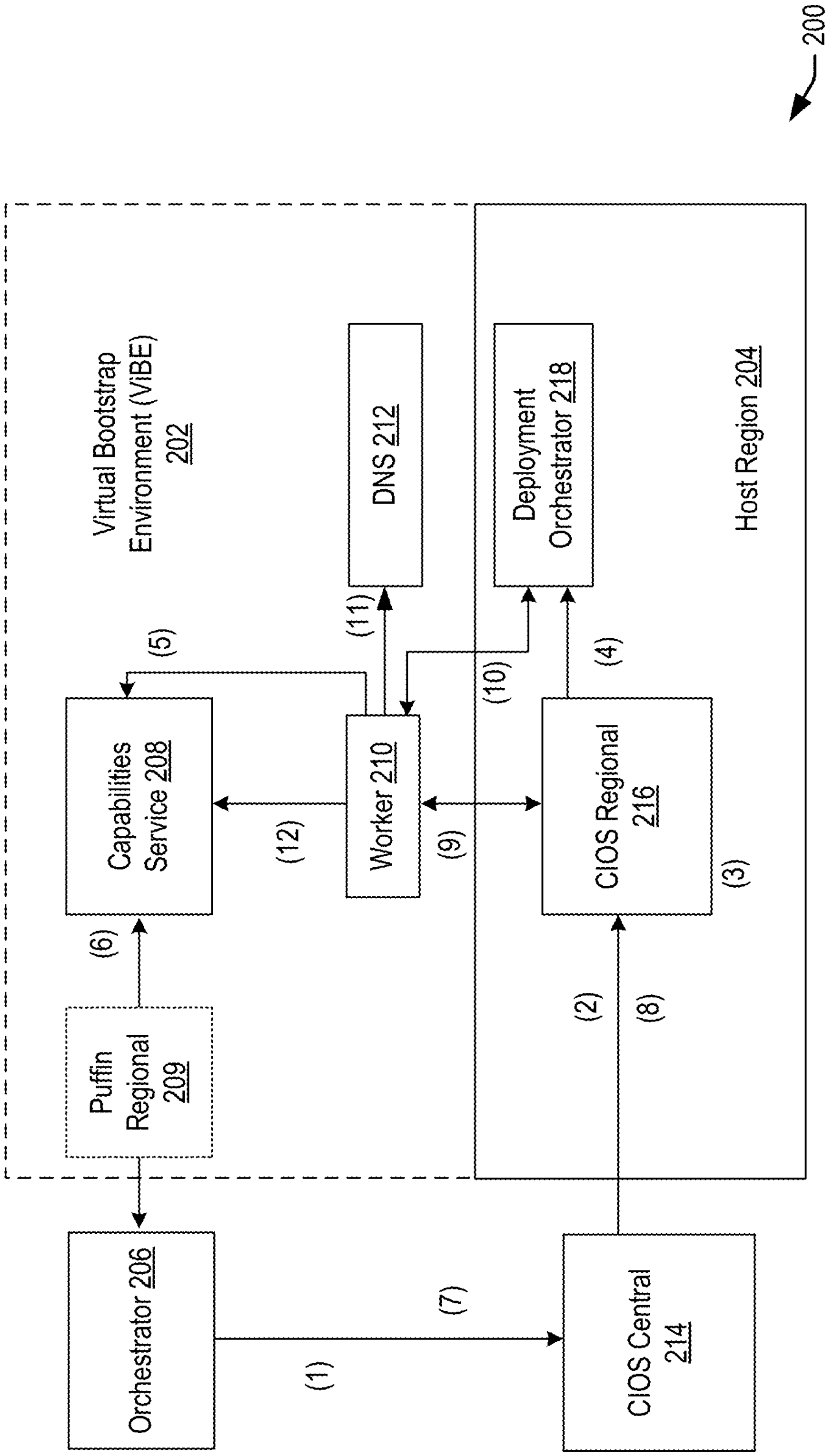
FIG. 2 is a block diagram for illustrating an environment and method for building a virtual bootstrap environment (ViBE), in accordance with at least one embodiment.

FIG. 2 is a block diagram for illustrating an environment and method 200 for building a virtual bootstrap environment (ViBE) 202 (an example of ViBE 116 of FIG. 1), according to at least one embodiment. ViBE 202 represents a virtual cloud network that is provisioned in the overlay of an existing region (e.g., host region 204, an example of the host region 103 of FIG. 1 and in an embodiment is a Host Region Service Enclave). ViBE 202 represents an environment in which services can be staged for a target region (e.g., a region under build such as target region 114 of FIG. 1) before the target region becomes available.

In order to bootstrap a new region (e.g., target region 114 of FIG. 1), a core set of services may be bootstrapped. While those core set of services exist in the host region 204, they do not yet exist in the ViBE (nor the target region). These essential core services provide the functionality needed to provision devices, establish a chain of trust to the new region, and deploy remaining services into a region. The ViBE 202 may be a tenancy that is deployed in a host region 204 and used as a virtual region.

When the target region is available to provide bootstrapping operations, the VIBE 202 can be connected to the target region so that services in the ViBE can interact with the services and/or infrastructure components of the target region. This will enable deployment of production level services, instead of self-contained seed services as in previous systems, and may be connected over the internet to the target region. Conventionally, a seed service was deployed as part of a container collection and used to bootstrap dependencies necessary to build out the region. Using infrastructure/tooling of an existing region, resources may be bootstrapped (e.g., provisioned and deployed) into the VIBE 202 and connected to the service enclave of a region (e.g., host region 204) in order to provision (reserve and/or configure) hardware and deploy services until the target region is self-sufficient and can be communicated with directly. Utilizing the ViBE 202 allows for meeting the dependencies and providing the services needed to be able to provision/prepare infrastructure and deploy software while making use of the host region's resources in order to break circular dependencies of core services.

Orchestrator 206 (an example of Orchestrator 106 of FIG. 1) may be configured to perform operations to build (e.g., configure) ViBE 202. Orchestrator 206 can obtain applicable flock configs and/or SPAMs corresponding to various resources to be bootstrapped to the new region (in this case, a ViBE region, ViBE 202). By way of example, Orchestrator 206 may obtain a flock config (e.g., a "ViBE flock config") that identifies aspects of bootstrapping Capabilities Service 208 (e.g., an example of Capabilities Service 112) and/or Worker 210. In some embodiments, Orchestrator 206 may additionally obtain a flock configuration identifying aspects of bootstrapping any suitable portion of a skills service (e.g., Puffin Regional 120 of FIG. 1). In some embodiments, one or more service plan and manifests (SPAMs) may be used to identify these aspects (e.g., specifying operations previously defined in one or more flock configuration files and/or the resources/artifacts that may be needed (or are needed) to bootstrap a service from start to finish) for bootstrapping any suitable combination of Capabilities Service 208, Worker 210, and/or Puffin Regional 209. As another example, Orchestrator 206 may obtain another flock config and/or SPAM corresponding to bootstrapping Domain Name Service (DNS) 212 to ViBE 202.

The method 200 may begin at step 1, where Orchestrator 206 may instruct CIOS Central 214 (e.g., an example of CIOS Central 108 and CIOS Central 214 of FIGS. 1 and 2, respectively). For example, Orchestrator 206 may transmit a request (e.g., including the ViBE flock config, which may be one flock config identified in a service plan) to request bootstrapping of the Capabilities Service 208 and Worker 210 (and in some embodiments, Puffin Regional 209) that, at this time do not yet exist in the VIBE 202. In some embodiments, a corresponding SPAM for the Capabilities Service 208, Worker 210, and/or Puffin Regional 209 may be utilized in lieu of or in addition to the ViBE flock config. In some embodiments, CIOS Central 214 may have access to all flock configs and/or SPAMs. Therefore, in some examples, Orchestrator 206 may transmit an identifier for the ViBE flock config and CIOS Central 214 may independently obtain the ViBE flock config from storage (e.g., from database (DB) 308 or DB 312 of FIG. 3).

At step 2, CIOS Central 214 may provide the ViBE flock config via a corresponding request to CIOS Regional 216. CIOS Regional 216 may parse the ViBE flock config to identify and execute specific infrastructure provisioning and deployment operations at step 3.

In some embodiments, the CIOS Regional 216 may utilize additional corresponding services for provisioning and deployment. For example, at step 4, CIOS Regional 216 CIOS Regional may instruct deployment orchestrator 218 (e.g., an example of a core service, or other write, build, and deploy applications software, of the host region 204) to execute instructions that in turn cause Capabilities Service 208, Worker 210, and in some embodiments Puffin Regional 209, to be bootstrapped within ViBE 202.

At step 5, capabilities data may be transmitted to the Capabilities Service 208 (from the CIOS Regional 216, Deployment Orchestrator 218 via the Worker 210 or otherwise) indicating that resources corresponding to the ViBE flock are available. Capabilities Service 208 may persist this data. In some embodiments, the Capabilities Service 208 adds this information to a list it maintains of available capabilities with the ViBE. By way of example, the capability provided to Capabilities Service 208 at step 5 may indicate the Capabilities Service 208 and Worker 210 (and in some embodiments, Puffin Regional 209) are available for processing. In some embodiments, skills metadata may be transmitted to Puffin Regional 209 indicating that any suitable combination of functionality corresponding to the Capabilities Service 208, Worker 210, and/or Puffin Regional 209 is available.

At step 6, Orchestrator 206 may identify that the Capabilities Service 208, Worker 210, and/or Puffin Regional 209 are available based on receiving or obtaining data (an identifier corresponding to a capability and/or skill) from the Capabilities Service 208 and/or Puffin Regional 209.

In some embodiments, published capabilities may be processed by Puffin Regional 209 (e.g., Puffin Regional 120 of FIG. 1) prior to processing by Orchestrator 206. In some embodiments, Puffin Regional 209 may be configured to provide forward and backward compatibility between skills and capabilities. By way of example, in some embodiments, if a capability is published to Puffin Regional 209, Puffin Regional 209 may query known skills (e.g., via a skills table or other suitable record of registered/previously generated skills) to check if any skill is associated with the capability. If no skill is associated with the capability, Puffin Regional 209 may be configured to create a skill (referred to as a "shadow skill) to represent the capability using the skill construct (e.g., including the data structures discussed below in connection with FIG. 4). When orchestrator 206 publishes skills (or updates skill state) during the process of performing a region build, Puffin Regional 209 may receive this data and identify one or more capabilities that are associated with the corresponding skill(s). Puffin Regional 209 may publish any or all capabilities associated with the skill that have not yet been published. In some embodiments, publishing such data may include storing an indication that these capabilities are available. In this manner, Puffin Regional 209 may support full compatibility between capabilities and skills such that any suitable combination of the two may be utilized to drive the operations performed during a region build.

Although some embodiments describe shadow skill generation being conducted at build time, it should be appreciated that the Puffin Service may generate shadow skills at any suitable time and according of a variety of methods. By way of example, historical capabilities data (e.g., capabilities data historically published during one or more previous region builds) may be obtained by the Puffin Service (e.g., Puffin Central 118 and/or Puffin Regional 120 of FIG. 1, and/or Puffin Regional 209 of FIG. 2, etc.) at any suitable time (e.g., prior to initiation of a region build, prior to deployment within the region, upon completion of region build, etc.). In some embodiments, the historical capabilities data may be stored (e.g., by an instance of Capabilities Service 112 of FIG. 1) in a data store that is accessible the Puffin Service. The Puffin Service may process the historical capabilities data (e.g., one or more files, records, tables, data structures, etc.) to identify one or more capabilities for which no corresponding skill currently exists. Identifying a corresponding skill may include matching any suitable portion of a tag or label of a capability with any suitable attribute and/or portion of an attribute (e.g., one or more tokens/words of a service name and/or identifier) associated with a service. A shadow skill may be generated by the Puffin Service for each historically published capability that fails to match any known skills. As described above, these shadow skills may be configured to represent a corresponding historically published capability and may be used to maintain compatibility between skills and capabilities, and between skill-based service build definitions (e.g., a SPAM) and capability-based service build definitions (e.g., a flock, a SPAM, etc.).

At step 7, as a result of receiving/obtaining the data at step 6, the Orchestrator 206 may instruct CIOS Central 214 to bootstrap a DNS service (e.g., DNS 212) to the VIBE 202. The instructions may identify or include a particular flock config and/or SPAM corresponding to the DNS service.

At step 8, the CIOS Central 214 may instruct the CIOS Regional 216 to deploy DNS 212 to the ViBE 202. In some embodiments, the DNS flock config and/or SPAM for the DNS 212 may be provided by the CIOS Central 214.

At step 9, Worker 210, now that it is deployed in the VIBE 202, may be assigned by CIOS Regional 216 to the task of deploying DNS 212. Worker may execute a declarative infrastructure provisioner in the manner described above in connection with FIG. 3 to identify a set of operations that are needed to deploy DNS 212. These operations may be identified based at least in part on from comparing the flock config (the desired state), or corresponding portion of a SPAM, to a current state of the (currently non-existing) resources associated with DNS 212.

At step 10, the Deployment Orchestrator 218 may instruct Worker 210 to deploy DNS 212 in accordance with the operations identified at step 9. As depicted, Worker 210 proceeds with executing operations to deploy DNS 212 to ViBE 202 at step 11. At step 12, Worker 210 may notify Capabilities Service 208 (via a capability) or Puffin Regional 209 (directly, or via Capabilities Service 208 and using a skill) that DNS 212 is available in ViBE 202. Orchestrator 206 may subsequently identify that the resources associated with the ViBE flock config and the DNS flock config are available any may proceed to bootstrap any suitable number of additional resources to the ViBE.

Figure 13:
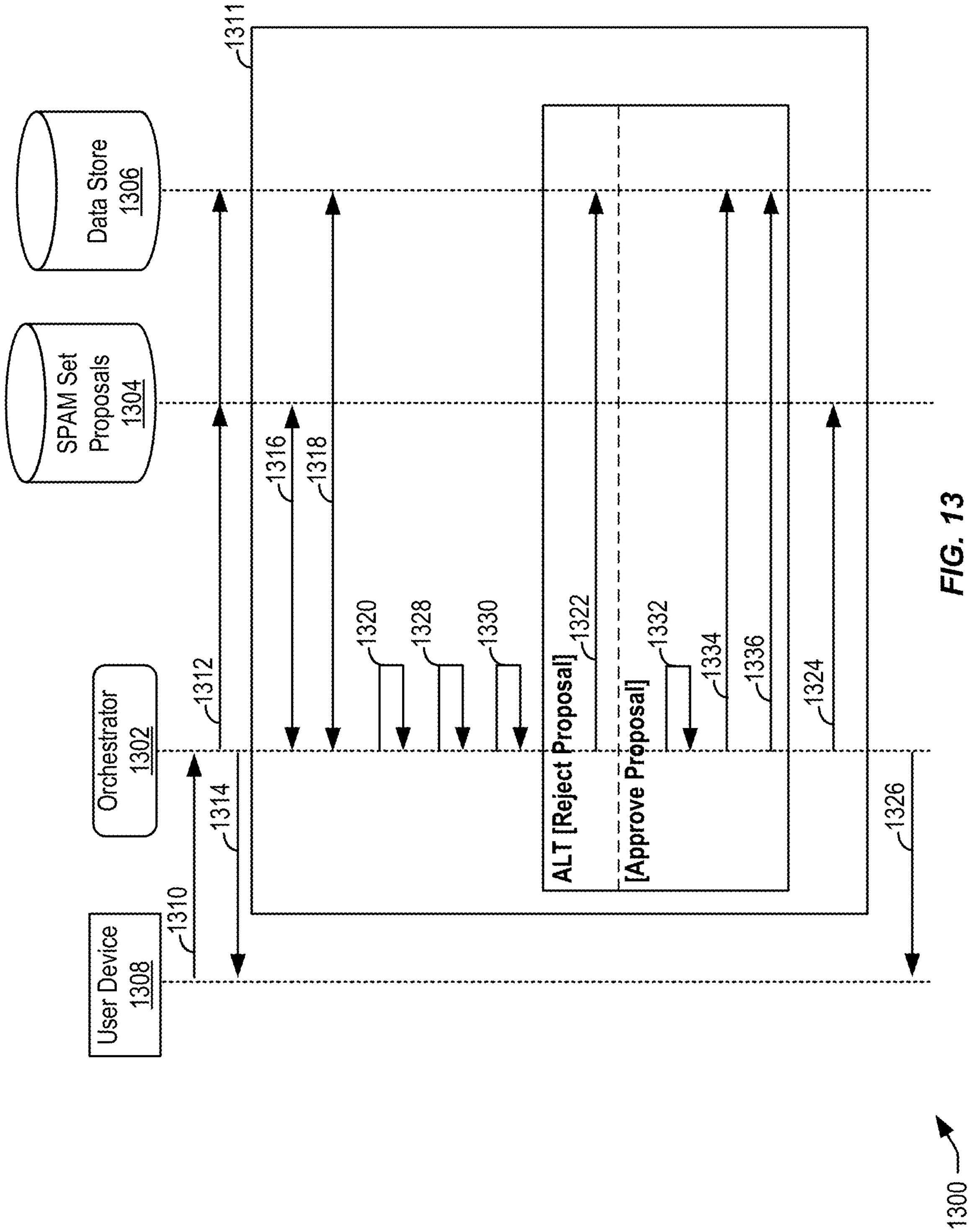
FIG. 13 is a flow diagram depicting a method for adding a SPAM to a SPAM set, in accordance with at least in one embodiment.

After steps 1-12 are concluded, the process for building the ViBE 202 may be considered complete and the ViBE 202 may be considered built and ready for additional bootstrapping (e.g., the bootstrapping of various cloud services such as cloud services 1356 of FIG. 13). At any suitable time during steps 1-12, Puffin Regional 209 may receive and/or obtain alarm data from one or more alarm services (e.g., the alarm service(s) 122 of FIG. 1). In some embodiments, the alarm data may be processed by Puffin Regional 209 (or Puffin Regional 209 may communicate the alarm data or data derived from the alarm data to Puffin Central 118 of FIG. 1). In some embodiments, Puffin Regional 209 (and/or Puffin Central 118) may communicate skill health information to Orchestrator 206 indicating corresponding health states associated with one or more skills. In some embodiments, Puffin Regional 209, Puffin Central 118, and/or Orchestrator 206 may be configured to execute operations that may pause (partially or fully) any suitable portion of the operations discussed above in connection with the method 200. In some embodiments, this may cause a regions state associated with the region within which method 200 is executed, to be updated to a state that indicates the build of the region is paused. In some embodiments, Puffin Regional 209, Puffin Central 118, and/or Orchestrator 206 may be configured to resume the operations of method 200 (and update the region state accordingly) based at least in part on user input, on subsequent alarm data indicating an update to a health state of one or more skills, on a skill health override value, or the like.

Figure 3:
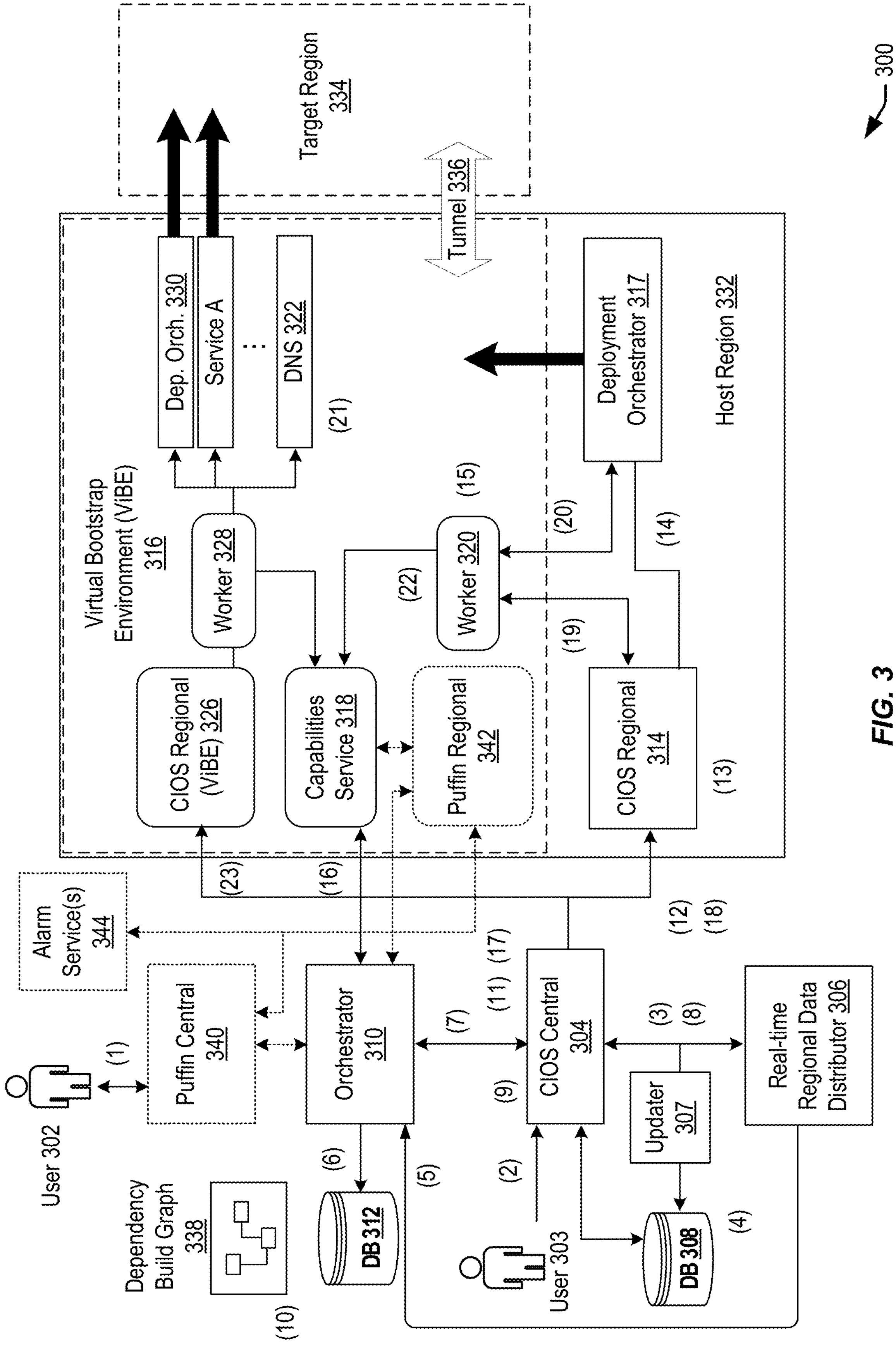
FIG. 3 is a block diagram for illustrating an environment and method for bootstrapping services to a target region utilizing the ViBE, in accordance with at least one embodiment.

FIG. 3 is a block diagram for illustrating an environment and method 300 for bootstrapping services to a target region utilizing the ViBE, according to at least one embodiment.

The method 300 may begin at step 1, where user 302 (e.g., a service team member) may interact with any suitable number of user interfaces managed by Puffin Central 340 (e.g., Puffin Central 118 of FIG. 1). Puffin Central 340 may be configured to read service and/or skill metadata from predefined files or the user 302 may enter service metadata and/or skill metadata at one or more of the provided user interfaces. In some embodiments, Puffin Central 340 may store all service and skill metadata and serve as a centralized authority for the same. At any suitable time, any suitable user may view the service and/or skill metadata such as prior to and/or during performance of the region build.

At step 2, user 303 may utilize any suitable user interface provided by CIOS Central 304 (an example of CIOS Central 108 and CIOS Central 214 of FIGS. 1 and 2, respectively) to modify region data. By way of example, user 303 may create a new region to which a number of services are to be bootstrapped.

At step 3, CIOS Central 304 may execute operations to send the change to RRDD 306 (e.g., an example of RRDD 104 of FIG. 1). At step 4, RRDD 306 may store the received region data in database 308, a data store configured to store region data including any suitable identifier, attribute, state, etc. of a region, AD, realm, ET, or the like. In some embodiments, updater 307 may be utilized to store region data in database 308 or any suitable data store from which such updates may be accessible (e.g., to service teams). In some embodiments, updater 307 may be configured to notify (e.g., via any suitable electronic notification) of updates made to database 308.

At step 5, Orchestrator 310 (an example of the Orchestrator 106 and/or 206 of FIGS. 1 and 2, respectively) may detect the change in region data. In some embodiments, Orchestrator 310 may be configured to poll RRDD 306 for changes in region data. In some embodiments, RRDD 306 may be configured to publish or otherwise notify Orchestrator 310 of region data changes.

At step 6, detecting the change in region data may trigger Orchestrator 310 to obtain a version set (e.g., a version set associated with a particular identifier such as a "golden version set" identifier) identifying a particular version for each flock config and a particular version for each artifact to be used to build the region. The version set may be obtained from DB 312. As flock configs and/or artifacts evolve and change over time, multiple versions of each may be maintained, and certain versions of each may be used for a region build. The version set may be persisted in DB 312 such that Orchestrator 310 may identify which versions of flock configs and artifacts to use for building a region (e.g., a ViBE region, a Target Region/non-ViBE Region, etc. The flock configs (e.g., all versions of the flock configs) and/or artifacts (e.g., all versions of the artifacts) may be stored in DB 308, DB 312, or any suitable data store accessible to the CIOS Central 304 and/or Orchestrator 310.

In some embodiments, Orchestrator 310 may identify any suitable number of SPAMs (collectively referred to as a "SPAM set") corresponding to the infrastructure to be provisioned and artifacts to be deployed as part of a region build. In some embodiments, each SPAM may identify versions corresponding to one or more flock configs and/or one or more artifacts that may be needed (or are needed) to build a single service. In embodiments in which one or more SPAMs are utilized, the SPAM(s) (or any suitable portion of the SPAM(s)) may be stored within DB 312 and utilized to identify the particular flock config and/or artifact versions to be utilized for building the region. In some embodiments, the flock configs and/or artifact versions of a SPAM set may be included in the version set and stored within DB 312. This enables some service teams to utilize a set of flock configs to define their service's build implementation while other service teams may choose to utilize a SPAM to define their service's build implementation.

In some embodiments, any suitable flock version sets and/or version set items may be derived from any suitable number of SPAMs and the Orchestrator 310 may be configured to verify compliance of a flock's behavior (e.g., the build/orchestration operations identified within a flock config) complies with the process defined by a corresponding SPAM. The Orchestrator 310 may be configured to ingest SPAMs which provide the information that may be required (or in some cases, that is required) to build an up-front plan of work and to introduce better guardrails than those available in previous implementations. Any suitable number of SPAMs may be aggregated into corresponding SPAM sets in a similar way that flocks may be aggregated into version sets. SPAM sets may enforce the invariant that all SPAMs within the set are mutually compatible and compose together to form a viable graph of releases required to build a region. In some embodiments, SPAM sets may be used within a given regional context to improve service build progress tracking. SPAM operations may be validated before they are applied and rejected if they are invalid, unlike version set item operations which were unconditionally applied. The utilization of SPAMs may enable the Orchestrator 310 to build a deterministic plan of work prior to building a region, to block updates that would jeopardize or break an ongoing or future build, to improve the tracking of process of a service build, to detect deviations of flock behavior from the SPAM's specification, and to alert operators of deviations and status.

At step 7, Orchestrator 310 may request CIOS Central 304 to recompile each of the flock configs associated with the version set (including any suitable number of flock configs identified by a SPAM of a SPAM set) with the current region data. In some embodiments, the request may indicate a version for each flock config and/or artifact.

At step 8, CIOS Central 304 may obtain current region data from the DB 308 (e.g., directly, or via Real-time Regional Data Distributor 306) and retrieve any suitable flock config and artifact in accordance with the versions requested by Orchestrator 310.

At step 9, CIOS Central 304 may recompile the obtained flock configs with the region data obtained at step 8 to inject those flock configs with current region data. CIOS Central 304 may return the compiled flock configs to Orchestrator 310. In some embodiments, CIOS Central 304 may simply indicate compilation is done, and Orchestrator 310 may access the recompiled flock configs via RRDD 306.

In some embodiments, at step 10, Orchestrator 310 may perform a static flock analysis of the recompiled flock configs (and/or SPAMs). As part of the static flock analysis, Orchestrator 310 may parse the flock configs (and/or SPAMs) (e.g., using a library associated with a declarative infrastructure provisioner (e.g., Terraform®, or the like)) to identify dependencies. Data generated by the static flock analysis (e.g., "SFA data," including the identified dependencies) may be stored for subsequent use. From the analysis and the dependencies identified (e.g., the SFA data), Orchestrator 310 may generate any suitable number of data structures (e.g., directed acyclic graphs) that identify an order for releases identified in the flock configs (or from any suitable portion of one or more service plans, such as from a flock config entity of the service plan). A DAG that is generated based on a flock config (and/or any portion of a SPAM including, but not limited to flock config entity 800 of FIG. 8) and that specifies the releases and order of releases necessary to build a service may be referred to as a "service DAG." In some embodiments, Orchestrator 310 may generate a directed acyclic graph (referred to as a "build diagram") corresponding to each SPAM in which each node represents a build milestone with edges indicating execution units and capabilities (and/or skills) that transition the service between build milestones. Each execution unit may represent a number of releases that, when performed, transition the service between build milestones. Any suitable number of service DAGs can be composed together to form Build Dependency Graph 338. Build Dependency Graph 338 may be an acyclic directed graph that identifies an order by which releases are to be executed to bootstrap one or more services within the new region.

In some embodiments, Build Dependency Graph 338 may be a region-level dependency graph that includes every release that may be needed (or that is needed) for every service to be bootstrapped within the region/data center. Each node in the Build Dependency Graph 338 may correspond to bootstrapping any suitable portion of a service. By way of example, each node of the Build Dependency Graph 338 may correspond to a single release. The specific bootstrapping order (e.g., the order of release execution) may be identified based at least in part on the dependencies. In some embodiments, the dependencies may be expressed as an attribute of the node and/or indicated via edges of the graph that connect the nodes. Orchestrator 310 may traverse the Build Dependency Graph 338 (e.g., beginning at a starting node) to drive the operations of the region build. Any suitable portion of a service DAG and/or the Build Dependency Graph 338 may be presented via one or more user interfaces (e.g., one or more interfaces provided by any suitable component of CIOS 102 of FIG. 1, including orchestrator 310, CIOS Central 304, or the like).

In some embodiments, Orchestrator 310 may utilize a cycle detection algorithm to detect the presence of a cycle (e.g., service A depends on service B and vice versa). Orchestrator 310 can identify orphaned capabilities dependencies. For example, Orchestrator 310 can identify orphaned nodes of the Build Dependency Graph 338 that do not connect to any other nodes. Orchestrator 310 may identify falsely published capabilities (e.g., when a capability was prematurely published, and the corresponding functionality is not actually yet available). Orchestrator 310 can detect from the graph that one or more instances of publishing the same capability exist. In some embodiments, any suitable number of these errors may be detected and Orchestrator 310 (or another suitable component such as CIOS Central 304) may be configured to notify or otherwise present this information to users (e.g., via an electronic notification, a user interface, or the like). In some embodiments, Orchestrator 310 may be configured to force delete/recreate resources to break circular dependencies and may once again provide instructions to CIOS Central 304 to perform bootstrapping operations for those resources and/or corresponding flock configs.

A starting node of the Build Dependency Graph 338 may correspond to building the ViBE 316 (or individual services within the ViBE), a second node may correspond to bootstrapping DNS. The steps 11-16 may correspond to deploying (via deployment orchestrator 317, an example of the deployment orchestrator 218 of FIG. 2) the resources and/or artifacts identified in a corresponding VIBE flock config or SPAM to ViBE 316 (e.g., an example of ViBE 116 and 202 of FIGS. 1, and 2, respectively). That is, steps 11-16 of FIG. 3 generally correspond to steps 1-6 of FIG. 2. Once notified that capabilities (or skills) exist (e.g., indicating that Capabilities Service 318, Worker 320, and/or Puffin Regional 342, corresponding to Capabilities Service 208, Worker 210, and Puffin Regional 209 of FIG. 2, respectively, are deployed/available) the Orchestrator 310 may recommence traversal of the Build Dependency Graph 338 to identify which operations/releases to be executed next.

Orchestrator 310 may continue traversing the Build Dependency Graph 338 to identify that one or more releases corresponding to deploying DNS 322 are to be executed. Steps 17-22 may be executed to deploy DNS 322 (an example of the DNS 212 of FIG. 2). These operations may generally correspond to steps 7-12 of FIG. 2.

At step 22, a capability (or skill) may be published and/or stored indicating that DNS 322 is available. In some embodiments, CIOS Regional 314 and/or Deployment Orchestrator 317 may initially communicate the availability of the capability or skill (e.g., to Capabilities Service 318 or Puffin Regional 342, respectively). If a skill is published, Puffin Regional 342 may transmit data to Capabilities Service 318 to indicate one or more corresponding capabilities are published. Upon detecting the publishing of a capability (e.g., via data provided by Capabilities Service 318, perhaps triggered based on skill-related data provided by Puffin Regional 342), Orchestrator 310 may recommence traversal of the Build Dependency Graph 338. On this traversal, the Orchestrator 310 may identify that any suitable portion of an instance of CIOS Regional (e.g., an example of CIOS Regional 314) is to be deployed to the ViBE 316. In some embodiments, steps 17-22 may be substantially repeated with respect to deploying CIOS Regional (ViBE) 326 (an instance of CIOS Regional 314, CIOS Regional 110 of FIG. 1) and Worker 328 to the ViBE 316. A capability may be transmitted to the Capabilities Service 318 that CIOS Regional (ViBE) 326 is available. If a skill is used to indicate that CIOS Regional (ViBE) 326 is available, Puffin Regional 342 may transmit data to Capabilities Service 318 indicating one or more corresponding capabilities are available. The interactions between Puffin Regional 342 and Capabilities Service 318 enable any suitable combination of capabilities and/or skills to be utilized to express progress through the region build. In some embodiments, when the Build Dependency Graph 338 identifies transitions through capability publishing and dependencies, progress evidenced with skill publishing may be used to trigger corresponding capabilities publishing to enable skills to trigger progress of the region build.

Upon detecting the CIOS Regional (ViBE) 326 is available, Orchestrator 310 may recommence traversal of the Build Dependency Graph 338. On this traversal, the Orchestrator 310 may identify that a deployment orchestrator (e.g., Deployment Orchestrator 330, an example of the Deployment Orchestrator 317) is to be deployed to the ViBE 316. In some embodiments, steps 16-21 may be substantially repeated with respect to deploying Deployment Orchestrator 330. Information that identifies a capability may be transmitted to the Capabilities Service 318 (e.g., by CIOS Regional 314, worker 320, and/or Puffin Regional 342), indicating that Deployment Orchestrator 330 is available.

After Deployment Orchestrator 330 is deployed, ViBE 316 may be considered available for processing subsequent requests. Upon detecting Deployment Orchestrator 330 is available, Orchestrator 310 may instruct subsequent bootstrapping requests to be routed to ViBE components rather than utilizing host region components (components of host region 332). Thus, Orchestrator 310 can continue traversing the Build Dependency Graph 338, at each node instructing release execution to the VIBE 316 via CIOS Central 304. CIOS Central 304 may transmit release requests CIOS Regional (ViBE) 326 to effectuate release execution as instructed by Orchestrator 310.

At any suitable point during this process, Target Region 334 may become available. Indication that the Target Region is available may be identifiable from region data for the Target Region 334 being provided by the user 303 (e.g., as an update to the region data). The availability of Target Region 334 may depend on establishing a network connection between the Target Region 334 and external networks (e.g., the Internet). The network connection may be supported over a public network (e.g., the Internet), but use software security tools (e.g., IPSec) to provide one or more encrypted tunnels (e.g., IPSec tunnels such as tunnel 336) from the ViBE 316 to Target Region 334. As used herein, "IPSec" refers to a protocol suite for authenticating and encrypting network traffic over a network that uses Internet Protocol (IP) and can include one or more available implementations of the protocol suite (e.g., Openswan, Libreswan, strongSwan, etc.). The network may connect the ViBE 316 to the service enclave of the Target Region 334.

Prior to establishing the IPSec tunnels, the initial network connection to the Target Region 334 may be on a connection (e.g., an out-of-band VPN tunnel) sufficient to allow bootstrapping of networking services until an IPSec gateway may be deployed on an asset (e.g., bare-metal asset) in the Target Region 334. To bootstrap the Target Region's network resources, Deployment Orchestrator 330 can deploy the IPSec gateway at the asset within Target Region 334. The Deployment Orchestrator 330 may then deploy VPN hosts at the Target Region 334 configured to terminate IPSec tunnels from the ViBE 316. Once services (e.g., Deployment Orchestrator 330, Service A, etc.) in the ViBE 316 can establish an IPSec connection with the VPN hosts in the Target Region 334, bootstrapping operations from the ViBE 316 to the Target Region 334 may begin.

In some embodiments, the bootstrapping operations may begin with services in the ViBE 316 provisioning resources in the Target Region 334 to support hosting instances of core services as they are deployed from the VIBE 316. For example, a host provisioning service may provision hypervisors on infrastructure (e.g., bare-metal hosts) in the Target Region 334 to allocate computing resources for VMs. When the host provisioning service completes allocation of physical resources in the Target Region 334, the host provisioning service may publish information indicating a capability that indicates that the physical resources in the Target Region 334 have been allocated. The capability may be published to Capabilities Service 318 via CIOS Regional (ViBE) 326 (e.g., by Worker 328).

With the hardware allocation of the Target Region 334 established and posted to Capabilities Service 318, CIOS Regional (ViBE) 326 can orchestrate the deployment of instances of core services from the VIBE 316 to the Target Region 334. This deployment may be similar to the processes described above for building the ViBE 316, but using components of the ViBE (e.g., CIOS Regional (ViBE) 326, Worker 328, Deployment Orchestrator 330) instead of components of the Host Region 332 service enclave (e.g., CIOS Regional 314 and Deployment Orchestrator 317). The deployment operations may generally correspond to steps 17-22 described above.

As a service is deployed from the ViBE 316 to the Target Region 334, the DNS record associated with that service may correspond to the instance of the service in the VIBE 316. The DNS record associated with the service may be updated at any suitable time to complete deployment of the service to the Target Region 334. Said another way, the instance of the service in the ViBE 316 may continue to receive traffic (e.g., requests) until the DNS record is updated. A service may deploy partially into the Target Region 334 and publish information indicating a capability (e.g., to Capabilities Service 318) that the service is partially deployed. For example, a service running in the ViBE 316 may be deployed into the Target Region 334 with a corresponding compute instance, load balancer, and associated applications and other software, but may need to wait for database data to migrate to the Target Region 334 before being completely deployed. The DNS record (e.g., managed by DNS 322) may still be associated with the service in the ViBE 316. Once data migration for the service is complete, the DNS record may be updated to point to the operational service deployed in the Target Region 334. The deployed service in the Target Region 334 may then receive traffic (e.g., requests) for the service, while the instance of the service in the ViBE 316 may no longer receive traffic for the service.

At any suitable time during method 300, Puffin Regional 209 may receive and/or obtain alarm data from one or more alarm services (e.g., the alarm service(s) 344, an example of the alarm service(s) 122 of FIG. 1). In some embodiments, the alarm data may be processed by Puffin Regional 342 (or Puffin Regional 342 may communicate the alarm data or data derived from the alarm data to Puffin Central 340). In some embodiments, Puffin Regional 342 and/or Puffin Central 340 may communicate skill health information to Orchestrator 310 indicating corresponding health states associated with one or more skills. In some embodiments, Puffin Regional 342, Puffin Central 340, and/or Orchestrator 310 may be configured to execute operations that pause or otherwise halt any suitable portion of the operations discussed above in connection with the method 300. In some embodiments, Puffin Regional 342, Puffin Central 340, and/or Orchestrator 310 may be configured to resume and/or execute any suitable portion of the operations of method 300 (e.g., based at least in part on user input, subsequent alarm data indicating an update to a health state associated with one or more skills, based at least in part on a skill health override value, or the like).

Figure 4:
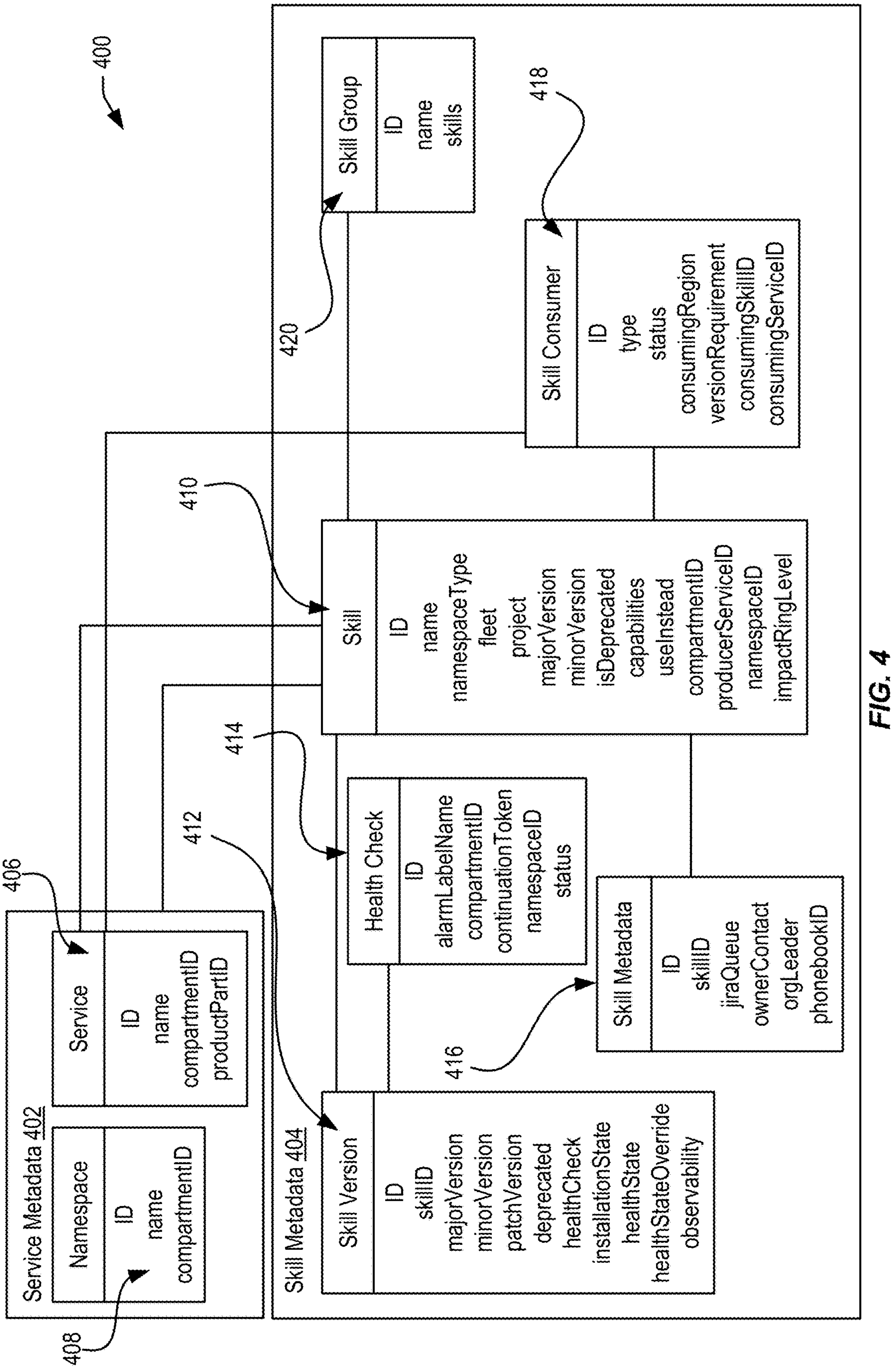
FIG. 4 is a block diagram depicting a data model representing various metadata related to a skill, in accordance with at least one embodiment.

FIG. 4 is a block diagram depicting a data model 400 representing metadata related to a skill, in accordance with at least one embodiment. Each of the data structures depicted in FIG. 4 may include an ID (e.g., an identifier) that uniquely identifies the data structure. This ID may be used to refer to a particular instance of a particular data structure.

In some embodiments, service metadata 402 may include any suitable data corresponding to a service. Service metadata 402 may include any suitable attribute and corresponding value of a service, while skill metadata 404 may similarly include any suitable attribute and corresponding value of a skill. An association between service metadata 402 and skill metadata 404 may indicate a relationship between a service and a skill (e.g., that the service is expected to publish the skill during build or run time). As depicted in FIG. 4, service metadata 402 may be stored in multiple data structures (e.g., namespace data structure 408 and service data structure 406), although any suitable number or type of data structures may be utilized. The service metadata may include, but is not limited to, and suitable combination of ID, a service name (corresponding to a name of the service), a compartment ID (corresponding to an identifier for a compartment to which the service is to be deployed), a product part ID, a namespace ID (an identifier of a namespace associated with the service), a namespace name (a name associated with the namespace associated with the service), and/or a compartment ID corresponding to the namespace. In some embodiments, service metadata 402 may be curated (read from memory, uploaded to Puffin Central 118 of FIG. 1, or the like). In some embodiments, service metadata 402 may be obtained by Puffin Central 118 from another system or, generally, using a process that does not include user input of that information through any of the user interfaces provided by Puffin Central.

Skill metadata 404 may include any suitable number of data structures (e.g., data structures 410-420). In some embodiments, skill data structure 410 may include attributes and values corresponding to any suitable combination of a skill ID, a skill name, a skill fleet, a major version, an isDeprecated indicator, one or more capabilities (e.g., a set of capability identifiers), a useInstead indicator, a compartment ID, a producer ID, a namespace ID, and a recovery ring level. In some embodiments, the values stored for compartment ID, producer ID, and/or namespace ID in the skill data structure 410 may match the compartment ID, service name, or namespace name of service metadata 402, respectively. A match between one or more of the values of these attributes may be used as an association between skill metadata 404 and service metadata 402 (indicating that the corresponding service is expected to publish the skill at some point).

Skill version data structure 412 may be associated with skill data structure 410 based at least in part on matching values of skill ID of skill version data structure 412 and ID of skill data structure 410. Skill version data structure 412 may include attributes and values corresponding to any suitable combination of an ID (for a skill version), a skill ID (e.g., a unique identifier of the skill), a major version and/or a minor version that individually or collectively identify a particular implementation of the skill, a patch version (e.g., a version identifier that identifies a skill to be used to correct a previously erroneous skill version), a deprecated indicator (indicating whether the skill is deprecated or not), a health check attribute (that references one or more instances of alarm data of one or more instances of health check data structure 414), an installation state (indicating a state of installation such as declared, selected, installing, installed, embargoed, retired, uninstalling), a health state (e.g., indicating the health of the skill such as unknown, healthy, unhealthy, etc.), and an observability attribute. The observability attribute may be used to store any suitable data identifying operations or datapoints required to gather telemetry, alarm, and/or log data for the skill version. Skill version data structure 412 may be associated with health check data structure 414 which may be configured to maintain any suitable number of alarm labels that is/are associated with the skill. By way of example, the healthCheck attribute of skill version data structure 412 may reference any suitable number of health check data structures corresponding to one or more instances of health check data structure 414.

In some embodiments, the health check data structure 414 may include any suitable combination of an alarm identifier (alarm ID, indicating a unique identifier for the alarm), an alarm label name (a name of the alarm), a compartment identifier (compartment ID, indicating a compartment to which the alarm is scoped), a continuation token (a token with which alarm transition history may be obtained), namespace identifier (namespace ID, indicating a particular namespace to which the alarm is scoped), and a status value (indicating a health status corresponding to the alarm). Alarm data corresponding to multiple alarms may be maintained in the health check data structure 414. By way of example, alarm ID may include a list of multiple alarm IDs corresponding to a list of alarm label names stored within the alarm label name attribute. The compartment ID attribute may also be a list of compartment IDs corresponding to the alarms and labels of the alarm ID and alarm label name ID attributes of the health check data structure 414. In some embodiments, multiple sets of attributes alarmID, alarmLabelName, compartmentID, continuation Token, and status may be stored, with each set of attributes corresponding to a single alarm.

In some embodiments, health check data structure 414 may store data corresponding to one or more alarm service(s) (e.g., the alarm service(s) 344 of FIG. 3, the alarm service(s) 122 of FIG. 1). By way of example, the namespace identifier of health check data structure may store a namespace corresponding to a skill (e.g., corresponding to an instance of skill data structure 410). In some embodiments, an association between a skill and an alarm may be maintained based at least in part on storing the same namespace identifier within the namespace ID attribute of an instance of the health check data structure 414 and the namespace ID attribute of an instance of the skill data structure 410. In some embodiments, the status attribute may store a value indicating the health of a skill and/or a status of an alarm (e.g., an alarm identified by alarmID, an alarm identified by namespaceID, etc.). In embodiments, in which status from multiple alarm services are utilized, multiple status attributes may be employed to maintain the status of each corresponding alarm (e.g., one status for an alarmID, another for a namespaceID, etc.).

Skill data structure 410 may be associated with skill metadata data structure 416. Skill metadata data structure 416 may include attributes and values for any suitable combination of an ID (for an instance of the skill metadata data structure 416), a Jira queue, an owner contact, an org leader, and a phonebook ID. A phonebook ID may be an identifier corresponding to a separate system that is configured to store contact data. Skill metadata data structure 416 may be used to store any suitable contact data (e.g., name, email, address, phone number, etc.) for an entity (e.g., a service team member) that is associated with the skill and the service with which the skill is associated.

Skill data structure 410 may be associated with skill consumer data structure 418. Skill consumer data structure 418 may include attributes and values for any suitable combination of an ID (for the skill consumer), a type, a status, a consuming region, a version requirement, a consuming skill ID, a consuming service ID. Skill consumer data structure 418 may be configured to store any suitable information on services and/or skills which depend on the skill defined by skill metadata 404.

Skill data structure 410 may be associated with skill group data structure 420. Skill group data structure may include attributes and values for any suitable combination of an ID (for the skill group), a skill group name, and a set of one or more skill IDs associated with the skill group.

Each of the data structures 406-420 may be stored in one or more data stores and a data structure may be identified and obtained (e.g., via a lookup and/or query operation) based at least in part on a value stored in another data structure through the associations discussed above. By way of example, all skills associated with a service may be identified through a query of the data store(s) for all skill data structures that are associated with a producer ID matching the ID from service data structure 406 of service metadata 402.

Although a number and particular combination of data structures are presented in FIG. 4, any suitable number or type of attributes and/or values and/or data structures may be utilized. In some embodiments, data of any data structure depicted in FIG. 4 may be separated into multiple data structures or combined and stored in fewer data structures than those depicted in FIG. 4. The associations indicated between those data structures may be similar to those shown in FIG. 4, or the associations may differ. As a non-limiting example, the data depicted with data structures 410-420 may be similarly stored in more or fewer data structures. By way of example, the data depicted within data structures 410-420 may be provided in a single data structure in some embodiments.

Each data structure of FIG. 4 may be associated with other data structures of FIG. 4 based at least in part on referencing an identifier of one or more other data structures. By way of example, an instance of skill version data structure 412 may be associated with a particular instance of skill data structure 410 based at least in part on having a value for the skillID attribute of the skill version data structure 412 that matches the value of the ID attribute of the particular instance of the skill data structure 410. As another example, a skill consumer data structure 418 may be associated with a skill based on referencing the ID of the skill data structure 410 within its consumingSkillID attribute. As another example, an instance of skill group data structure 420 may be associated with one or more instances of the skill data structure 410 based on referencing the IDs of those skills with its skills attribute. As yet another example, skill version data structure 412 may reference one or more instances of health check data structure 414 based at least in part on references the IDs of those health check data structures within its healthCheck attribute. An instance of the skill data structure 410 may be associated with a particular service based at least in part on referencing the ID of the service data structure 406 corresponding to the service via its producerServiceID attribute.

Any suitable number of instances of skill metadata 404 (corresponding to individual skills) may be associated with a single instance of service metadata 402 and may be used to represent a process of deploying the service in which the order of deployment tasks is represented via the instances of skill metadata 404. Each skill corresponding to an instance of skill metadata 404 for a service may be tracked, updated, or otherwise analyzed to present information regarding the deployment process for the service, to drive deployment of the service, to validate a build plan or the Build Dependency Graph 338 of FIG. 3, or the like.

Figure 5:
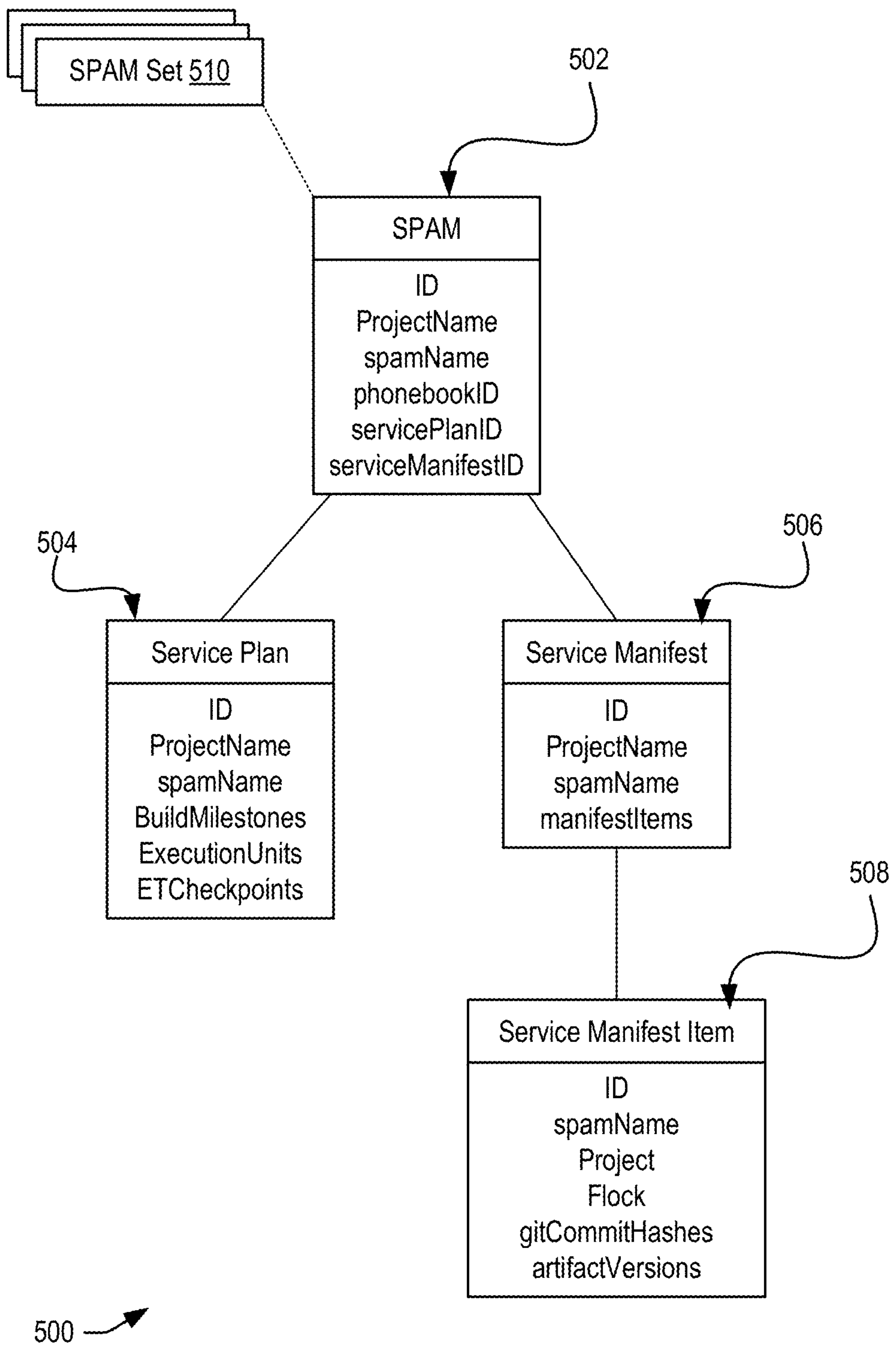
FIG. 5 is a block diagram depicting a data model representing various metadata associated with a SPAM, in accordance with at least one embodiment.

FIG. 5 is a block diagram depicting a data model 500 representing various metadata associated with a SPAM (e.g., a service plan and manifest), in accordance with at least one embodiment. Each of the data structures 502-508 may any suitable number of attributes (pictured) with corresponding values. These data structures may be identified within a common file or any suitable number of files. The SPAM may be maintained within the data structures depicted in FIG. 5 or different data structures. The data structures of FIG. 5 may be combined or separated in any suitable manner to maintain metadata corresponding to the SPAM.

A SPAM may be represented by a combination of the data structures (e.g., data structures 502-508) depicted in FIG. 5. Each of those data structures may include an ID (e.g., an identifier) with a corresponding value that uniquely identifies the data structure. This ID may be used to refer to a particular instance of a particular data structure. Each of the data structures 502-508 may include an attribute corresponding to a "spamName" that may be used to maintain an association between the data structures 502-508 (e.g., to indicate each of the data structures 502-508 correspond to the same SPAM). Any suitable number of SPAMs may be combined and collectively referred to as a SPAM set, an example of which incudes SPAM set 510.

In some embodiments, SPAM data structure 502 may include any suitable data corresponding to a SPAM. Any suitable portion of SPAM data structure 502 may be included in service plan data structure 504 and/or service manifest 506. As depicted in FIG. 5, SPAM data structure 502 includes a phonebookID attribute. A corresponding value for this attribute may identify a service and/or contact that is identified as an owner of the SPAM. In some embodiments, the value corresponding to the attribute "phonebookID" may be an identifier corresponding to a separate system or database configured to maintain contact information for service teams. The value for phonebookID may be used as a lookup value to retrieve corresponding contact information (e.g., an email, a service team name, a phone number, or the like) for a service that owns the SPAM corresponding to SPAM data structure 502. SPAM data structure 502 may include corresponding IDs identifying particular instances of a service plan data structure (e.g., service plan data structure 504) and a service manifest (e.g., service manifest 506) via attributes "servicePlanID" and "serviceManifestID," respectively. Thus, in some embodiments, SPAM data structure 502 maintains a mapping between a service plan (represented by service plan data structure 504) and a manifest (represented by service manifest data structure 506).

The service plan data structure 504 may represent a service plan and the entities included in a service plan. Service plan data structure 504 may include a "buildMilestones" entity with a corresponding value that includes an ordered list of build milestone identifiers (e.g., names, alphanumeric strings, etc.). The "buildMilestones" attribute may identify, include, or otherwise correspond to the build milestones entity 600 of FIG. 6.

FIG. 6 is a block diagram depicting a build milestone entity 600 of a service plan and manifest, in accordance with at least one embodiment. Build milestones entity 600 may identify any suitable number of build milestones corresponding to a service build. As depicted in FIG. 6, build milestones entity 600 identifies four build milestones corresponding to code segments 602-608.

Code segment 602 identifies a build milestone entitled "absent," a corresponding description, and a list of capability publications indicating the capabilities that should (and in some instances, must) be published prior to transitioning to this build milestone (also referred to as "capability dependencies" or the capabilities on which this build milestone depends). The list of capability publications, in this instance, is empty, indicating that no capability publications are expected prior transitioning to the build milestone "absent."

Code segment 604 identifies a build milestone entitled "service-partial," a corresponding description, and a list of capability publications indicating the capabilities that should (and in some instances, must) be published prior to transitioning to this build milestone. The list of capability publications, in this instance, includes "serviceA_namespace", indicating that publication of the "serviceA_namespace"

capability is expected/required before to transitioning to the build milestone "service-partial" may occur.

Code segment 606 identifies a build milestone entitled "service-available," a corresponding description, and a list of capability publications indicating the capabilities that should (and in some instances, must) be published prior to transitioning to this build milestone. The list of capability publications, in this instance, includes "serviceA_backend," indicating that publication of the "serviceA_backend" capability is expected/required before transitioning to the build milestone "service-available" may occur.

Code segment 608 identifies a build milestone entitled "complete," a corresponding description, and a list of capability publications indicating the capabilities that should (and in some instances, must) be published prior to transitioning to this build milestone. The list of capability publications, in this instance, is empty indicating that no capability publications are expected prior to transitioning to the build milestone "complete" may occur.

In some embodiments, each build milestone specifies the capabilities publications that the service should have published before reaching a particular build milestone. A set of build milestones may indicate a high-level overview of a process for building a service and may be utilized/consumed by external consumers (e.g., other services that depend on the service to which the build milestones relate). Build milestones may be defined and utilized to express portions of functionality are available for the service. This may allow other service builds to proceed when the functionality on which the other service depends is available, rather than waiting for the service in question to become fully available. Build milestones may be used for coordination between services. When building a service does not involve coordination with other services, the service plan for that service may include no build milestones or a number of default build milestones (e.g., "absent" and "complete"). In some embodiments, the build milestones defined in every service plan to be used for a region build may be used to generate a high-level graph and/or sequencing diagram. This may provide service teams a graph view of simplified complexity with which the region build process may be more easily understood and synthesized. As a non-limiting example, a graph/diagram generated using the build milestones for each corresponding service may include a reduced number of nodes (e.g., 3 per service, 4 per service, depending on the service's build milestone implementation) from the Build Dependency Graph 338 of FIG. 3 that may include dozens of nodes (representing capabilities) per service.

Returning to FIG. 5, the service plan represented by service plan data structure 504 may include an Execution Unit entity. As depicted, the service plan data structure 504 includes an "ExecutionUnit" attribute with a corresponding value that includes a set of execution units. Each execution unit may be used to describe how a service transitions from one build milestone to the next. An execution unit may describe a directed acyclic graph of releases that need to be performed. The definition of this graph centralizes the definition of how releases (e.g., flock/phase/changeType (e.g., Infra or App) interact. The order of execution units may be driven by the order of build milestones defined in a corresponding build milestones entity.

FIG. 7 depicts an example execution unit entity 700 of an example service plan, in accordance with at least one embodiment. Execution unit entity 700 may identify any suitable number of execution units (e.g., one for each transition between ordered pairs of build milestones identified by a corresponding build milestone entity such as build milestone entity 600 of FIG. 6). FIG. 7 depicts two such transitions (e.g., a transition between build milestones "absent" and "service-partial" and another transition between build milestones "service-partial" to "service-available"). Another execution unit may be defined for a transition between build milestones "service-available" and "complete," but is not depicted in FIG. 7 for brevity. As the build milestones are defined as having a sequential order, so too are the execution units due to their association to the ordered build milestones.

As depicted in FIG. 7, execution unit entity 700 includes execution unit 702 and execution unit 704. Execution unit 702 may correspond to the transition between build milestones "absent" and "service-partial." Execution unit 704 may correspond to the transition between build milestones "service-partial" and "service-available." Additional execution units may be included in execution unit entity 700 but not depicted in FIG. 7.

Each execution unit may include one or more external capability dependencies. By way of example, execution unit 702 specifies external capability dependencies on a set of external capability dependencies as depicted at 705. These external capability dependencies may include one or more capabilities that should (or in some instances, must) be published prior to transitioning from one build milestone (e.g., the "absent" build milestone) to another (e.g., the "service-partial" build milestone). The set of external capability dependencies may be the union of external capabilities requirements for all releases defined in the step section of the corresponding execution unit. As depicted in FIG. 5, the external capability dependencies are indicated as including capabilities "certificate_service_ready" and "capability_service_ready." Any suitable number of external capability dependencies may be specified. In some embodiments, an execution step may include no external capability dependencies.

Each execution unit may indicate one or more capabilities that are expected to be published when execution of the releases corresponding to the execution unit have been completed. By way of example, execution unit 702 specifies a set of capability publications at 707 indicating a superset of all capabilities that are expected to have been published once execution of the releases indicated in step section 706 have been completed. The capability publications may be additionally or alternatively defined as being associated with the build milestone to which the execution relates.

Each execution unit may include any suitable number of steps (or groups of steps) that, when executed, move the service from one build milestone to another. By way of example, execution unit 702 specifies step section 706 which includes an InfraAppPair step type. An InfraAppPair step specifies one or more infrastructure releases expressed using an ET alias (e.g., ET: Alias flock_DP/phase_DP/alarms_et) and flock/phase execution target (ET) transition (e.g., Transition: absent→DP_complete_alarms_infra). Each release reference may denote, for each ET alias, the ET checkpoint transition being made with the release. In some embodiments, the Orchestrator (e.g., Orchestrator 106 of FIG. 1) may be configured to enforce that infrastructure releases defined in an InfraAppPair step are executed prior to releases defined in a corresponding App section of the same InfraAppPair step. In the example provided in FIG. 7, the releases corresponding to transitions absent→DP_complete_alarms_infra and absent→DP_initial_region infra may be executed prior to the application releases corresponding to absent→DP_complete_alarms_app and absent→DP_initial_region_app, as specified in step section 706. In some embodiments, the Orchestrator may create a directed acyclic graph or another suitable ordered execution plan that orders the infrastructure releases before the application releases defined in an InfraAppPair step type. In some embodiments, execution targets of different phases may not be included in the same InfraAppPair step and/or ET ordering is required to reflect the order defined in a corresponding flock config if an ordered is imposed in that flock config.

Other step types may be utilized. For example, a parallel step type may be used if region build phases have no dependencies between one another and may be executed in parallel (e.g., substantially simultaneously, concurrently, and/or overlapping execution) should their external dependencies be resolved at substantially the same time. A serial step type may be used if two distinct phases (e.g., with distinct names) have a direct dependency between one another (e.g., the corresponding releases of which are expected to be executed serially).

All of the expected publications of a build milestone (e.g., the build milestone that is transitioned to) may be published when all of the releases of a corresponding execution unit that caused the transition are complete. By way of example, the capability "serviceA_namespace" may be published upon transitioning to build milestone "service-partial" as indicated in Code segment 604 of FIG. 6.

As another example, execution unit 704 includes step section 708 which includes multiple InfraAppPair step types, each of which includes one or more infrastructure releases and application releases. These InfraAppPair steps may be grouped and ordered using a serial step type as indicated at 710.

Figure 8:
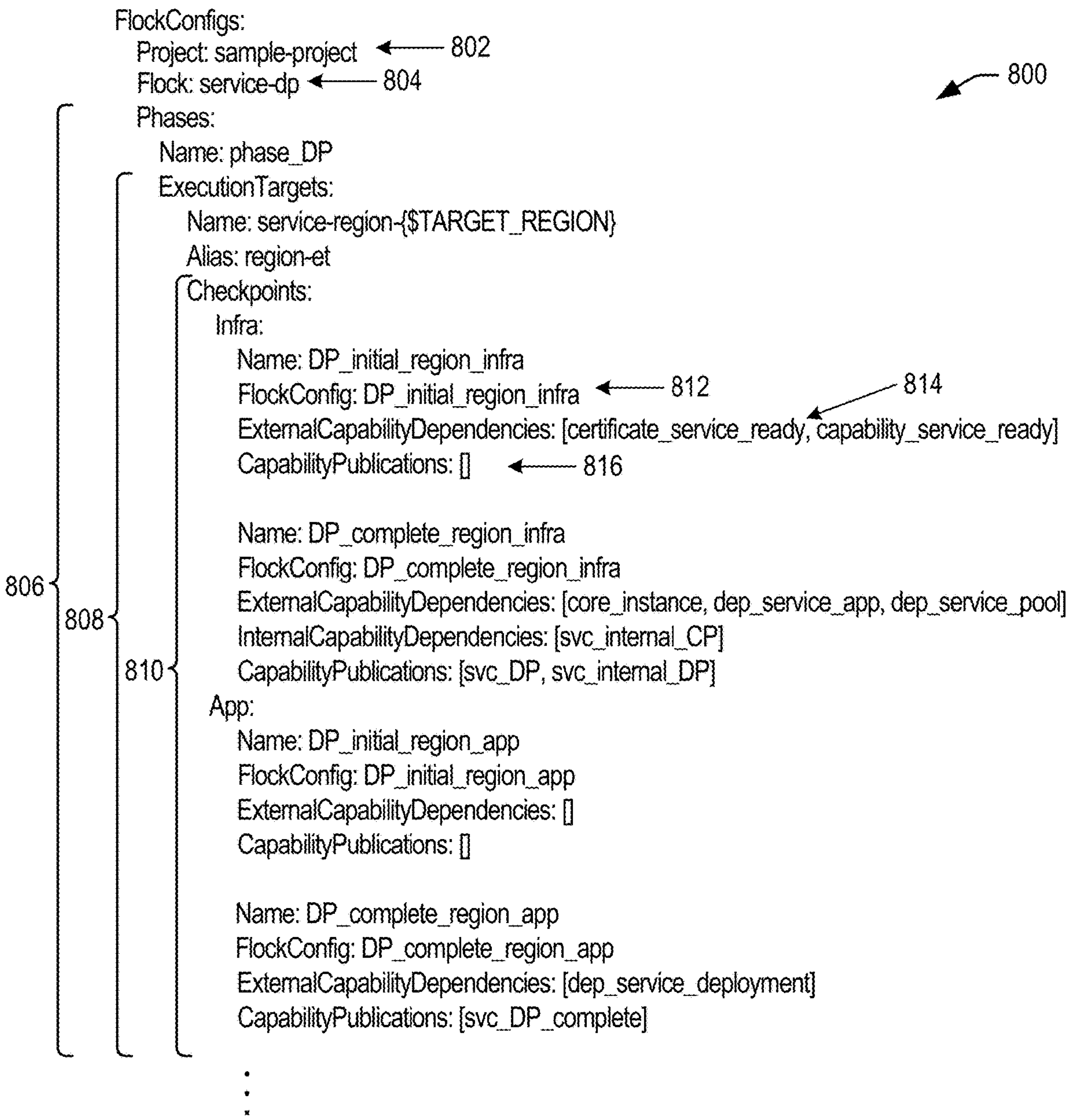
FIG. 8 depicts an example flock config entity of an example service plan, in accordance with at least one embodiment.

FIG. 8 depicts an example flock config entity 800 of an example service plan, in accordance with at least one embodiment. The flock config entity 800 may be used to specify the generalized configuration of the releases expressed in the execution unit entity 700 of FIG. 7. The specifications for all the execution units included in the installation process may be indicated here. Flock config entity 800 may indicate any suitable number of projects (e.g., a project "sample-project," identified at 802) and any suitable number of flocks for each project (e.g., a flock "service-dp," identified at 804). Any suitable number of phases may be defined for each flock within phase section 806. Similarly, any suitable number of execution targets may be defined for each phase within execution target section 808. Each execution target section may include any suitable number of execution target (ET) checkpoints defined within checkpoints section 810. In some embodiments, the service plan including flock config entity 800 may be validated to ensure that all references included in the service plan reference valid components (e.g., components managed by CIOS 102 of FIG. 1).

Checkpoints section 810 may define any suitable number of checkpoints. These checkpoints may be grouped by type (e.g., "Infra" indicating an infrastructure change type, "App" indicating an application change type), as depicted, or each checkpoint may indicate a corresponding change type. In some embodiments, the order by which the checkpoints are provided within checkpoints section 810 may define an order by which the checkpoints are executed. In some embodiments, when the checkpoints indicate a corresponding change type, infrastructure change related releases may be ordered ahead of any application change related releases, even when an application change related release is listed within checkpoints section 810 in a position ahead of an infrastructure release. Each checkpoint may indicate a corresponding flock configuration file as depicted at 812, external and/or internal capability dependencies as depicted at 814, and capability publications as depicted at 816 for each release. Providing these mappings within the flock config entity 800 enables the execution unit entity 700 of FIG. 7 to be simplified. The flock config entity 800 may be used to map execution unit steps that refer to an ET checkpoint of flock config entity 800 to CIOS managed components (e.g., flock config files) that define the releases. Providing this mapping within flock config entity 800 simplifies the execution unit entity 700 of FIG. 7.

One of the challenges of previous build implementations is understanding what progress should happen each time a release is executed against a particular phase and change type of a flock, particularly when the phase has optional capability dependencies. For each release that the Orchestrator (e.g., Orchestrator 106 of FIG. 1) initiated in previous implementations, it was not apparent which optional capability dependencies were needed and which capabilities should be published through the release execution. The ET checkpoints defined in flock config entity 800 may resolve this ambiguity by stating clear expectations of the capability dependencies and capability publications for each release of an execution target.

Figure 9:
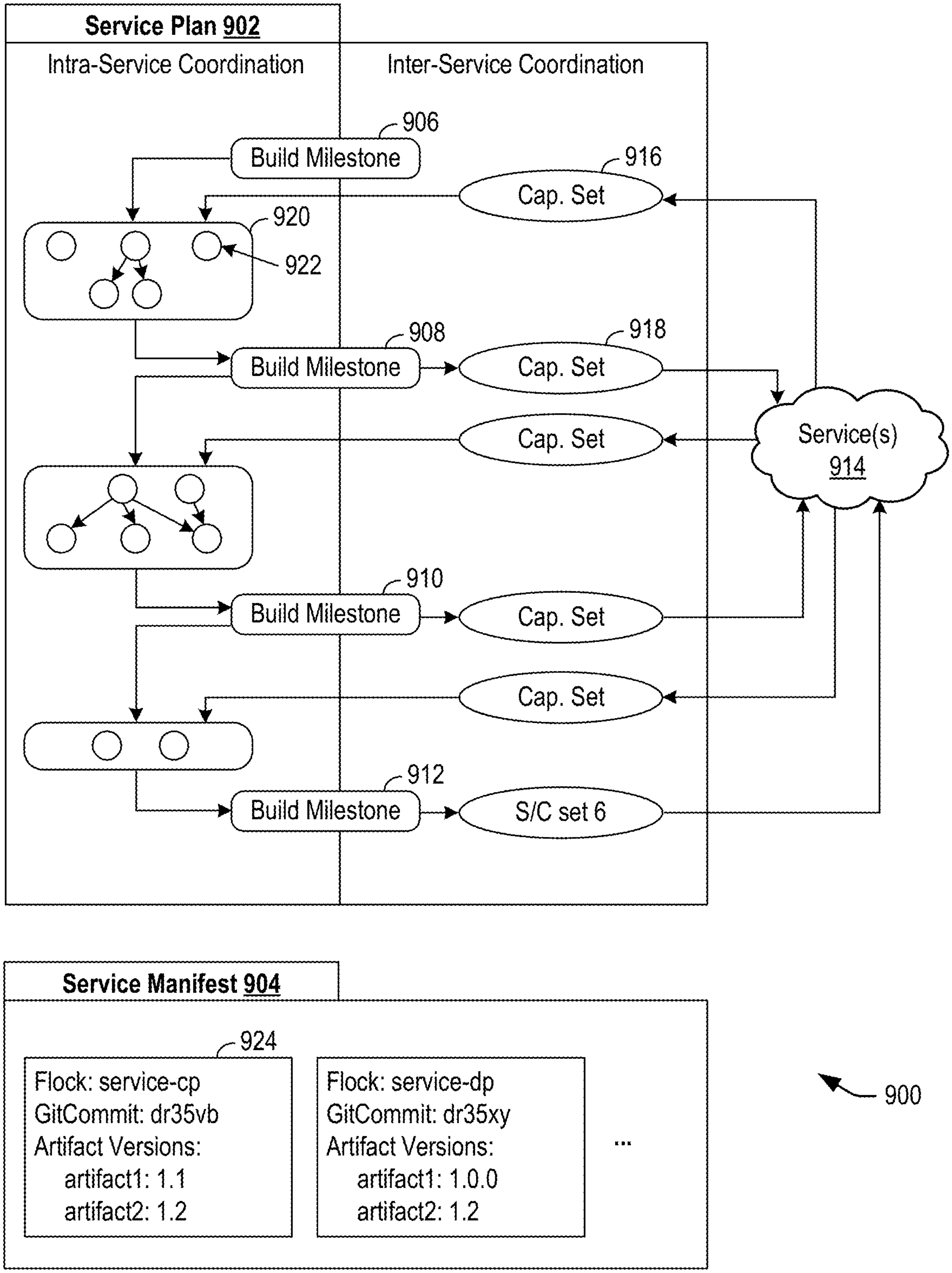
FIG. 9 is a block diagram depicting relationships between portions of a service plan and manifest, in accordance with at least one embodiment.

FIG. 9 is a block diagram 900 depicting relationships between portions of a service plan (e.g., service plan 902, an example service plan corresponding to service plan data structure 504 of FIG. 5) and manifest (e.g., manifest 904, an example of service manifest corresponding to service manifest 506 of FIG. 5), in accordance with at least one embodiment.

The service plan 902 may include any suitable combination of the build milestones entity 600 of FIG. 6, the execution unit entity 700 of FIG. 7, and the flock config entity 800 of FIG. 8. In some embodiments, the service plan 902 indicates a service build implementation at different levels of granularity. The highest level of granularity indicates the build milestones (e.g., build milestones 906-912, defined with a corresponding build milestone entity similar to build milestone entity 600). The service plan 902 may be used specify a service build to a sequence of build milestones that the service progresses through during its build. Each milestone may represent an interaction that occurs between a given service and other services (e.g., publishing a capability that unblocks other services from building, and/or consuming a new capability published by another service). These build milestones may be used to understand a high-level picture of how that service builds and the inter-service coordination required for that service without having to understand all the services' flocks and their service-internal coordination.

Build milestones 906-912 may individually be associated with a set of external capabilities on which transitioning to the build milestone depends. These capabilities may include the expected published capabilities that are relevant for external services (e.g., service 914, including the other services of the region build). As a non-limiting example, build milestone 906 may depend on capabilities set 916 (including one or more capabilities) as defined in a corresponding execution unit transition specifying a transition to build milestone 906. Build milestones 906-912 may be associated with the publication of capabilities that are required to start/continue the installation of another service. By way of example build milestone 908 may be associated with capabilities set 918, including one or more capabilities that are expected to be published prior to transitioning to build milestone 908. In some embodiments, build milestones may be used to generate a high-level sequencing diagram that may be used to identify progress in a region build.

Each build milestone may be associated with a corresponding execution unit. By way of example, build milestone 906 may be associated with execution unit 920 (corresponding to an instance of execution unit entity 700 of FIG. 7). Each execution unit, including execution unit 920, may include any suitable number of releases such as release 922, and an order by which these releases are to be executed. Each release may be expressed within the execution unit as an execution target checkpoint transition. The corresponding execution target checkpoint transition may indicate external and/or internal capabilities dependencies for the transition/release and may provide a mapping to a corresponding flock config identified in the service manifest 904. By way of example, release 922 may be ultimately mapped to a particular flock config using the service manifest item 924. The service manifest item 924 may be identified by an identifier provided in the execution target checkpoint referenced by the execution unit 920 and corresponding to the release 922.

Using the entities of the service plan, one or more acyclic graphs may be generated. As a non-limited example, a directed acyclic graph defining the service build may be generated. This DAG may be referred to as a "service DAG" and may include any suitable number of nodes representing a corresponding release and an order by which those releases are to be executed to build that service. The nodes themselves, or edges between nodes, may be associated with external and/or internal capability dependencies. In some embodiments, a graph, list, sequence diagram, or any suitable data structure may be generated for a service and/or for any suitable number of services of the region build using the build milestones corresponding to the service(s). This data structure may be referred to as a "milestone plan." As yet another example, the Build Dependency Graph 338 of FIG. 3 may be generated using the service plan (e.g., as part of a SPAM set including service plans and manifests corresponding to one or more services). As described above in FIG. 3, the Build Dependency Graph 338 may be used (e.g., by the Orchestrator 310 of FIG. 3) to drive region build operations (e.g., to execute a deterministic order of infrastructure and application releases for the region/data center).

In some embodiments, the service manifest 904 may be utilized to specify the flock versions and artifact versions that will be used to create releases for the execution targets specified in the service plan 902. The service manifest 904 may be used to validate the service plan 902 based at least in part on identifying that each release identified in the service plan 902 is included within the service manifest 904. In some embodiments, each service manifest item (e.g., service manifest item 924) may be mapped to a version set item such that service manifests may be used to validate a version set used by CIOS 102 to perform a region build. As a non-limiting example, a SPAM set may be constructed all SPAMs corresponding to services that are to be bootstrapped within a region/data center. The manifests of the SPAM set may be used to validate a version set, should one be used, to ensure that all flock config files and artifacts referenced in the SPAM set are included in the version set to be used to build the region.

Figure 10:
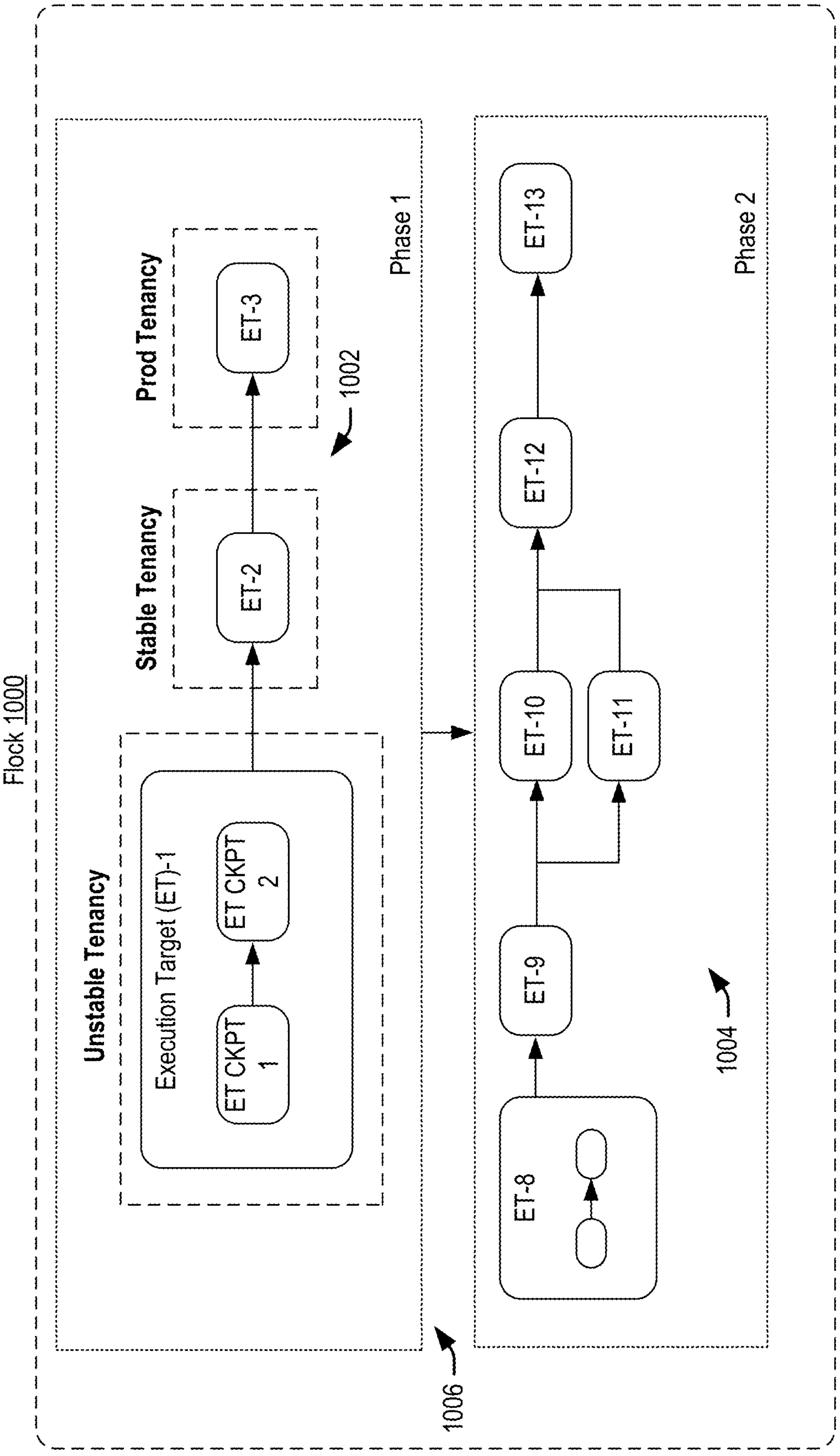
FIG. 10 is a block diagram depicting a relationship between a flock, a number of phases, a corresponding number of execution targets for each phase, and one or more execution target checkpoints of an execution target, according to at least one embodiment.

FIG. 10 is a block diagram depicting a relationship between a flock 1000, a number of phases, a corresponding number of execution targets for each phase, and one or more execution target checkpoints of an execution target, according to at least one embodiment. A flock (e.g., the resources of a service) may be provisioned and deployed to multiple execution targets. Each execution target with FIG. 10 is intended to depict a different location and/or set of devices at which the flock 1000 (e.g., resources corresponding to a service) is to be bootstrapped. By way of example, each execution target of FIG. 10 may depict a different data center or set of devices. For any given data center build (an example of which may be a "region build," referring to a data center build corresponding to a particular region context), a flock's resources (e.g., resources corresponding to a service) may be bootstrapped to any suitable number of execution targets. In some embodiments, bootstrapping operations for a set of execution targets may be associated with a "phase" and potentially multiple phases may be defined. Any suitable phase may be associated with a set of one or more execution targets. In some embodiments, an order by which bootstrapping operations are performed for set of execution targets (e.g., ET-1-ET-3, collectively referred to as "execution targets 1002") may be defined and associated with a phase (e.g., phase 1), while another set of execution targets (e.g., ET-8-ET-13, collectively referred to as "execution targets 1004") may be defined and associated with another phase (e.g., phase 2). In some embodiments, there may be a designated order by which phases are to be executed. One phase (e.g., phase 2) may be dependent on completion of the operations associated with another phase (e.g., phase 1). Similarly, one execution target (e.g., ET-2) may be dependent on operations corresponding to one or more other execution targets (e.g., ET-1) being completed. In some embodiments, a data structure (e.g., phase data structure 1006) may be generated by CIOS 102 of FIG. 1 to identify a set of phases (e.g., one or more) with which bootstrapping a given service across multiple execution targets is to be executed, where each phase is associated with one or more execution targets. Any suitable number of data structures (e.g., one or more directed acyclic graphs, linked lists, or the like) may be generated for identifying a set of execution targets (e.g., execution targets 1002) and an order by which bootstrapping the service across those set of execution targets is to be executed.

An execution target may be associated with a tenancy and region (e.g., unstable-tenancy/region1, stable-tenancy/region2, prod-tenancy/region3) as depicted in FIG. 10. In some embodiments, CIOS 102 of FIG. 1 may allow flocks to be modeled using many tenancies within a realm and many regions within a tenancy. However, CIOS 102 may disallow using the same region twice within a tenancy (although the same region may be utilized twice within a realm—in different tenancies). Although not depicted in FIG. 1, each of ET-8-ET13 may be associated with a corresponding tenancy and region.

Each execution target (e.g., ET-1) may be associated with one or more execution target (ET) checkpoints (e.g., ETCKPT-1 and ETCKPT-2). Phases (e.g., phase 1, phase 2, etc.), execution targets (e.g., ET-1-ET-13), execution target checkpoints may be defined and/or specified within flock config entity 800 of FIG. 8. ET checkpoints may be associated with a corresponding set of releases. ET checkpoints may be ordered (e.g., within an ordered list, or nested lists (e.g., Infra and App ordered lists), as depicted in FIG. 8) and each may represent a unit of progress of the execution target during build.

In some embodiments, Orchestrator 310 of FIG. 3 may maintain any suitable number of data structures (e.g., Build Dependency Graph 338 of FIG. 3, linked lists, directed acyclic graph(s), objects, or the like) for maintaining dependencies between flocks, phases, execution targets, execution target checkpoints, releases, and/or the like. Similarly, Orchestrator 310 may generate data structures for maintaining dependencies between build milestones, execution targets, execution target checkpoints, and/or releases.

Figure 11:
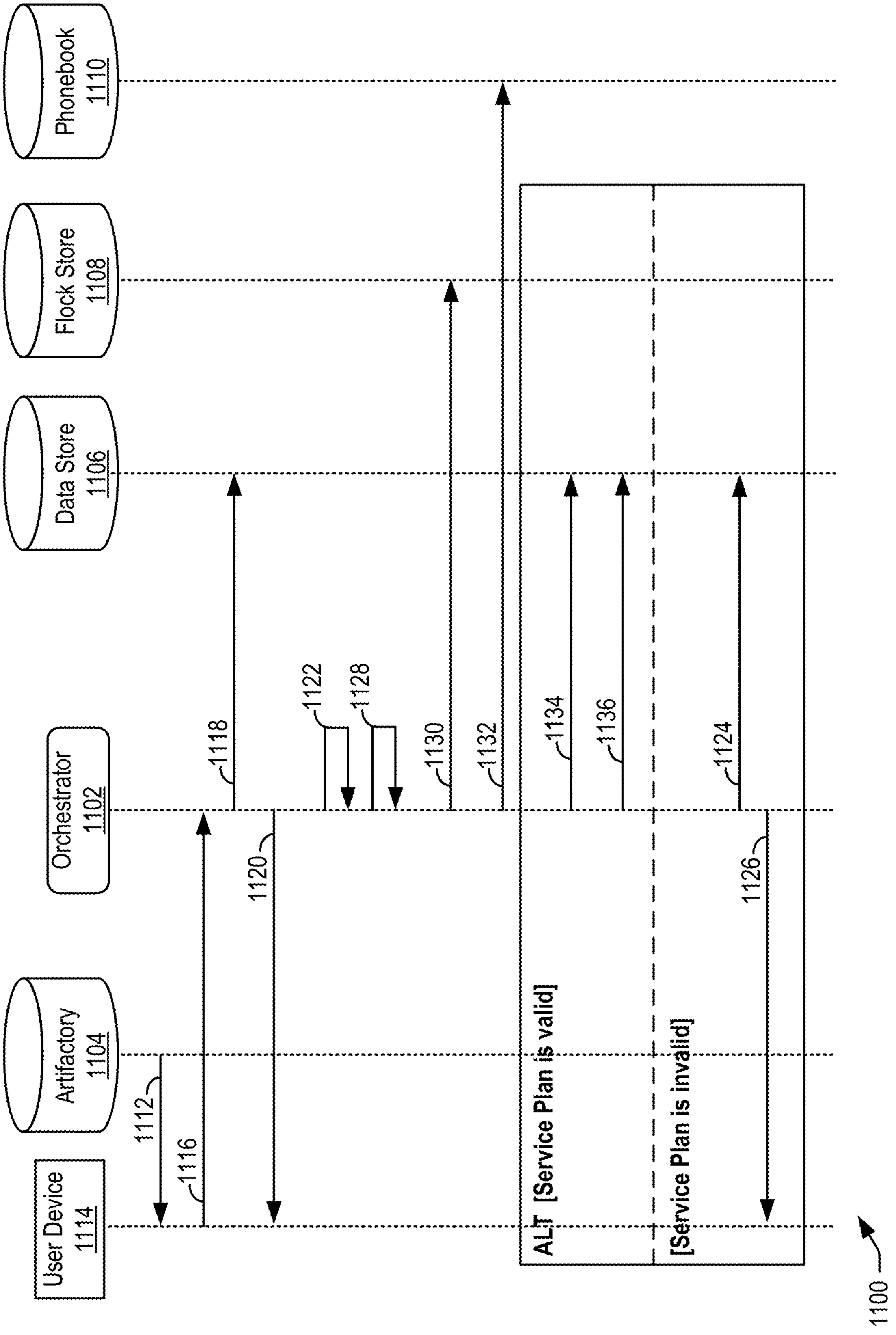
FIG. 11 is a flow diagram depicting a method for creating a service plan, in accordance with at least in one embodiment.

FIG. 11 is a flow diagram depicting a method 1100 for creating a service plan, in accordance with at least in one embodiment. The method 1100 may be performed by Orchestrator 1102 (e.g., Orchestrator 106 of FIG. 1). More or fewer operations than the ones described in connection with FIG. 11 may be included in method 1100. The operations of method 1100 may be performed in any suitable order. In some embodiments, Orchestrator 106 may interact with Artifactory 1104, data store 1106, flock store 1108, and phonebook 1110, each of which may be configured to store particular data as discussed further below.

Figure 12:
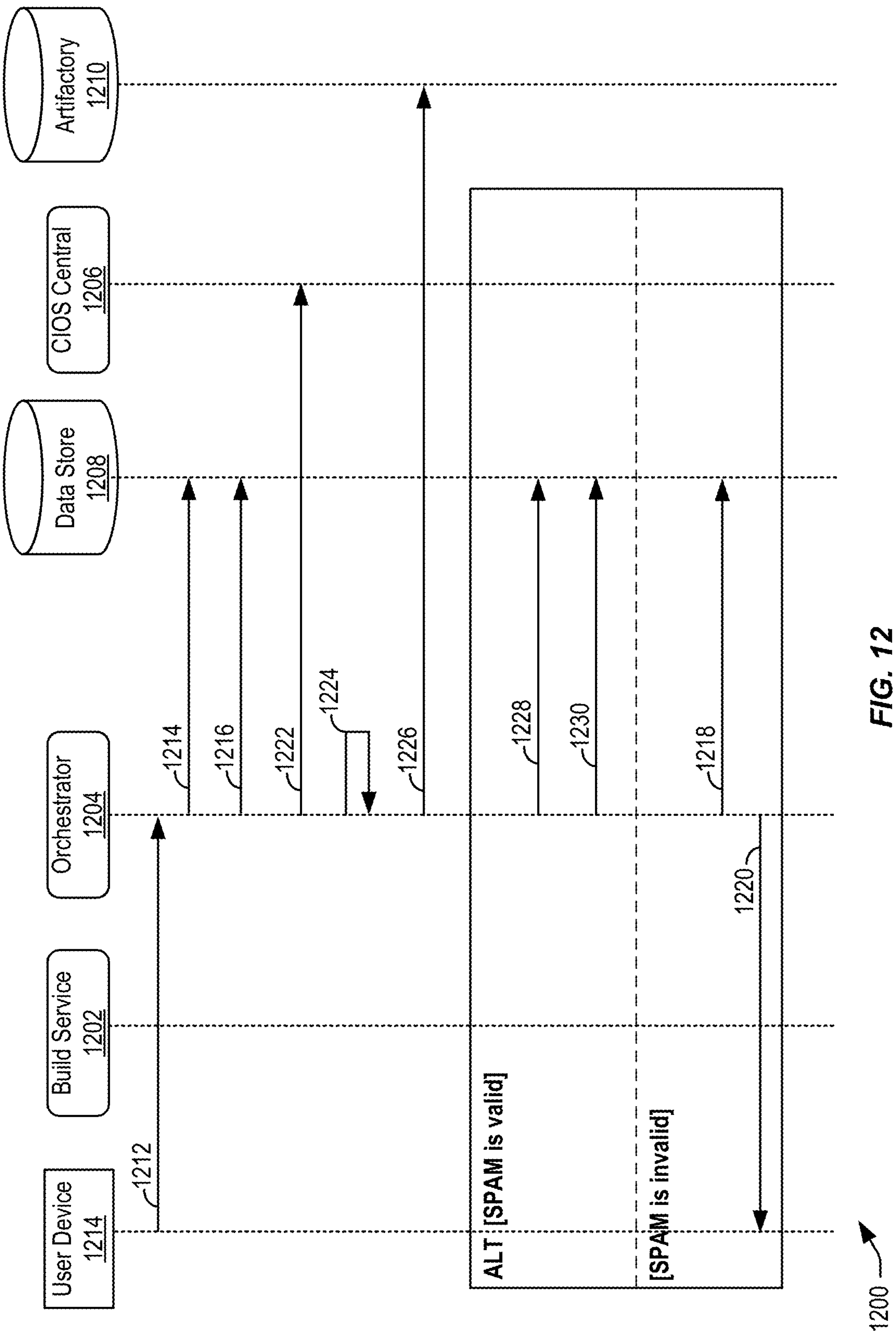
FIG. 12 is a flow diagram depicting a method for creating a service plan and manifest (SPAM), in accordance with at least in one embodiment.
Figure 18:
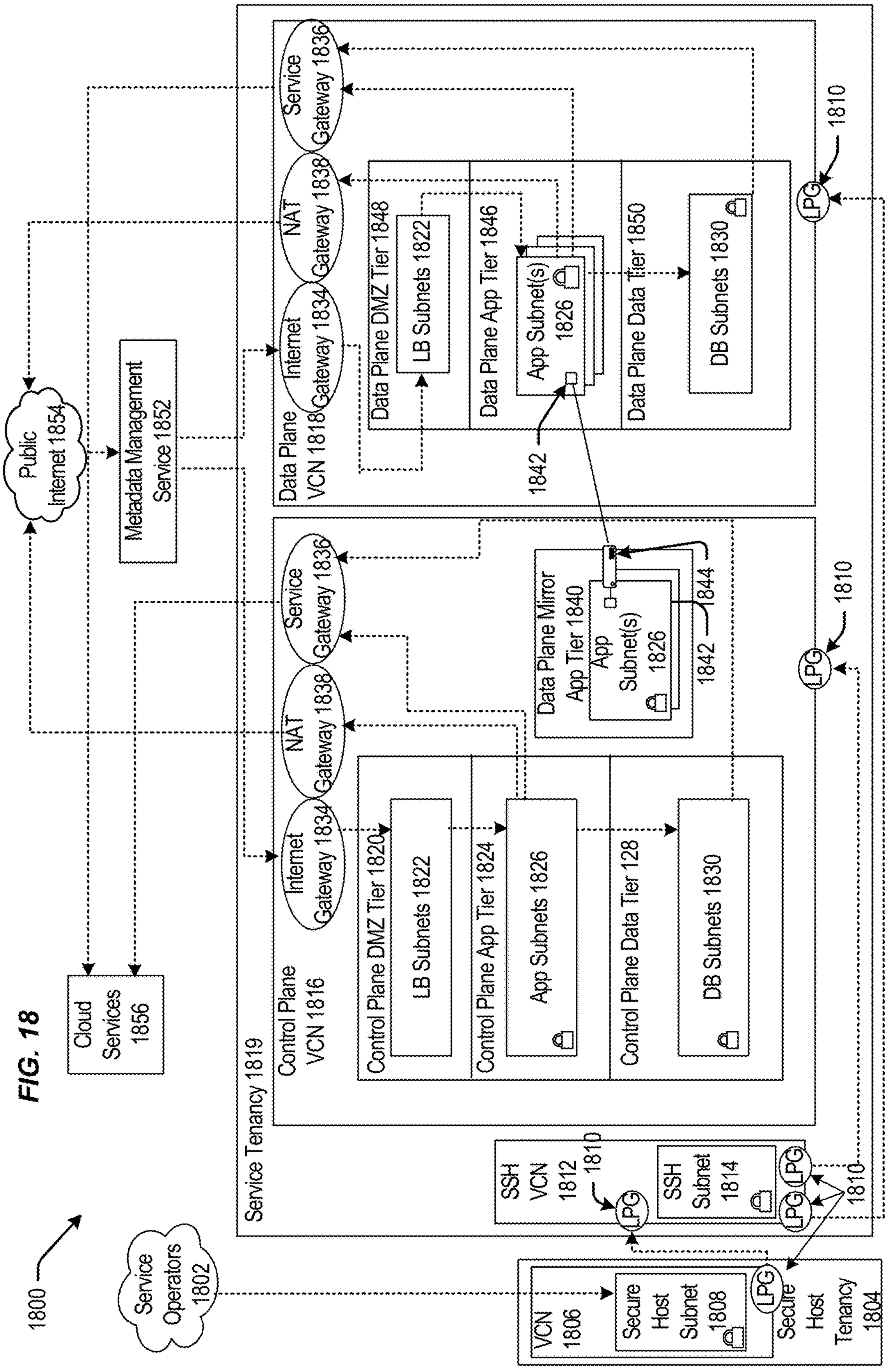
FIG. 18 is a block diagram illustrating one pattern for implementing a cloud infrastructure as a service system, according to at least one embodiment.

In some embodiments, service plans and manifests (SPAMs) (e.g., service plan 902 of FIG. 9 comprising entities 600-800 of FIGS. 6-8, respectively, and/or manifest 904 of FIG. 9) may be packaged and stored (e.g., Artifactory 1104, a repository manager configured to manage artifact, binaries, files, containers, and the like) at any suitable time in a data store and/or repository (e.g., by a build service (e.g., build service 1202 of FIG. 12, one of cloud service(s) 1856 of FIG. 18), by a user, etc.). In some embodiments, one or more SPAMs may correspond to a data center/region build. In some embodiments, Artifactory 1104 may be used to package and store service plans that have yet to be combined with a manifest.

Method 1100 may begin at 1112, where user device 1114 may be used to download/obtain a service plan archive (or service plan) from Artifactory 1104 (e.g., from a particular, specified path within Artifactory 1104). In some embodiments, the service plan archive may include an archive file (e.g., a zip, a tar, a tar.gz, a tgz file, etc. that includes the service plan) that includes the service plan (or service plans) corresponding to a particular data center/region build and any suitable metadata that is associated with the service plan. In some embodiments, the service plan may be represented by data service plan data structure 504 of FIG. 4 and the metadata may be represented by SPAM metadata 502 of FIG. 5. In some embodiments, the service plan and/or metadata may not yet be associated with a manifest (represented by manifest data structure 506 of FIG. 5). The user device 1114 may provide a command line interface (or a graphical interface) with which the service plan archive and/or service plan(s) may be obtained.

At 1116, the user device 1114 may transmit the service plan with its service plan Artifactory coordinate (e.g., a component/distribution/architecture coordinate or other look up value corresponding to the service plan(s)) to the Orchestrator 1102. In some embodiments, the service plan(s) and/or corresponding Artifactory coordinate(s) may be provided to the Orchestrator 1102 based at least in part on a command (or user selection) provided at a command line (or graphical) interface.

At 1118, Orchestrator 1102 may generate a work request ID, associate and store the work request ID with the service plan(s), metadata, and corresponding service plan coordinate(s) within data store 1106. Orchestrator 1102 may transmit the work request ID to the user 1114 at 1120 (e.g., via the command line/graphical interface).

At 1122, Orchestrator 1102 may execute operations to determine whether the service plan is consistent. This determination may include identifying whether data corresponding to one component (e.g., a build milestone entity, an execution entity, a flock config entity, or any suitable combination and/or portion of the above) matches data corresponding to another component (e.g., a build milestone entity, an execution entity, a flock config entity, or any suitable combination and/or portion of the above) of the service plan. By way of example, determining whether the service plan is consistent may include determining whether data corresponding to the build milestones defined in the service plan agree with data corresponding to the execution unit definitions. By way of example, Orchestrator 1102 may determine whether defined execution units (e.g., execution units 702, 704, of FIG. 7) of an execution unit entity of the service plan (e.g., execution unit entity 700 of FIG. 7) indicate build milestone names/identifiers (e.g., "From" and/or "To" attributes) that match those provided in a corresponding build milestone entity of the service plan. (e.g., build milestone entity 600 of FIG. 6). Orchestrator 1102 may determine whether the execution units define all possible (and potentially only) transitions between the sequential pairs of build milestones (e.g., absent to service-partial, service-partial to service-available, and service-available to complete as corresponding to the build milestones of FIG. 6). If transitions are missing (or extra transitions are present), the method may proceed to 1124, where Orchestrator 1102 may reject the work request. Rejecting a work request may include marking the work request as rejected at 1124 and/or transmitting a status indicating the rejection with the work request ID via the command line (or graphical) interface at 1126. If all (and potentially only) transitions between sequential pairs of build milestones are identified, the method 1100 may proceed to 1128.

At 1128 (or as part of determining whether the service plan is consistent at 1122), the Orchestrator 1102 may execute operations to determine whether concurrent releases against the same phase exist. Determining whether a concurrent release against the same phase exists may include parsing a flock config entity of the service plan (e.g., flock config entity 800 of FIG. 8) to identify whether a checkpoint section (e.g., checkpoint section 810) of a given phase includes two or more releases (e.g., with the same or different names) are defined as being able to execute concurrently. If so, the Orchestrator 1102 may be configured to reject the work request (e.g., including marking the work request rejected at 1124 and/or transmitting the status indicating the work request was rejected at 1126). Otherwise, the method 1100 may proceed to 1130.

At 1130, Orchestrator 1102 may execute operations to determine whether the flocks (e.g., flock configs) referenced in the service plan exist. By way of example, the Orchestrator 1102 may transmit a request to flock store 1108 to determine whether each of the flocks referenced in the service plan (e.g., including the flock config referenced at 810 of FIG. 8) are stored within flock store 1108. Flock store 1108 may be managed by CIOS Central 108 of FIG. 1, or flock store 1108 may be a separate data store configured to store flock configuration files. In some embodiments, flock store 1108 is an example of DB 312 of FIG. 3. If a flock config is referenced within the service plan, but is not stored in flock store 1108, Orchestrator 1102 may be configured to reject the work request (e.g., including marking the work request rejected at 1124 and/or transmitting the status indicating the work request was rejected at 1126) . . . . Otherwise, the method 1100 may proceed to 1126.

At 1132, Orchestrator 1102 may execute operations to determine whether a phonebook entry exists corresponding to the service. A phone book entry refers to contact data corresponding to the phonebookID of one of the data structures of FIG. 5. The phonebookID may be an attribute included within the service plan (or metadata corresponding to the service plan) that identifies a service team and/or contact information for an owner of the service plan. In some embodiments, the phonebookID may be a unique identifier assigned and managed by another service/system (e.g., a phonebook service) that is configured to manage contact information (e.g., email, phone number, etc.) for any suitable number of entities. As a non-limiting example, Orchestrator 1102 may transmit a request to phonebook 1110 (e.g., a service) with the phonebookID obtained from the service plan. If phonebook 1110 returns contact information corresponding to the phonebookID, the method 1100 may proceed to 1134. If not, Orchestrator 1102 may be configured to reject the work request (e.g., including marking the work request rejected at 1124 and/or transmitting the status indicating the work request was rejected at 1126).

At 1134, the service plan and metadata may be stored within data store 1106. In some embodiments, the work request may be marked complete at 1136. Marking the work request complete may include updating a status associated with the work request and/or transmitting a status indicating the work request was completed (e.g., via the command line or graphical interface used to submit the request at 1116.

FIG. 12 is a flow diagram depicting a method 1200 for creating a service plan and manifest (SPAM) (represented by data structures 502-508 of FIG. 5, service plan 902 and manifest 904 of FIG. 9, etc.), in accordance with at least in one embodiment. The method 1200 may be performed by Build Service 1202 (e.g., an example of cloud services 1856 of FIG. 18), Orchestrator 1204 (e.g., Orchestrator 106 of FIG. 1), CIOS Central 1208 (e.g., CIOS Central 108 of FIG. 1), or any suitable portion of CIOS 102. More or fewer operations than the ones described in connection with FIG. 12 may be included in method 1200. The operations of method 1200 may be performed in any suitable order. In some embodiments, Orchestrator 106 may interact with data store 1206 (e.g., data store 1106 of FIG. 11), and Artifactory 1210 (e.g., Artifactory 1102 of FIG. 11), each of which may be configured to store particular data as discussed herein.

The method may begin at 1212, where SPAM creation work request may be transmitted to create a SPAM a service plan S (e.g., service plan 902 of FIG. 9) and a manifest M (e.g., manifest 904 of FIG. 9) with entries x, y, z (corresponding to respective flock configs). In some embodiments, the SPAM creation work request may include a service plan ID, any suitable SPAM metadata (e.g., any suitable data corresponding to the attributes of SPAM data structure 502 of FIG. 5), a locally stored manifest (e.g., a manifest stored at user device 1214), and/or data corresponding to entries x, y, and z (e.g., flock ID, gitCommit hash, one or more artifact versions as depicted in service manifest item 924 of FIG. 9, or any suitable data corresponding to the service manifest item data structure 508 of FIG. 5) may be transmitted via a SPAM creation work request to Orchestrator 1204. In some embodiments, the service plan ID, the manifest, and/or the data corresponding to entries x, y, and z may be transmitted based at least in part on entering a command via a command line interface provided at user device 1214. In some embodiments, the SPAM creation work request may be transmitted to Orchestrator 1204 through Build Service 1202 (e.g., the request may initially be transmitted to Build Service 1202 and subsequently transmitted to Orchestrator 1204 by Build Service 1202). In some embodiments, Build Service 1202 may initiate the SPAM creation work request. The manifest M may be locally stored (and potentially created) at user device 1214 or the manifest M may be stored at a storage location accessible to Build Service 1202 and/or Orchestrator 1204.

At 1214, Orchestrator 1204 may save the SPAM creation work request to data store 1208 for recordation.

At 1216, Orchestrator 1204 may obtain the service plan (and potentially metadata corresponding to the service plan) based at least in part on submitting to data store 1208, a query including the service plan ID received at 1212. In some embodiments, obtaining the service plan and the metadata may be performed using separate queries to data store 1208. If a service plan and/or the metadata are not returned, the Orchestrator 1204 may determine the SPAM requested is in valid and may reject the SPAM creation work request. Rejecting the SPAM creation work request may include, at 1218, marking the SPAM work request stored at 1214 as being rejected and/or, at 1220, transmitting a status indicating the SPAM work request was rejected. If the service plan (and metadata, if requested) are returned, the method 1200 may proceed to 1222.

At 1222, Orchestrator 1204 may obtain, from CIOS Central 1206, static flock analysis (SFA) data for the flock configuration files corresponding to entries x, y, and z. In some embodiments, SFA data may be generated based at least in part on performing (e.g., by CIOS Central 1206) a static flock analysis of one or more flock configuration files (e.g., at least flock configuration files corresponding to entries x, y, and z) as discussed above in connection with FIG. 3. In some embodiments, SFA data may include the dependencies identified from the static flock analysis. In some embodiments, obtaining SFA data for entries x, y, and z may requesting CIOS Central 1206 parse the flock configuration files corresponding to entries x, y, and z.

At 1224, Orchestrator 1204 may perform any suitable operations to determine whether the SFA data for flocks corresponding to x, y, and z are consistent with the service plan. In some embodiments, determining consistency may include determining whether the dependencies identified in the SFA data match/agree with the dependencies (e.g., external and/or internal capability dependencies of execution unit 700 of FIG. 7 and/or flock config entity 800 of FIG. 8), declared within the service plan. In some embodiments, determining consistency may include determining if the order of releases indicated in the SFA data match the order of releases defined in the service plan. If the SFA data is determined to be inconsistent with the service plan, Orchestrator 1204 may be configured to deem the SPAM requested as being invalid and may reject the SPAM creation work request (e.g., including marking, at 1218, the SPAM creation work request as rejected and/or transmitting, at 1220, a status that indicates the SPAM creation work request was rejected).

At 1224, Orchestrator 1204 may verify that flock configuration files corresponding to entries x, y, and z are stored in Artifactory 1210. If so, the method 1200 may proceed to 1228. If not, Orchestrator 1204 may be configured to deem the SPAM requested as being invalid and may reject the SPAM creation work request (e.g., including marking, at 1218, the SPAM creation work request as rejected and/or transmitting, at 1220, a status that indicates the SPAM creation work request was rejected).

At 1228, Orchestrator 1204, may determine that the SPAM which was requested is valid. In some embodiments, the Orchestrator 1204 may generate a manifest from the entries x, y, and z (if a manifest was not provided at 1212). The service plan and manifest (and potentially any metadata corresponding to the service plan and/or manifest) may be stored as a new SPAM within data store 1208. This may include generating a unique identifier for the SPAM and storing this identifier as part of the SPAM (e.g., via the SPAM data structure 502 of FIG. 5, which is associated with the service plan represented by the service plan data structure 504 of FIG. 5 and the manifest represented by the service manifest data structure 506 of FIG. 5, including entries x, y, and z represented by service manifest items, each corresponding to an instance of the service manifest item data structure 508 of FIG. 5).

At 1230, Orchestrator 1204 may execute operations to mark the SPAM creation work request as being completed. This may include updating the SPAM creation work request with a status value indicating completion.

FIG. 13 is a flow diagram depicting a method 1300 for adding a SPAM (e.g., service plan 902 and manifest 904, represented by data structures 502-508 of FIG. 5) to a SPAM set (e.g., SPAM set, in accordance with at least in one embodiment. The method 1300 may be performed by Orchestrator 1302 (e.g., Orchestrator 106 of FIG. 1). More or fewer operations than the ones described in connection with FIG. 13 may be included in method 1300. The operations of method 1300 may be performed in any suitable order. In some embodiments, Orchestrator 1302 may interact with SPAM Set Proposals 1304 (e.g., a data store configured to store SPAM Set proposal data, a queue, etc.), and data store 1306 (e.g., data store 1208 of FIG. 12), each of which may be configured to store particular data as discussed herein.

In some embodiments, SPAMs may only take effect when they are added into a SPAM set (e.g., SPAM set 510 of FIG. 5), which associates the SPAM with a regional context. A SPAM may be stored and associated with any suitable number of SPAM sets (e.g., 0, 1, 2, etc.). Method 1300 may be executed to add a SPAM to a SPAM set.

Method 1300 may begin at 1310, where a SPAM set update proposal may be received by the Orchestrator 1302 from user device 1308. SPAM set update proposal may be in any suitable format and may include an identifier (e.g., "SPAM X," a SPAM name, for illustration) corresponding to a SPAM (e.g., a SPAM associated with a particular service plan represented by and suitable combination of SPAM data structure 502, service plan data structure 504, an example of which includes service plan 902 of FIG. and a manifest represented by service manifest data structure 506 and one or more instances of manifest item data structure 508 of FIG. 5, an example of which includes manifest 904 of FIG. 9). In some embodiments, an identifier for the SPAM set (e.g., "SPAM set S," for illustration) may be included in the SPAM set update proposal.

At 1312, a new proposal corresponding to "Add SPAM X" may be generated by Orchestrator 1302, assigned a work request ID, and then added to SPAM Set Proposals 1304 (e.g., a data base table used to track SPAM set proposals). In some embodiments, SPAM Set Proposals 1304 may include a first in, first out queue. In some embodiments, Orchestrator 1302 may store an entry corresponding to the SPAM set update proposal in data store 1306 (e.g., a data store which also stores SPAM Sets, such as DB 312 of FIG. 3).

At 1314, Orchestrator 1302 may transmit the work request ID generated at 1312 to user device 1308.

At 1316, when it is time to process the proposal, Orchestrator 1302 (or one of a set of highly available worker nodes, not depicted) may obtain the SPAM set proposal "Add SPAM X" from SPAM Set Proposals 1304.

At 1318, Orchestrator 1302 (or the worker node) may obtain SPAM set S from data store 1308 (e.g., an example of DB 312 of FIG. 3) using the SPAM set identifier obtained from the proposal. SPAM set S may include any suitable number of SPAMs which have previously been determined (e.g., by Orchestrator 1302) to be compatible with one another.

At 1320, Orchestrator 1302 (or the worker node) may execute any suitable operations to determine whether the SPAM X is compatible with the SPAMs already included in the SPAM set S. In some embodiments, this may include determining whether capability publications are duplicated. The SPAM set update proposal may be marked as rejected at 1322, the proposal removed from the SPAM Set Proposals 1304 at 1324, and a status indicating the SPAM Set Proposal corresponding to the work request ID has been rejected may be transmitted at 1326. If no duplications exist, no invariants of SPAM set S are broken with the addition of SPAM X, and/or the SPAM X is determined to be compatible with SPAM set S based at least in part on a predefined set of rules, the method may proceed to 1328.

At 1328, Orchestrator 1302 (or the worker node) may generate a graph (e.g., Build Dependency Graph 338 of FIG. 3) using the combination of SPAM X and SPAM set S.

At 1330, Orchestrator 1302 may execute any suitable operations for identifying cycles in the graph. If one or more cycles are identified, the SPAM set update proposal may be marked as rejected (and cycle information associated with the identified cycles may be stored in the SPAM set update proposal) at 1322, the proposal may be removed from the SPAM Set Proposals 1304 at 1324, and a status indicating the SPAM Set Proposal corresponding to the work request ID has been rejected may be transmitted at 1326. Else, the method 1300 may proceed to 1332.

At 1332, Orchestrator 1302 (or the worker node) may update the SPAM set S to include SPAM X and transmit the updated SPAM set to data store 1306 to persist the change. At 1334, the SPAM set update proposal may be marked as accepted (e.g., associated with a status indicating the proposal was accepted), the proposal may be removed from the SPAM Set Proposals 1304 at 1324, and a status indicating the SPAM Set Proposal corresponding to the work request ID has been accepted may be transmitted at 1326.

It should be appreciated that method 1300 may be performed for SPAM set update proposals for SPAMs that, if added to a SPAM set, would structurally change the Build Dependency Graph generated for that SPAM set. By way of example, method 1300 may be executed for a SPAM that includes new capability dependencies and/or artifact version updates. Updates that don't impact a SPAM set's Build Dependency Graph may be processed via a separate process, not depicted, in which the update may be accepted unconditionally. By way of example, when replacing a SPAM with a new SPAM that shares the same service plan as the one it was replacing, the SPAM update may be accepted unconditionally, forgoing execution of method 1300.

When a change to a SPAM set is accepted, one or more version set item updates to one or more version sets may be initiated. For example, adding a new SPAM, removing a SPAM, or updating a SPAM may result in creating, removing, or modifying one or more version set items. These version set items may be added to, removed from, or updated in a version set with which Orchestrator 310 of FIG. 3 may build the Build Dependency Graph 338 to drive orchestration operations as described in FIG. 3.

In some embodiments, Orchestrator 1302 (or the worker node) may be configured to guard again racing updates (e.g., two updates that would replace the same SPAM in a SPAM set, by different team members) by capturing the current ID of the SPAM as part of the update proposal. If the ID of the SPAM within the SPAM set differs from the one encoded in the proposal when the proposal is processed, then the Orchestrator 1302 (or the worker node) may reject the update.

Figure 14:
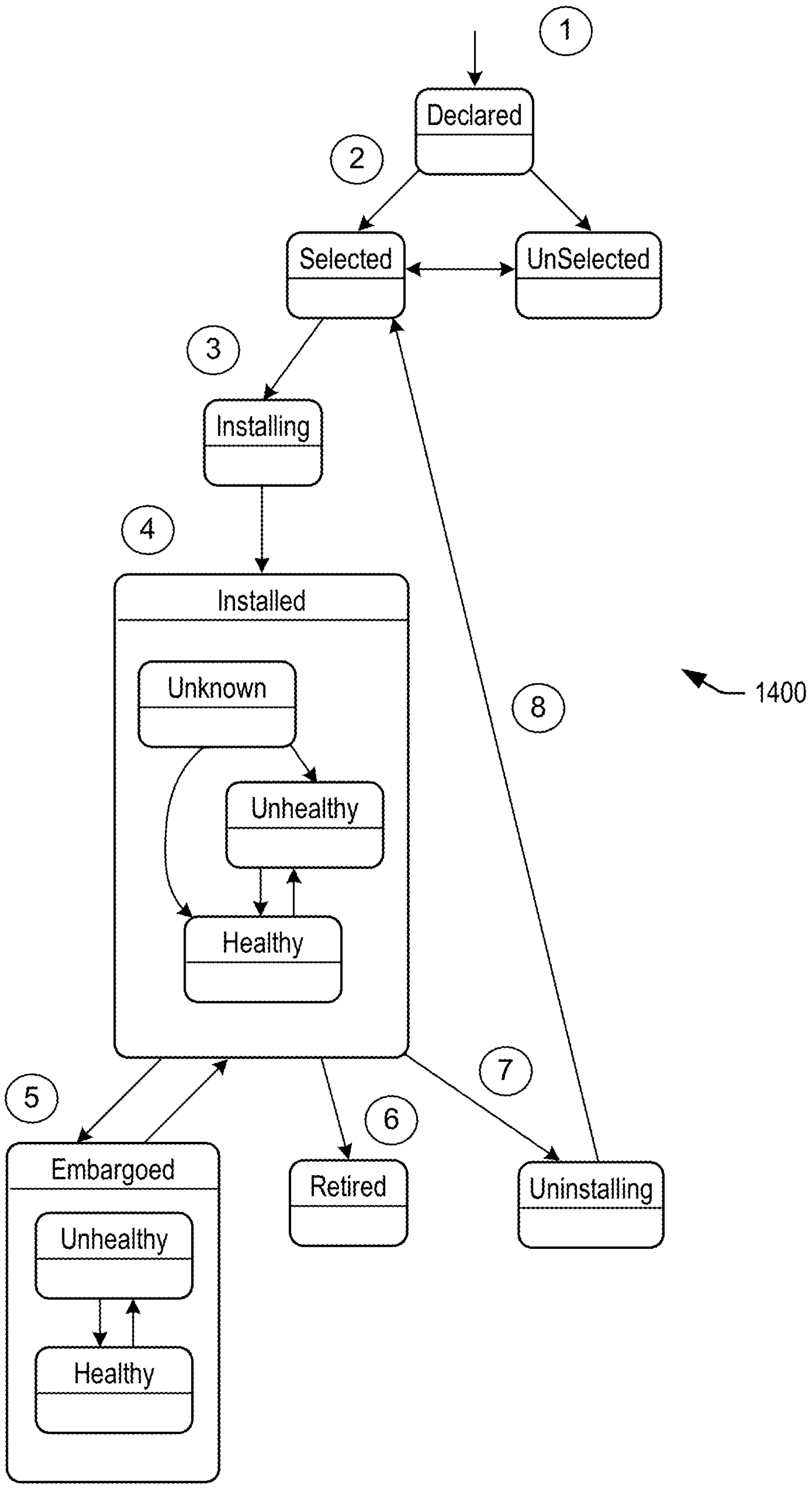
FIG. 14 is a block diagram depicting an example lifecycle for a skill, in accordance with at least one embodiment.

FIG. 14 is a block diagram depicting an example lifecycle 1400 for a skill, in accordance with at least one embodiment. Lifecycle 1400 may include any suitable number of states. As depicted, lifecycle 1400 includes states such as declared, selected, unselected, installing, installed, embargoed, retired, and uninstalling, although other combinations of lifecycle states are contemplated. A lifecycle state may correspond to the installationState attribute of the skill data structure 410 of FIG. 4. In some embodiments, a lifecycle state may be associated with any suitable number of substates. Each of these substates may correspond to the healthState of skill version data structure 412 of FIG. 4. As depicted in FIG. 14, a skill that is associated with a lifecycle state of "installed" may be associated with one of three substates (e.g., "unknown," "unhealthy," and "healthy"). Likewise, a skill associated with an "embargoed" state may be associated with a "healthy" or and "unhealthy" substate. Descriptions for the conditions indicated by each state are provided below.

| State | Health Monitored | Description |
|---|---|---|
| Declared | | A skill version resource (e.g., skill version data structure 412 of FIG. 4) has been created by the Puffin Service and is known to the system (e.g., stored in a database and accessible by any suitable component of CIOS 102 of FIG. 1) |
| Selected | | The skill version resource is selected (e.g., by Orchestrator 106 of FIG. 1) for installation into the target region |
| Unselected | | The skill version resource is unselected (e.g., by Orchestrator 106 of FIG. 1) to ensure the skill version is not (or never) installed in the target region |
| Installing | | Installation of the Service producing the associated Skill is currently underway in the target region. |
| Installed | Y | Installation of the Service producing the associated Skill has completed successfully. Puffin begins/continues periodic health monitoring of the Skill. |
| Uninstalling | | Uninstallation of the Service producing the associated Skill is currently underway in the target region. |
| Retired | | The skill version is installed in the target region but no longer provides any meaningful value to any consumers. This state may be utilized by ephemeral Skills in the context and utility of region build. |
| Embargoed | Y | Installation of the Service producing the associated Skill has completed successfully. Puffin begins/continues periodic health monitoring of the skill but the skill version should be treated as Installed only by Skill dependencies of the same producing Service. |

In some embodiments, at step 1, upon selecting the option publish a skill an instance of skill version data structure 412 of FIG. 4 corresponding to the skill may be created and updated to indicate an installation state of "declared." At step 2, the Orchestrator 106 may select the skill for installation within the target region (e.g., target region 114) and transmit data indicating the selection (or a state transition to "selected"). Upon receipt of this data, the Puffin Service may update the skill version data structure 412 to "selected." At step 3, the Orchestrator 106 of FIG. 1 may begin deploying a resource of the service producing the associated skill and may transmit a new indication that the installation state of the skill is to be set to "installing." Upon receipt, the Puffin Service may update the skill version data structure 412 to "installing." At step 4, the installation state of the skill may be updated to "installed" when the installation of the Service producing the associated skill has been successfully completed. Generally, any of the state transitions described herein may be initiated by the Orchestrator 106 (on receiving indications from CIOS Regional or CIOS Central that one or more releases have been successfully executed). Receipt of any suitable indication of a state transition occurring may cause the Puffin Service to update the installation state of the skill version data structure 412. While the skill is associated with an "installed" state, the Puffin Service may monitor the health of the skill.

In some embodiments, monitoring the health of a skill may include monitoring for indications that one or more alarms associated with the skill (e.g., alarms indicated with the alarmLabelName attribute of health check data structure 414 of FIG. 4) have been triggered (e.g., by an alarm service such as a telemetry service and/or a sentinel service, each an example of one of the services of cloud services 1856 of FIG. 18). In some embodiments, if an alarm service (e.g., a telemetry service) configured to provide these alarms is unavailable, a substate corresponding to the "healthState" attribute of skill version data structure 412 may be updated to indicate an "unknown" health state of an installed skill. If no alarm has been triggered for at least a threshold period of time, the healthState attribute of the skill version may be set to a value to indicate a "healthy" state of the installed skill. Receipt of an indication that an alarm that is associated with the skill has been triggered may cause the Puffin Service to update the healthState attribute of the skill version to an "unhealthy" state for the installed skill.

At step 5, the installation state may be updated to an "embargoed" state (e.g., by the Orchestrator, the Puffin Service, and/or based on user input) to indicate that health monitoring should continue but that only skills of the same producing service should treat the embargoed skill as being installed. In some embodiments, the installation state of the skill may revert to "installed."

In some embodiments, a skill version may be retired (e.g., via user input) at step 6. While in the retired state, the skill version may not (or cannot) be utilized by other skills and/or in any build or run. In some embodiments, the skill version's installation state may not be modified once the skill has transitioned to the retired state.

In some embodiments, a skill version's installation state may transition from an "installed" state" to an "uninstalling" state based at least in part on operations performed by the orchestrator and/or by user input. In some embodiments, the Orchestrator 106 may determine service deployments are to be reversed. In these situations, the Orchestrator 106 may "unwind" installation of one or more services. During these operations, when the service is being uninstalled at step 7, the skill version associated may be updated to indicate a state of "uninstalling." When the service associated with the skill version has been successfully uninstalled, the skill version's installation state may be updated to "selected" at step 8.

A number of transitions between the various states and substates are contemplated. The lifecycle states and transitions depicted in FIG. 14 are illustrative and are not intended to limit the scope of the disclosure.

Figure 15:
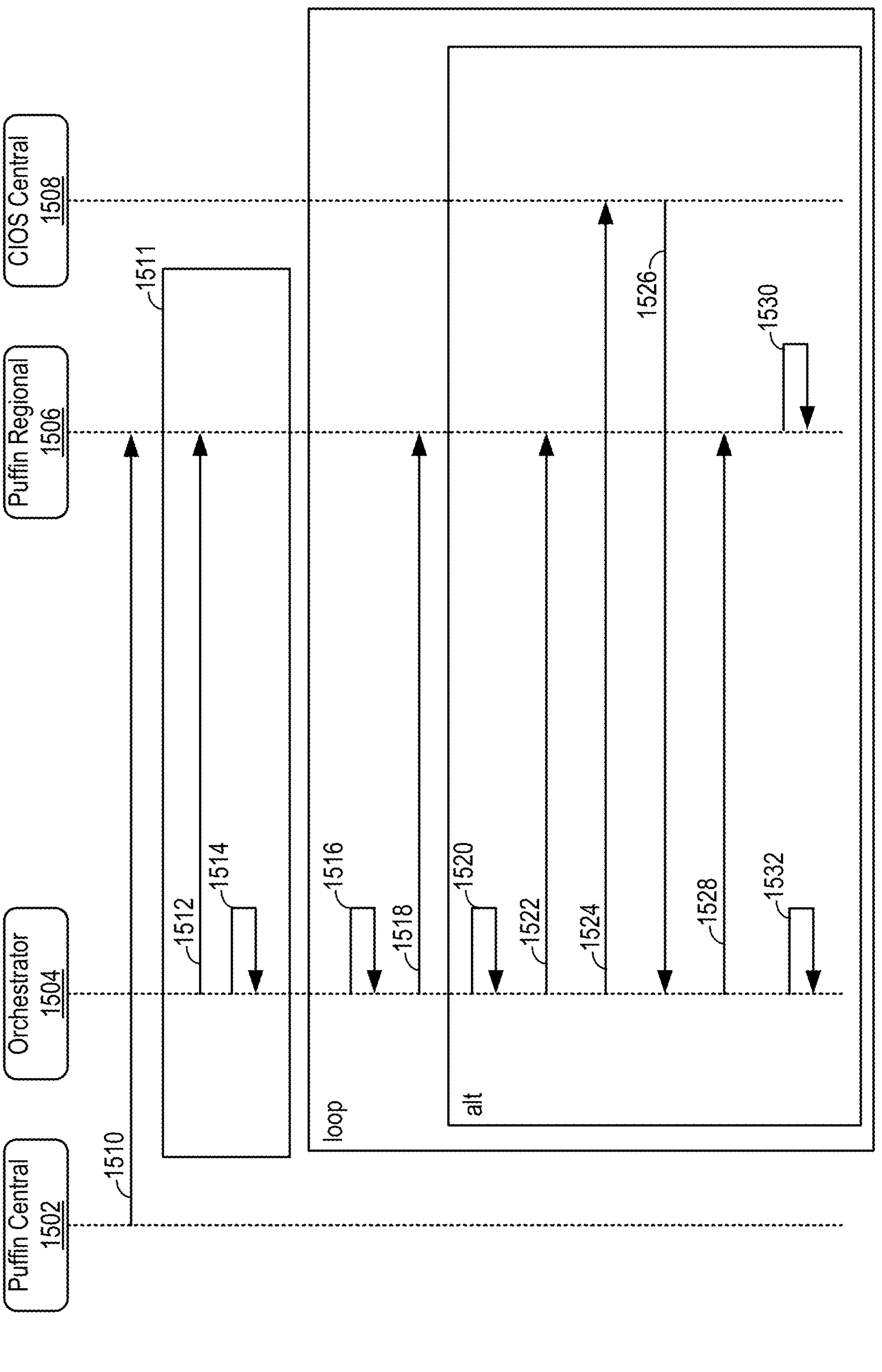
FIG. 15 is a flow diagram depicting an example method for managing skill states during a data center/region build, in accordance with at least one embodiment.

FIG. 15 is a flow diagram depicting an example method 1500 for managing skill states during a data center/region build, in accordance with at least one embodiment. The method 1500 may be performed with any suitable combination of Puffin Central 1502 (e.g., Puffin Central 118 of FIG. 1), Orchestrator 1504 (e.g., Orchestrator 106 of FIG. 1), Puffin Regional 1506 (e.g., Puffin Regional 120 of FIG. 1), and CIOS Central 1508 (e.g., CIOS Central 108 of FIG. 1). More or fewer operations may be included in method 1500 than the ones described in connection with FIG. 15. The operations of method 1500 may be performed in any suitable order.

Method 1500 may begin at 1510, where Puffin Regional 1506 may be seeded by Puffin Central 1502 with all predefined skills, versions, and consumers. In some embodiments, Puffin Central 1502 may utilize an application programming interface, function call, or another suitable method for communicating the metadata corresponding to each skill that has been previously defined (e.g., user-generated and/or system generated skills, the latter being referred to herein as "shadow skills") to Puffin Regional 1506. In some embodiments, Puffin Central 1502 may send identifiers corresponding to each skill (and their skill version) with which the corresponding instance(s) of skills metadata may be retrieved by Puffin Regional 1506. In some embodiments, Puffin Central 1502 may be configured to identify and transmit skills metadata and/or identifiers (e.g., skill ID, major version, minor version, etc.) for skills which are to be utilized for building a region corresponding to Puffin Regional 1506. In some embodiments, the skill state for each of these skills may indicate that the skills are selected, but not yet installed. The state of a skill may be expressed with any suitable combination of the installationState and/or healthState attributes of a corresponding skill version data structure (e.g., the skill version data structure 412 of FIG. 4). By way of example, the "installationState" attribute may be set to a predefined value associated with the selected state.

Operations 1511 may include any suitable operations for building a target set and ordered execution plan. By way of example, at 1512, Orchestrator 106 may perform any suitable operations for identifying respective skill states for every skill, version, and consumer for the region. This may include identifying installation and/or health states of each skill (e.g., based at least in part on the installationState and healthState attributes of skill version data structure 412 of FIG. 4), version identifiers corresponding to each skill (e.g., based at least in part on major and/or minor version attributes of skill data structure 410 of FIG. 4), and/or identifiers of each consumer of the identified skills. Consumers of the identified skill may be identified based at least in part on determining all instances of skill consumer data structure 418 that indicate, via any suitable combination of consumingSkillID and/or consumingServiceID attributes, an ID of skill data structure 410 and/or service ID of service data structure 406 corresponding to an identified skill.

At 1514, a target set and/or ordered execution plan may be generated. In some embodiments, building a target set may include any suitable combination of identifying and/or obtaining 1) a version set of flock configs (a "golden set" corresponding to a specific set of flock configs individually identified by specific version identifiers and corresponding to a set of services to be deployed in the region), 2) a Service Plan and Manifest (SPAM) set (e.g., aggregate particular SPAMs, associated with specific version identifiers and corresponding to a set of services to be deployed in the region), 3) a set of artifacts (e.g., program code associated with specific version identifiers, to be utilized/executed for provisioning infrastructure and/or deploying software within the region), or the like. As described above in connection with FIG. 3, building an ordered execution plan may include parsing the flock configs and/or SPAMs to determine dependencies between execution units, dependencies between services, dependencies between execution units of a single service, or the like. In some embodiments, building an ordered execution plan may include performing the above-described static flock analysis to identify cyclic dependencies. The Build Dependency Graph 338 of FIG. 3 (or another suitable ordered list indicating operations to be executed for the region build) may be considered an example of an ordered execution plan generated by Orchestrator 1504 at 1514.

Once built, the ordered execution plan may be utilized by Orchestrator 1504 to execute a region build. By way of example, at 1516, the Orchestrator 1504 may identify, for a current step, all skills on which the current step depends. As described below, Puffin Regional 1506 may maintain compatibility between skills and capabilities. Thus, in embodiments in which at least some capabilities are used to indicate availability of a particular service, resource, or functionality, Puffin Regional 1506 may generate shadow skills for those capabilities (e.g., prior to a region build) with which corresponding skill states may be used to track the current state of the capabilities represented by those shadow skills. In some embodiments, Puffin Regional 1506 may be configured to obtain capabilities data from storage, from Capabilities Service 112 of FIG. 1, from Orchestrator 1504, or any suitable combination of the above. Puffin Regional 1506 may be configured to update skill state for any suitable skill state based on data received from Orchestrator 1504, Capabilities Service 112, and/or an alarm service (e.g., one of cloud services 2056 of FIG. 20), or any suitable combination of the above. If a skill (e.g., a user defined or system defined skill) is associated with multiple capabilities, the skill may not be considered installed or transitioned to a particular state (e.g., an "INSTALLED" state) until Puffin Regional 1506 determines that each capability has been published or otherwise indicated as available.

At 1518, Orchestrator 1504 may query Puffing Regional 1506 for a current state corresponding to each skill on which the current step depends. A skill may be identified based at least in part on any suitable combination of skill ID, major version identifier, and/or minor version identifier, and/or according to any suitable combination of attribute values that are configured to be unique across skills. At the start of region build (e.g., at a first step, a first node of the Build Dependency Graph 338, a first operation of an ordered list of operations, etc.), the current step may lack association to any upstream skill. If no dependencies are identified for the current step, the method 1500 may continue to 1520 without executing the operations at 1518.

At 1520, in scenarios in which the Orchestrator 106 is returned corresponding skill states for one or more upstream skills (e.g., skills on which the current step depends) that indicate one or more upstream skills are not in a particular state (e.g., "INSTALLED") and/or substate (e.g., "HEALTHY"), the Orchestrator 106 may execute operations to indicate a failure. In some embodiments, the current state of these skills may be viewed at similar user interfaces as the one depicted in FIG. 6 to enable root cause analysis to be performed (e.g., by the system or user). In some embodiments, a sub-state of "UNHEALTHY" of one or more of the upstream skills may cause Puffin Regional 1506 to trace or otherwise traverse the ordered execution plan (and/or Build Dependency Graph 338) upward (e.g., from the current step and upstream), to identify a highest upstream skill (first to occur in the ordered execution plan) that is associated with an "UNHEALTHY" state. An example of the information obtained from this trace is depicted in area 616 of FIG. 6. In some embodiments, Orchestrator 106 may be configured to wait and periodically resubmit its query according to a predefined frequency or schedule, waiting on an indication that the upstream skills are associated with an installation state of "INSTALLED," and a sub-state of "HEALTHY."

At 1522, at any suitable time, the Orchestrator 1504 may identify the upstream skills are installed and healthy based on the skill states obtained from Puffin Regional 1506. In response to identifying all upstream skills are installed and healthy, Orchestrator 1504 may transmit data for the skill(s) associated with the current step indicating the current state of those skill(s) is "INSTALLING." Transmitting such data may cause Puffin Regional 1506 to update the installation state attribute of the skills version data structure 412 of FIG. 4 that is associated with that skill to indicate a skill state of "INSTALLING."

At 1524, Orchestrator 1504 may execute operations to cause CIOS Central 1508 to initiate one or more releases. In some embodiments, CIOS Central 1508 may instruct an instance of CIOS Regional within the region (e.g., CIOS Regional 110 of FIG. 1, a CIOS Regional 110 deployed within the target region being built, etc.) to perform operations for a given release. Examples of the operations executed by CIOS Central 1508 and CIOS Regional 110 are described in more detail with respect to FIG. 3 and are not repeated here, for brevity. At 1526, CIOS Central 1508 may transmit an indication that the release was successful or unsuccessful. If unsuccessful, Orchestrator 1504 may execute operations to instruct CIOS Central 1508 once again, to attempt the release again. This retry process may be executed any suitable number of times and according to any suitable predefined protocol.

At 1528, if the release was successful, Orchestrator 1504 may transmit data to Puffin Regional 1506 indicating that the skill(s) associated with the current step are now installed. Any suitable operations executed (e.g., by Orchestrator 1504) to update (e.g., via Puffin Regional 1506) a skill state to indicate that the skill was installed may be referred to as "publishing a skill." In response to receiving this data, Puffin Region 1506 may update the skill(s)' installation state to a value corresponding to the "INSTALLED" state. In some embodiments, Puffin Regional 1506 may be configured to transmit any suitable data (e.g., to Capabilities Service 112 of FIG. 1) for any suitable combination (e.g., all) of the capabilities associated with the skill that was transitioned to the "INSTALLED" state (e.g., the capabilities identified with the capabilities attribute of skill data structure 410 of FIG. 4).

At 1530, in some embodiments, Puffin Regional 1506 may be configured to commence operations for monitoring the installed skill(s)' health state. In some embodiments, this may include monitoring for one or more alarms (indicated by the alarm labels of health check data structure 414 of FIG. 4. Puffin Regional 1506 may update a sub-state (e.g., the healthState attribute of the health check data structure 414) in accordance with its monitoring. For example, Puffin Regional 1506 may update the sub-state of a skill to indicate an "UNHEALTHY" state if, through its monitoring, it determines that an alarm has been triggered which is associated with a given skill. Puffin Region 1506 may be configured to update set or leave a sub-state of the skill as indicating "HEALTHY" when it determines that no alarm associated with the skill has been triggered (ever, or at least for a predefined threshold time period).

At 1532, Orchestrator 1504 may transition to the next step in the ordered execution plan (e.g., to a next node of the Build Dependency Graph 338). The operations described at 1516-1532 may be performed any suitable number of times, corresponding to each step in the ordered execution plan. When a last step has already been reached in the plan, the Orchestrator 1504 may conclude the region build at 1532.

Figure 16:
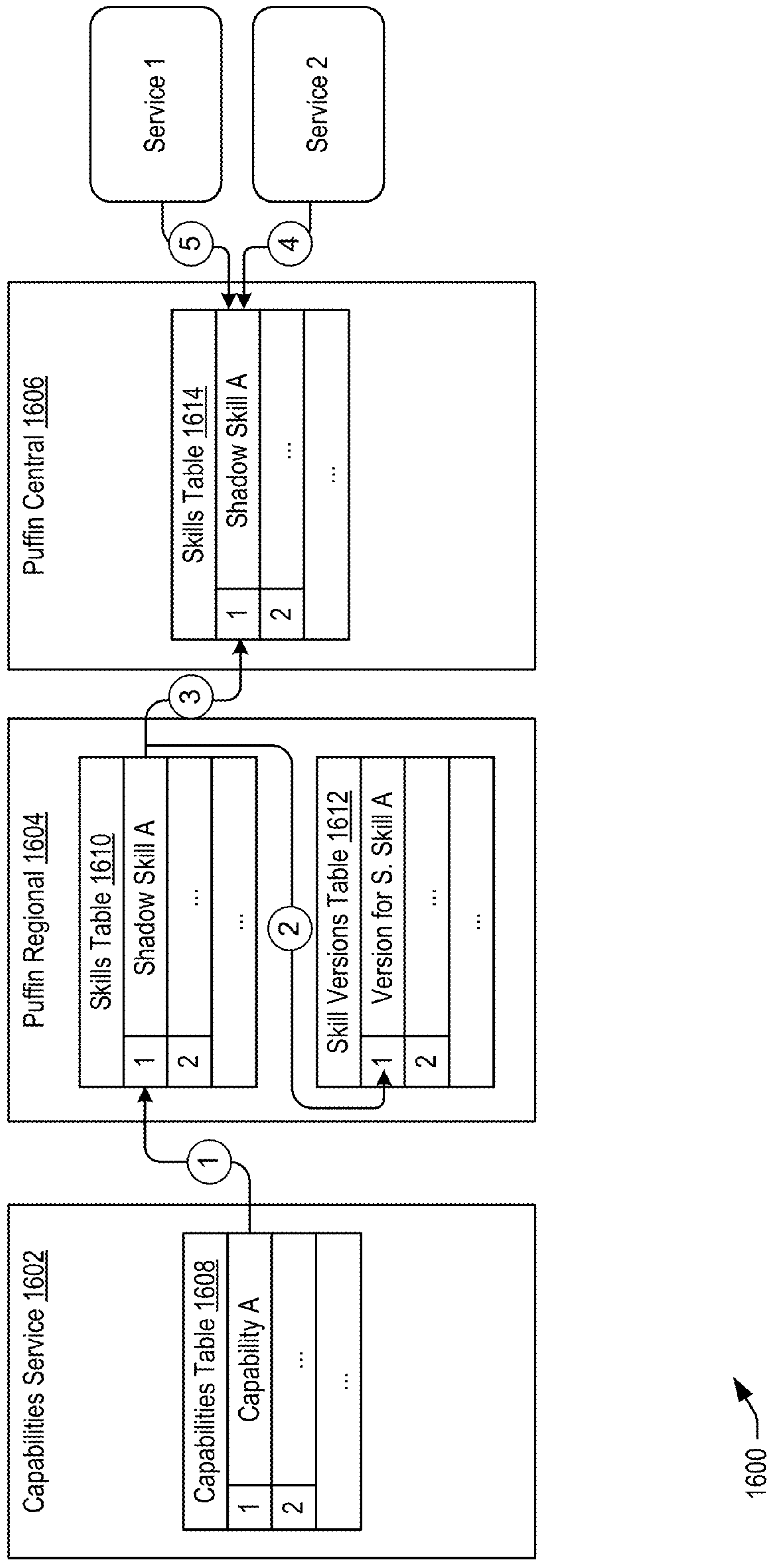
FIG. 16 is a block diagram depicting an example method for managing compatibility between capabilities and skills, in accordance with at least one embodiment.

FIG. 16 is a block diagram depicting an example method 1600 for managing compatibility between capabilities and skills, in accordance with at least one embodiment. The method 1600 may be performed with any suitable combination of Capabilities Service 1602 (e.g., Capabilities Service 112), Puffin Regional 1604 (e.g., Puffin Regional 118), and Puffin Central 1606 (e.g., Puffin Central 120 of FIG. 1). More or fewer operations may be included in method 1600 than the ones described in connection with FIG. 16. The operations of method 1600 may be performed in any suitable order. Prior to execution of method 1600, the Capabilities Service 1602 may be configured to receive data (e.g., from CIOS Regional 110, Worker 320, Worker 328, etc.) indicating a capability is available in the region, or in other words, a capability has been published. Capabilities Service 1602 may be configured to maintain a table or other suitable record (e.g., capabilities table 1608) which may be stored locally or at a storage location accessible to any suitable combination of components of CIOS 102 of FIG. 1. Capabilities table 1608 may include each previously published capability in the region.

At step 1, at any suitable time, Puffin Regional 1604 may receive or obtain an indication that capability A has been published. Puffin Regional 1604 may be configured to manage or otherwise maintain any suitable records for all known skills (e.g., user defined and/or system generated skills, the latter being referred to as a "shadow skill"). By way of example only, Puffin Regional 1604 may manage skills table 1610 and skill versions table 1612. In some embodiments, skill table 1610 may include identifiers and/or skill data structures (e.g., each corresponding to skill data structure 410 of FIG. 4) to maintain a record of all known skills. Skill versions table 1612 may be used to maintain knowledge of all versions corresponding to each skill as any suitable number of versions of a skill may be defined. In some embodiments, upon receiving/obtaining an indication that capability A has been published or is otherwise identified as being available, Puffin Regional 1604 may query skill table 1610 (or lookup or otherwise identify skills data structures) that are associated with capability A. This may include identifying from a skill data structure that a capabilities attribute of the structure is associated with a value corresponding to an identifier of capability A. If no skills are identified as being associated with capability A, Puffin Regional 1604 may be configured to generate a shadow skill (e.g., an instance of any suitable combination of the data structures of skills metadata 404 of FIG. 4) and set the attributes of the shadow skill to default and/or specific values in accordance with a predefined protocol and/or according to attributes of the capability (e.g., the capability's identifier). As a non-limiting example, Puffin Regional 1604 may generate an instance of skill data structure 410 at step 1. This instance of skills metadata may be referred to as "skill A" and may be used to represent capability A.

At step 2, if a shadow skill is generated at step 1, Puffin Regional 1604 may generate a skill version data structure 414 for shadow skill A. In some embodiments, the value for the data structure attributes associated with shadow skill A may be set to values according to a predefined protocol. In some embodiments, a skill's version may be used to track runtime information of the skill (e.g., whether the skill is installed and/or heathy). The term "skills" may be utilized herein to refer to any suitable combination of user-defined skills and/or system-generated shadow skills.

At step 3, at any suitable time, Puffin Regional 1604 may execute an application programming interface (API) call to Puffin Central 1606 to inform Puffin Central 1606 of Skill A's existence. In some embodiments, the data provided via this API call may include any suitable portion of skill's A metadata as generated and/or modified by Puffin Regional 1604. Puffin Regional 1704 may present any suitable information corresponding to shadow skill A via any suitable user interface on demand.

As a non-limiting use case example, Service 2 may have once depended on capability A, but is not associated with a flock config and/or SPAM that utilizes skills to express the process for building Service 2. Based at least in part on the existence of shadow skill A, Service 2 may register a dependency against shadow skill A at step 4, enabling a dependency of Service 2 on capability A to be expressed using a skill (shadow skill A) instead of capability A. The use of the shadow skill enables Puffing Central 1606 and/or Puffing Regional 1604 to track region build process using a single construct, skills, which include attributes that enable the tracking functionality previously lacking with respect to capabilities.

At step 5, perhaps after Service 1 is associated with an ordered execution plan that is executed in terms of skills, rather than capabilities, one or more user interfaces of Puffin Central 1606 may be utilized for shadow skill A to be claimed by Service 1.

Figure 17:
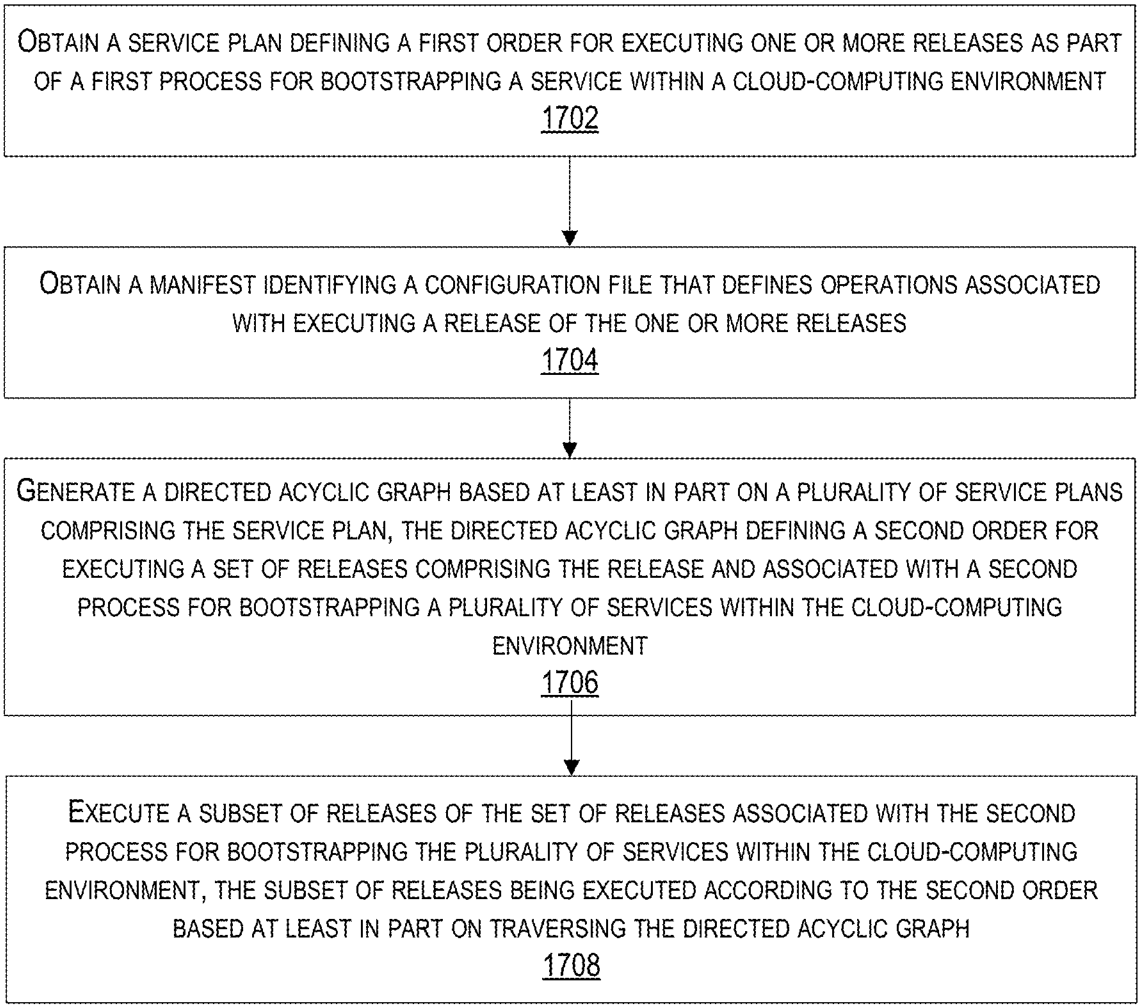
FIG. 17 is a flow diagram depicting an example method for utilizing service plans and manifests to determine or validate operations of a data center build, in accordance with at least one embodiment.

FIG. 17 is a flow diagram depicting an example method 1700 for utilizing service plans and manifests to generate or validate operations of a data center build, in accordance with at least one embodiment. The operations of method 1700 may be performed in any suitable order by any suitable combination of the components of CIOS 102 of FIG. 1. By way of example only, method 1700 may be performed by the Orchestrator 106 and CIOS Central 108 of FIG. 1. It is contemplated that method 1700 may include more or fewer operations than the number shown in FIG. 17.

The method 1700 may begin at 1702, where a service plan (e.g., service plan 902 of FIG. 9) defining a first order for executing one or more releases as part of a first process for bootstrapping a service within a cloud-computing environment may be obtained. Service plan data structure 504 of FIG. 5 (in some cases, combined with attributes of SPAM data structure 502 of FIG. 5) may represent a service plan. In some embodiments, the service plan may include any suitable combination of the entities discussed above in connection with FIGS. 6-8.

At 1704, a manifest (e.g., manifest 904 of FIG. 9) identifying a configuration file that defines operations associated with executing a release of the one or more releases may be obtained. The manifest may be obtained via a request as discussed at 1212 of FIG. 12 or stored locally or at a storage location accessible to CIOS 102 and/or Orchestrator 106. The manifest may comprise a number of entries that correspond to flock configuration files and/or artifacts that may be used (and in some instances, must be used) for the first process.

At 1706, a directed acyclic graph (e.g., the Build Dependency Graph 338 of FIG. 3) may be generated based at least in part on a plurality of service plans comprising the service plan. The directed acyclic graph may define a second order for executing a set of releases comprising the release. The set of releases may be associated with a second process for fully bootstrapping a plurality of services within the cloud-computing environment.

At 1708, a subset of releases of the set of releases associated with the second process for fully bootstrapping the plurality of services within the cloud-computing environment may be executed. In some embodiments, the subset of releases may be executed according to the second order based at least in part on traversing the directed acyclic graph.

Although not depicted, method 1700 may comprise validating, by the cloud infrastructure orchestration service, the service plan based at least in part on the manifest. In some embodiments, validating the service plan based at least in part on the manifest further comprises one or more of: 1) obtaining, by the cloud infrastructure orchestration service, static flock analysis data corresponding to the configuration file identified by the manifest, the static flock analysis indicating a first set of dependencies, 2) determining, by the cloud infrastructure orchestration service, a second set of dependencies based at least in part on the service plan, and 3) determining, by the cloud infrastructure orchestration service, that the first set of dependencies agree with the second set of dependencies. Operations for validating the service plan are discussed in more detail in connection with FIG. 12.

Although not depicted, the method 1700 may further comprise determining, by the cloud infrastructure orchestration service, that the service plan is consistent based at least in part on determining that first data corresponding to a first component of the service plan matches a second data corresponding to a second component of the service plan. Operations for determining whether the service plan is consistent are discussed in more detail in connection with FIG. 11.

Although not depicted, the method 1700 may further comprise determining, by the cloud infrastructure orchestration service, that the plurality of service plans are compatible based at least in part on 1) generating a directed graph based at least in part on the plurality of service plans and 2) determining that the directed graph lacks cycles. In some embodiments, the method may comprise adding, by the cloud infrastructure orchestration service, the service plan to a set of service plans comprising the plurality of service plans and the service plan. In some embodiments, the service plan is added to the set of service plans based at least in part on determining that the plurality of service plans are compatible. The method may comprise deriving, by the cloud infrastructure orchestration service, a version set identifying a plurality of configuration files to be during the second process for fully bootstrapping the plurality of services within the cloud-computing environment. The version set may be derived based at least in part on the set of service plans. Example operations for determining compatibility between a service plan and a plurality of service plans (e.g., a SPAM set), adding a service plan to a SPAM set, and deriving a version set from the SPAM set are discussed in greater detail in connection with FIG. 13.

In some embodiments, the version set comprises a plurality of version set items, a first version set item of the plurality of version set items being associated with a corresponding service plan, and a second version set item of the plurality of version set items lacking any service plan associations.

Although not depicted, the method 1700 may further comprise determining, by the cloud infrastructure orchestration service, that the plurality of service plans are compatible based at least in part on determining that no duplicate capability publications exist between the plurality of service plans.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 18 is a block diagram 1800 illustrating an example pattern of an IaaS architecture, according to at least one embodiment. Service operators 1802 can be communicatively coupled to a secure host tenancy 1804 that can include a virtual cloud network (VCN) 1806 and a secure host subnet 1808. In some examples, the service operators 1802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1806 and/or the Internet.

The VCN 1806 can include a local peering gateway (LPG) 1810 that can be communicatively coupled to a secure shell (SSH) VCN 1812 via an LPG 1810 contained in the SSH VCN 1812. The SSH VCN 1812 can include an SSH subnet 1814, and the SSH VCN 1812 can be communicatively coupled to a control plane VCN 1816 via the LPG 1810 contained in the control plane VCN 1816. Also, the SSH VCN 1812 can be communicatively coupled to a data plane VCN 1818 via an LPG 1810. The control plane VCN 1816 and the data plane VCN 1818 can be contained in a service tenancy 1819 that can be owned and/or operated by the IaaS provider.

The control plane VCN 1816 can include a control plane demilitarized zone (DMZ) tier 1820 that acts as a perimeter network (e.g., portions of a corporate network between the corporate intranet and external networks). The DMZ-based servers may have restricted responsibilities and help keep breaches contained. Additionally, the DMZ tier 1820 can include one or more load balancer (LB) subnet(s) 1822, a control plane app tier 1824 that can include app subnet(s) 1826, a control plane data tier 1828 that can include database (DB) subnet(s) 1830 (e.g., frontend DB subnet(s) and/or backend DB subnet(s)). The LB subnet(s) 1822 contained in the control plane DMZ tier 1820 can be communicatively coupled to the app subnet(s) 1826 contained in the control plane app tier 1824 and an Internet gateway 1834 that can be contained in the control plane VCN 1816, and the app subnet(s) 1826 can be communicatively coupled to the DB subnet(s) 1830 contained in the control plane data tier 1828 and a service gateway 1836 and a network address translation (NAT) gateway 1838. The control plane VCN 1816 can include the service gateway 1836 and the NAT gateway 1838.

The control plane VCN 1816 can include a data plane mirror app tier 1840 that can include app subnet(s) 1826. The app subnet(s) 1826 contained in the data plane mirror app tier 1840 can include a virtual network interface controller (VNIC) 1842 that can execute a compute instance 1844. The compute instance 1844 can communicatively couple the app subnet(s) 1826 of the data plane mirror app tier 1840 to app subnet(s) 1826 that can be contained in a data plane app tier 1846.

The data plane VCN 1818 can include the data plane app tier 1846, a data plane DMZ tier 1848, and a data plane data tier 1850. The data plane DMZ tier 1848 can include LB subnet(s) 1822 that can be communicatively coupled to the app subnet(s) 1826 of the data plane app tier 1846 and the Internet gateway 1834 of the data plane VCN 1818. The app subnet(s) 1826 can be communicatively coupled to the service gateway 1836 of the data plane VCN 1818 and the NAT gateway 1838 of the data plane VCN 1818. The data plane data tier 1850 can also include the DB subnet(s) 1830 that can be communicatively coupled to the app subnet(s) 1826 of the data plane app tier 1846.

The Internet gateway 1834 of the control plane VCN 1816 and of the data plane VCN 1818 can be communicatively coupled to a metadata management service 1852 that can be communicatively coupled to public Internet 1854. Public Internet 1854 can be communicatively coupled to the NAT gateway 1838 of the control plane VCN 1816 and of the data plane VCN 1818. The service gateway 1836 of the control plane VCN 1816 and of the data plane VCN 1818 can be communicatively coupled to cloud services 1856.

In some examples, the service gateway 1836 of the control plane VCN 1816 or of the data plane VCN 1818 can make application programming interface (API) calls to cloud services 1856 without going through public Internet 1854. The API calls to cloud services 1856 from the service gateway 1836 can be one-way: the service gateway 1836 can make API calls to cloud services 1856, and cloud services 1856 can send requested data to the service gateway 1836. But cloud services 1856 may not initiate API calls to the service gateway 1836.

In some examples, the secure host tenancy 1804 can be directly connected to the service tenancy 1819, which may be otherwise isolated. The secure host subnet 1808 can communicate with the SSH subnet 1814 through an LPG 1810 that may enable two-way communication over an otherwise isolated system. Connecting the secure host subnet 1808 to the SSH subnet 1814 may give the secure host subnet 1808 access to other entities within the service tenancy 1819.

The control plane VCN 1816 may allow users of the service tenancy 1819 to set up or otherwise provision desired resources. Desired resources provisioned in the control plane VCN 1816 may be deployed or otherwise used in the data plane VCN 1818. In some examples, the control plane VCN 1816 can be isolated from the data plane VCN 1818, and the data plane mirror app tier 1840 of the control plane VCN 1816 can communicate with the data plane app tier 1846 of the data plane VCN 1818 via VNICs 1842 that can be contained in the data plane mirror app tier 1840 and the data plane app tier 1846.

In some examples, users of the system, or customers, can make requests, for example create, read, update, or delete (CRUD) operations, through public Internet 1854 that can communicate the requests to the metadata management service 1852. The metadata management service 1852 can communicate the request to the control plane VCN 1816 through the Internet gateway 1834. The request can be received by the LB subnet(s) 1822 contained in the control plane DMZ tier 1820. The LB subnet(s) 1822 may determine that the request is valid, and in response to this determination, the LB subnet(s) 1822 can transmit the request to app subnet(s) 1826 contained in the control plane app tier 1824. If the request is validated and requires a call to public Internet 1854, the call to public Internet 1854 may be transmitted to the NAT gateway 1838 that can make the call to public Internet 1854. Metadata that may be desired to be stored by the request can be stored in the DB subnet(s) 1830.

In some examples, the data plane mirror app tier 1840 can facilitate direct communication between the control plane VCN 1816 and the data plane VCN 1818. For example, changes, updates, or other suitable modifications to configuration may be desired to be applied to the resources contained in the data plane VCN 1818. Via a VNIC 1842, the control plane VCN 1816 can directly communicate with, and can thereby execute the changes, updates, or other suitable modifications to configuration to, resources contained in the data plane VCN 1818.

In some embodiments, the control plane VCN 1816 and the data plane VCN 1818 can be contained in the service tenancy 1819. In this case, the user, or the customer, of the system may not own or operate either the control plane VCN 1816 or the data plane VCN 1818. Instead, the IaaS provider may own or operate the control plane VCN 1816 and the data plane VCN 1818, both of which may be contained in the service tenancy 1819. This embodiment can enable isolation of networks that may prevent users or customers from interacting with other users', or other customers', resources.

Also, this embodiment may allow users or customers of the system to store databases privately without needing to rely on public Internet 1854, which may not have a desired level of threat prevention, for storage.

In other embodiments, the LB subnet(s) 1822 contained in the control plane VCN 1816 can be configured to receive a signal from the service gateway 1836. In this embodiment, the control plane VCN 1816 and the data plane VCN 1818 may be configured to be called by a customer of the IaaS provider without calling public Internet 1854. Customers of the IaaS provider may desire this embodiment since database(s) that the customers use may be controlled by the IaaS provider and may be stored on the service tenancy 1819, which may be isolated from public Internet 1854.

Figure 19:
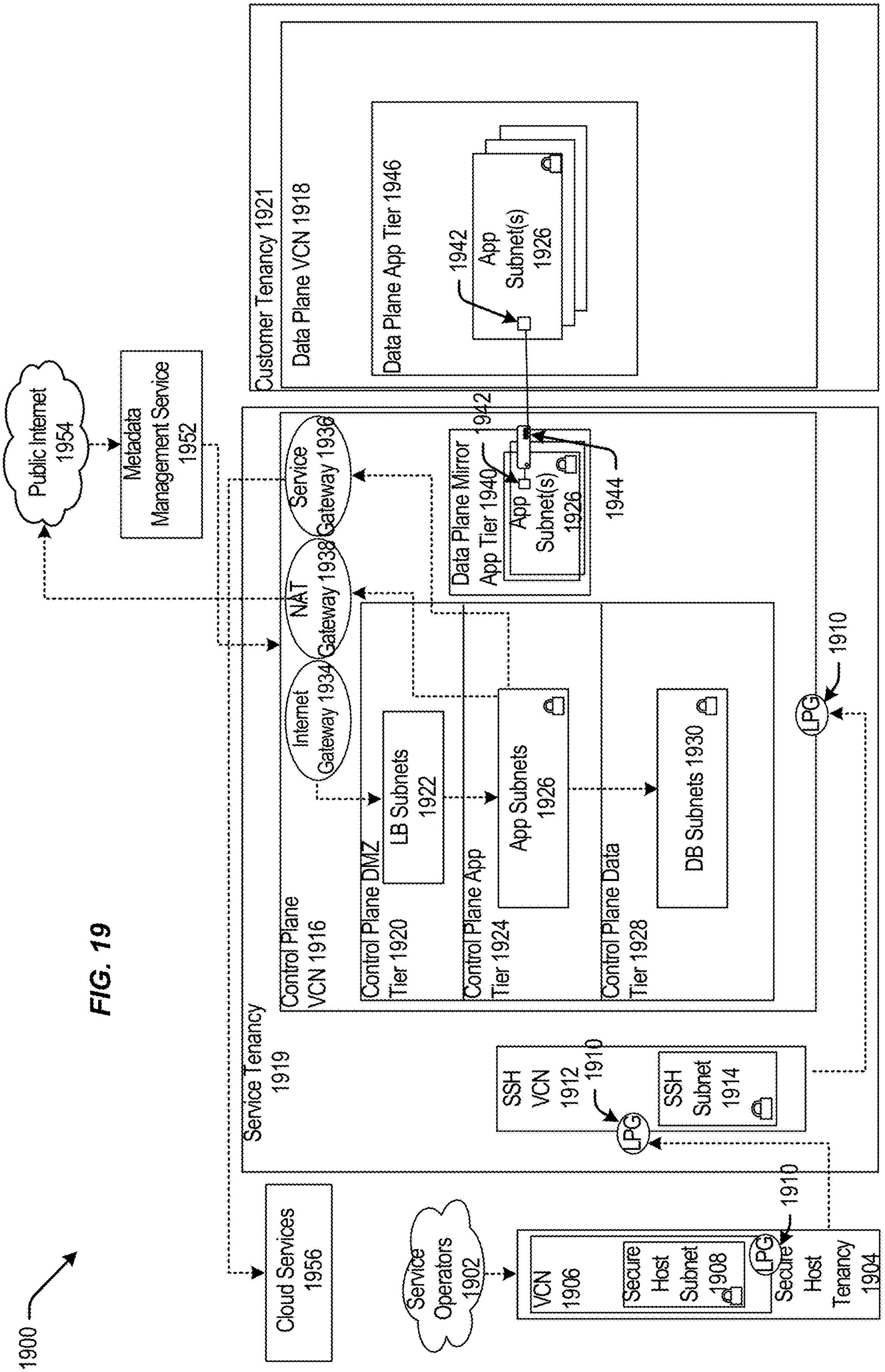
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1802 of FIG. 18) can be communicatively coupled to a secure host tenancy 1904 (e.g., the secure host tenancy 1804 of FIG. 18) that can include a virtual cloud network (VCN) 1906 (e.g., the VCN 1806 of FIG. 18) and a secure host subnet 1908 (e.g., the secure host subnet 1808 of FIG. 18). The VCN 1906 can include a local peering gateway (LPG) 1910 (e.g., the LPG 1810 of FIG. 18) that can be communicatively coupled to a secure shell (SSH) VCN 1912 (e.g., the SSH VCN 1812 of FIG. 18) via an LPG 1810 contained in the SSH VCN 1912. The SSH VCN 1912 can include an SSH subnet 1914 (e.g., the SSH subnet 1814 of FIG. 18), and the SSH VCN 1912 can be communicatively coupled to a control plane VCN 1916 (e.g., the control plane VCN 1816 of FIG. 18) via an LPG 1910 contained in the control plane VCN 1916. The control plane VCN 1916 can be contained in a service tenancy 1919 (e.g., the service tenancy 1819 of FIG. 18), and the data plane VCN 1918 (e.g., the data plane VCN 1818 of FIG. 18) can be contained in a customer tenancy 1921 that may be owned or operated by users, or customers, of the system.

The control plane VCN 1916 can include a control plane DMZ tier 1920 (e.g., the control plane DMZ tier 1820 of FIG. 18) that can include LB subnet(s) 1922 (e.g., LB subnet(s) 1822 of FIG. 18), a control plane app tier 1924 (e.g., the control plane app tier 1824 of FIG. 18) that can include app subnet(s) 1926 (e.g., app subnet(s) 1826 of FIG. 18), a control plane data tier 1928 (e.g., the control plane data tier 1828 of FIG. 18) that can include database (DB) subnet(s) 1930 (e.g., similar to DB subnet(s) 1830 of FIG. 18). The LB subnet(s) 1922 contained in the control plane DMZ tier 1920 can be communicatively coupled to the app subnet(s) 1926 contained in the control plane app tier 1924 and an Internet gateway 1934 (e.g., the Internet gateway 1834 of FIG. 18) that can be contained in the control plane VCN 1916, and the app subnet(s) 1926 can be communicatively coupled to the DB subnet(s) 1930 contained in the control plane data tier 1928 and a service gateway 1936 (e.g., the service gateway 1836 of FIG. 18) and a network address translation (NAT) gateway 1938 (e.g., the NAT gateway 1838 of FIG. 18). The control plane VCN 1916 can include the service gateway 1936 and the NAT gateway 1938.

The control plane VCN 1916 can include a data plane mirror app tier 1940 (e.g., the data plane mirror app tier 1840 of FIG. 18) that can include app subnet(s) 1926. The app subnet(s) 1926 contained in the data plane mirror app tier 1940 can include a virtual network interface controller (VNIC) 1942 (e.g., the VNIC of 1842) that can execute a compute instance 1944 (e.g., similar to the compute instance 1844 of FIG. 18). The compute instance 1944 can facilitate communication between the app subnet(s) 1926 of the data plane mirror app tier 1940 and the app subnet(s) 1926 that can be contained in a data plane app tier 1946 (e.g., the data plane app tier 1846 of FIG. 18) via the VNIC 1942 contained in the data plane mirror app tier 1940 and the VNIC 1942 contained in the data plane app tier 1946.

The Internet gateway 1934 contained in the control plane VCN 1916 can be communicatively coupled to a metadata management service 1952 (e.g., the metadata management service 1852 of FIG. 18) that can be communicatively coupled to public Internet 1954 (e.g., public Internet 1854 of FIG. 18). Public Internet 1954 can be communicatively coupled to the NAT gateway 1938 contained in the control plane VCN 1916. The service gateway 1936 contained in the control plane VCN 1916 can be communicatively coupled to cloud services 1956 (e.g., cloud services 1856 of FIG. 18).

In some examples, the data plane VCN 1918 can be contained in the customer tenancy 1921. In this case, the IaaS provider may provide the control plane VCN 1916 for each customer, and the IaaS provider may, for each customer, set up a unique compute instance 1944 that is contained in the service tenancy 1919. Each compute instance 1944 may allow communication between the control plane VCN 1916, contained in the service tenancy 1919, and the data plane VCN 1918 that is contained in the customer tenancy 1921. The compute instance 1944 may allow resources, that are provisioned in the control plane VCN 1916 that is contained in the service tenancy 1919, to be deployed or otherwise used in the data plane VCN 1918 that is contained in the customer tenancy 1921.

In other examples, the customer of the IaaS provider may have databases that live in the customer tenancy 1921. In this example, the control plane VCN 1916 can include the data plane mirror app tier 1940 that can include app subnet(s) 1926. The data plane mirror app tier 1940 can reside in the data plane VCN 1918, but the data plane mirror app tier 1940 may not live in the data plane VCN 1918. That is, the data plane mirror app tier 1940 may have access to the customer tenancy 1921, but the data plane mirror app tier 1940 may not exist in the data plane VCN 1918 or be owned or operated by the customer of the IaaS provider. The data plane mirror app tier 1940 may be configured to make calls to the data plane VCN 1918 but may not be configured to make calls to any entity contained in the control plane VCN 1916. The customer may desire to deploy or otherwise use resources in the data plane VCN 1918 that are provisioned in the control plane VCN 1916, and the data plane mirror app tier 1940 can facilitate the desired deployment, or other usage of resources, of the customer.

In some embodiments, the customer of the IaaS provider can apply filters to the data plane VCN 1918. In this embodiment, the customer can determine what the data plane VCN 1918 can access, and the customer may restrict access to public Internet 1954 from the data plane VCN 1918. The IaaS provider may not be able to apply filters or otherwise control access of the data plane VCN 1918 to any outside networks or databases. Applying filters and controls by the customer onto the data plane VCN 1918, contained in the customer tenancy 1921, can help isolate the data plane VCN 1918 from other customers and from public Internet 1954.

In some embodiments, cloud services 1956 can be called by the service gateway 1936 to access services that may not exist on public Internet 1954, on the control plane VCN 1916, or on the data plane VCN 1918. The connection between cloud services 1956 and the control plane VCN 1916 or the data plane VCN 1918 may not be live or continuous. Cloud services 1956 may exist on a different network owned or operated by the IaaS provider. Cloud services 1956 may be configured to receive calls from the service gateway 1936 and may be configured to not receive calls from public Internet 1954. Some cloud services 1956 may be isolated from other cloud services 1956, and the control plane VCN 1916 may be isolated from cloud services 1956 that may not be in the same region as the control plane VCN 1916. For example, the control plane VCN 1916 may be located in "Region 1," and cloud service "Deployment 18," may be located in Region 1 and in "Region 2." If a call to Deployment 18 is made by the service gateway 1936 contained in the control plane VCN 1916 located in Region 1, the call may be transmitted to Deployment 18 in Region 1. In this example, the control plane VCN 1916, or Deployment 18 in Region 1, may not be communicatively coupled to, or otherwise in communication with, Deployment 18 in Region 2.

Figure 20:
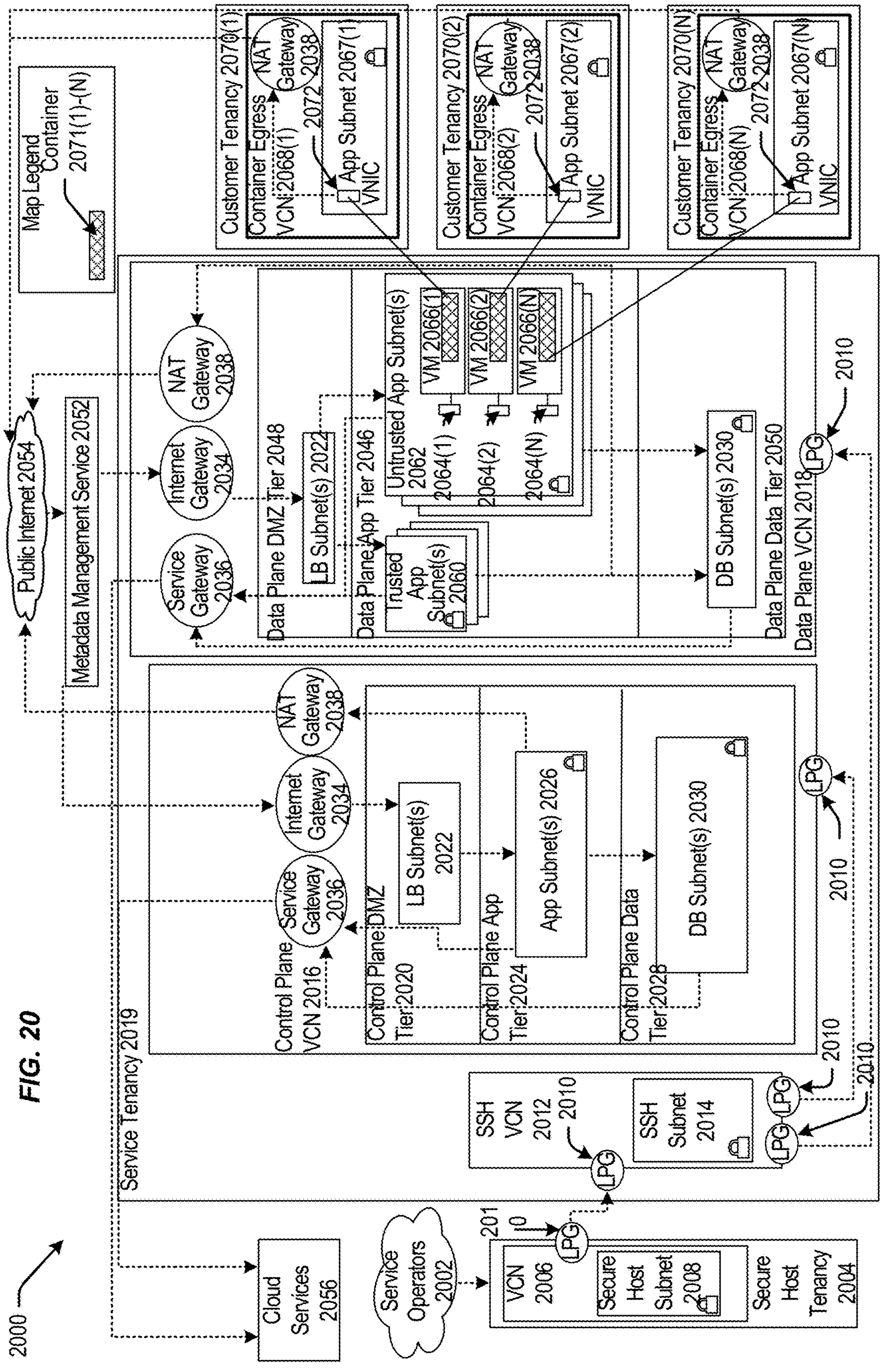
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g., service operators 1802 of FIG. 18) can be communicatively coupled to a secure host tenancy 2004 (e.g., the secure host tenancy 1804 of FIG. 18) that can include a virtual cloud network (VCN) 2006 (e.g., the VCN 1806 of FIG. 18) and a secure host subnet 2008 (e.g., the secure host subnet 1808 of FIG. 18). The VCN 2006 can include an LPG 2010 (e.g., the LPG 1810 of FIG. 18) that can be communicatively coupled to an SSH VCN 2012 (e.g., the SSH VCN 1812 of FIG. 18) via an LPG 2010 contained in the SSH VCN 2012. The SSH VCN 2012 can include an SSH subnet 2014 (e.g., the SSH subnet 1814 of FIG. 18), and the SSH VCN 2012 can be communicatively coupled to a control plane VCN 2016 (e.g., the control plane VCN 1816 of FIG. 18) via an LPG 2010 contained in the control plane VCN 2016 and to a data plane VCN 2018 (e.g., the data plane 1818 of FIG. 18) via an LPG 2010 contained in the data plane VCN 2018. The control plane VCN 2016 and the data plane VCN 2018 can be contained in a service tenancy 2019 (e.g., the service tenancy 1819 of FIG. 18).

The control plane VCN 2016 can include a control plane DMZ tier 2020 (e.g., the control plane DMZ tier 1820 of FIG. 18) that can include load balancer (LB) subnet(s) 2022 (e.g., LB subnet(s) 1822 of FIG. 18), a control plane app tier 2024 (e.g., the control plane app tier 1824 of FIG. 18) that can include app subnet(s) 2026 (e.g., similar to app subnet(s) 1826 of FIG. 18), a control plane data tier 2028 (e.g., the control plane data tier 1828 of FIG. 18) that can include DB subnet(s) 2030. The LB subnet(s) 2022 contained in the control plane DMZ tier 2020 can be communicatively coupled to the app subnet(s) 2026 contained in the control plane app tier 2024 and to an Internet gateway 2034 (e.g., the Internet gateway 1834 of FIG. 18) that can be contained in the control plane VCN 2016, and the app subnet(s) 2026 can be communicatively coupled to the DB subnet(s) 2030 contained in the control plane data tier 2028 and to a service gateway 2036 (e.g., the service gateway of FIG. 18) and a network address translation (NAT) gateway 2038 (e.g., the NAT gateway 1838 of FIG. 18). The control plane VCN 2016 can include the service gateway 2036 and the NAT gateway 2038.

The data plane VCN 2018 can include a data plane app tier 2046 (e.g., the data plane app tier 1846 of FIG. 18), a data plane DMZ tier 2048 (e.g., the data plane DMZ tier 1848 of FIG. 18), and a data plane data tier 2050 (e.g., the data plane data tier 1850 of FIG. 18). The data plane DMZ tier 2048 can include LB subnet(s) 2022 that can be communicatively coupled to trusted app subnet(s) 2060 and untrusted app subnet(s) 2062 of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include one or more primary VNICs 2064(1)-(N) that can be communicatively coupled to tenant virtual machines (VMs) 2066(1)-(N). Each tenant VM 2066(1)-(N) can be communicatively coupled to a respective app subnet 2067(1)-(N) that can be contained in respective container egress VCNs 2068(1)-(N) that can be contained in respective customer tenancies 2070(1)-(N). Respective secondary VNICs 2072(1)-(N) can facilitate communication between the untrusted app subnet(s) 2062 contained in the data plane VCN 2018 and the app subnet contained in the container egress VCNs 2068(1)-(N). Each container egress VCNs 2068(1)-(N) can include a NAT gateway 2038 that can be communicatively coupled to public Internet 2054 (e.g., public Internet 1854 of FIG. 18).

The Internet gateway 2034 contained in the control plane VCN 2016 and contained in the data plane VCN 2018 can be communicatively coupled to a metadata management service 2052 (e.g., the metadata management system 1852 of FIG. 18) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively coupled to cloud services 2056.

In some embodiments, the data plane VCN 2018 can be integrated with customer tenancies 2070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2046. Code to run the function may be executed in the VMs 2066(1)-(N), and the code may not be configured to run anywhere else on the data plane VCN 2018. Each VM 2066(1)-(N) may be connected to one customer tenancy 2070. Respective containers 2071(1)-(N) contained in the VMs 2066(1)-(N) may be configured to run the code. In this case, there can be a dual isolation (e.g., the containers 2071(1)-(N) running code, where the containers 2071(1)-(N) may be contained in at least the VM 2066(1)-(N) that are contained in the untrusted app subnet(s) 2062), which may help prevent incorrect or otherwise undesirable code from damaging the network of the IaaS provider or from damaging a network of a different customer. The containers 2071(1)-(N) may be communicatively coupled to the customer tenancy 2070 and may be configured to transmit or receive data from the customer tenancy 2070. The containers 2071

(1)-(N) may not be configured to transmit or receive data from any other entity in the data plane VCN 2018. Upon completion of running the code, the IaaS provider may kill or otherwise dispose of the containers 2071(1)-(N).

In some embodiments, the trusted app subnet(s) 2060 may run code that may be owned or operated by the IaaS provider. In this embodiment, the trusted app subnet(s) 2060 may be communicatively coupled to the DB subnet(s) 2030 and be configured to execute CRUD operations in the DB subnet(s) 2030. The untrusted app subnet(s) 2062 may be communicatively coupled to the DB subnet(s) 2030, but in this embodiment, the untrusted app subnet(s) may be configured to execute read operations in the DB subnet(s) 2030. The containers 2071(1)-(N) that can be contained in the VM 2066(1)-(N) of each customer and that may run code from the customer may not be communicatively coupled with the DB subnet(s) 2030.

In other embodiments, the control plane VCN 2016 and the data plane VCN 2018 may not be directly communicatively coupled. In this embodiment, there may be no direct communication between the control plane VCN 2016 and the data plane VCN 2018. However, communication can occur indirectly through at least one method. An LPG 2010 may be established by the IaaS provider that can facilitate communication between the control plane VCN 2016 and the data plane VCN 2018. In another example, the control plane VCN 2016 or the data plane VCN 2018 can make a call to cloud services 2056 via the service gateway 2036. For example, a call to cloud services 2056 from the control plane VCN 2016 can include a request for a service that can communicate with the data plane VCN 2018.

Figure 21:
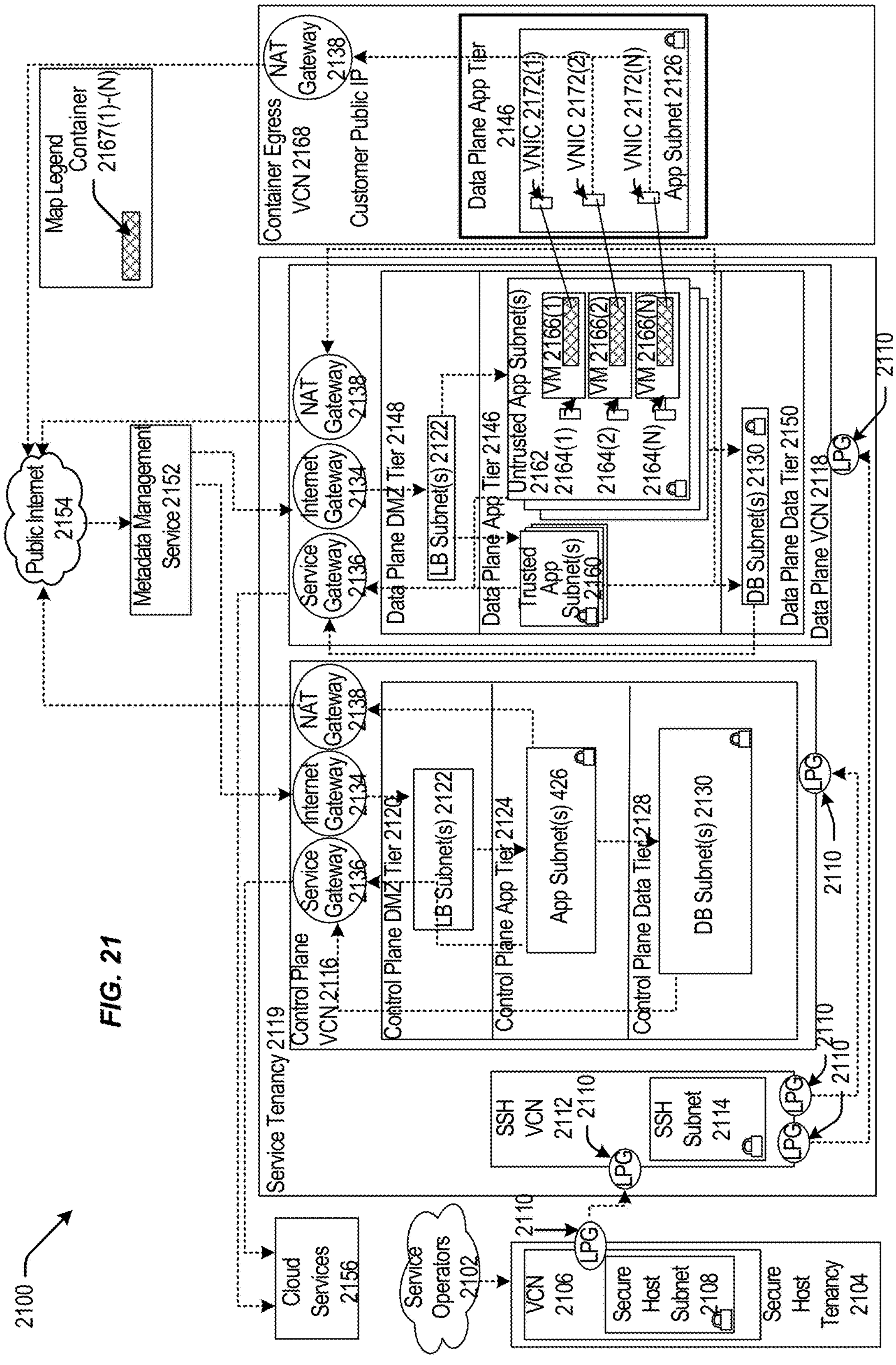
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g., service operators 1802 of FIG. 18) can be communicatively coupled to a secure host tenancy 2104 (e.g., the secure host tenancy 1804 of FIG. 18) that can include a virtual cloud network (VCN) 2106 (e.g., the VCN 1806 of FIG. 18) and a secure host subnet 2108 (e.g., the secure host subnet 1808 of FIG. 18). The VCN 2106 can include an LPG 2110 (e.g., the LPG 1810 of FIG. 18) that can be communicatively coupled to an SSH VCN 2112 (e.g., the SSH VCN 1812 of FIG. 18) via an LPG 2110 contained in the SSH VCN 2112. The SSH VCN 2112 can include an SSH subnet 2114 (e.g., the SSH subnet 1814 of FIG. 18), and the SSH VCN 2112 can be communicatively coupled to a control plane VCN 2116 (e.g., the control plane VCN 1816 of FIG. 18) via an LPG 2110 contained in the control plane VCN 2116 and to a data plane VCN 2118 (e.g., the data plane 1818 of FIG. 18) via an LPG 2110 contained in the data plane VCN 2118. The control plane VCN 2116 and the data plane VCN 2118 can be contained in a service tenancy 2119 (e.g., the service tenancy 1819 of FIG. 18).

The control plane VCN 2116 can include a control plane DMZ tier 2120 (e.g., the control plane DMZ tier 1820 of FIG. 18) that can include LB subnet(s) 2122 (e.g., LB subnet(s) 1822 of FIG. 18), a control plane app tier 2124 (e.g., the control plane app tier 1824 of FIG. 18) that can include app subnet(s) 2126 (e.g., app subnet(s) 1826 of FIG. 18), a control plane data tier 2128 (e.g., the control plane data tier 1828 of FIG. 18) that can include DB subnet(s) 2130 (e.g., DB subnet(s) 2030 of FIG. 20). The LB subnet(s) 2122 contained in the control plane DMZ tier 2120 can be communicatively coupled to the app subnet(s) 2126 contained in the control plane app tier 2124 and to an Internet gateway 2134 (e.g., the Internet gateway 1834 of FIG. 18) that can be contained in the control plane VCN 2116, and the app subnet(s) 2126 can be communicatively coupled to the DB subnet(s) 2130 contained in the control plane data tier 2128 and to a service gateway 2136 (e.g., the service gateway of FIG. 18) and a network address translation (NAT) gateway 2138 (e.g., the NAT gateway 1838 of FIG. 18). The control plane VCN 2116 can include the service gateway 2136 and the NAT gateway 2138.

The data plane VCN 2118 can include a data plane app tier 2146 (e.g., the data plane app tier 1846 of FIG. 18), a data plane DMZ tier 2148 (e.g., the data plane DMZ tier 1848 of FIG. 18), and a data plane data tier 2150 (e.g., the data plane data tier 1850 of FIG. 18). The data plane DMZ tier 2148 can include LB subnet(s) 2122 that can be communicatively coupled to trusted app subnet(s) 2160 (e.g., trusted app subnet(s) 2060 of FIG. 20) and untrusted app subnet(s) 2162 (e.g., untrusted app subnet(s) 2062 of FIG. 20) of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include primary VNICs 2164(1)-(N) that can be communicatively coupled to tenant virtual machines (VMs) 2166(1)-(N) residing within the untrusted app subnet(s) 2162. Each tenant VM 2166(1)-(N) can run code in a respective container 2167(1)-(N) and be communicatively coupled to an app subnet 2126 that can be contained in a data plane app tier 2146 that can be contained in a container egress VCN 2168. Respective secondary VNICs 2172(1)-(N) can facilitate communication between the untrusted app subnet(s) 2162 contained in the data plane VCN 2118 and the app subnet contained in the container egress VCN 2168. The container egress VCN can include a NAT gateway 2138 that can be communicatively coupled to public Internet 2154 (e.g., public Internet 1854 of FIG. 18).

The Internet gateway 2134 contained in the control plane VCN 2116 and contained in the data plane VCN 2118 can be communicatively coupled to a metadata management service 2152 (e.g., the metadata management system 1852 of FIG. 18) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively coupled to cloud services 2156.

In some examples, the pattern illustrated by the architecture of block diagram 2100 of FIG. 21 may be considered an exception to the pattern illustrated by the architecture of block diagram 2000 of FIG. 20 and may be desirable for a customer of the IaaS provider if the IaaS provider cannot directly communicate with the customer (e.g., a disconnected region). The respective containers 2167(1)-(N) that are contained in the VMs 2166(1)-(N) for each customer can be accessed in real-time by the customer. The containers 2167(1)-(N) may be configured to make calls to respective secondary VNICs 2172(1)-(N) contained in app subnet(s) 2126 of the data plane app tier 2146 that can be contained in the container egress VCN 2168. The secondary VNICs 2172(1)-(N) can transmit the calls to the NAT gateway 2138 that may transmit the calls to public Internet 2154. In this example, the containers 2167(1)-(N) that can be accessed in real-time by the customer can be isolated from the control plane VCN 2116 and can be isolated from other entities contained in the data plane VCN 2118. The containers 2167(1)-(N) may also be isolated from resources from other customers.

In other examples, the customer can use the containers 2167(1)-(N) to call cloud services 2156. In this example, the customer may run code in the containers 2167(1)-(N) that requests a service from cloud services 2156. The containers 2167(1)-(N) can transmit this request to the secondary VNICs 2172(1)-(N) that can transmit the request to the NAT gateway that can transmit the request to public Internet 2154. Public Internet 2154 can transmit the request to LB subnet(s) 2122 contained in the control plane VCN 2116 via the Internet gateway 2134. In response to determining the request is valid, the LB subnet(s) can transmit the request to app subnet(s) 2126 that can transmit the request to cloud services 2156 via the service gateway 2136.

It should be appreciated that IaaS architectures 1800, 1900, 2000, 2100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 22:
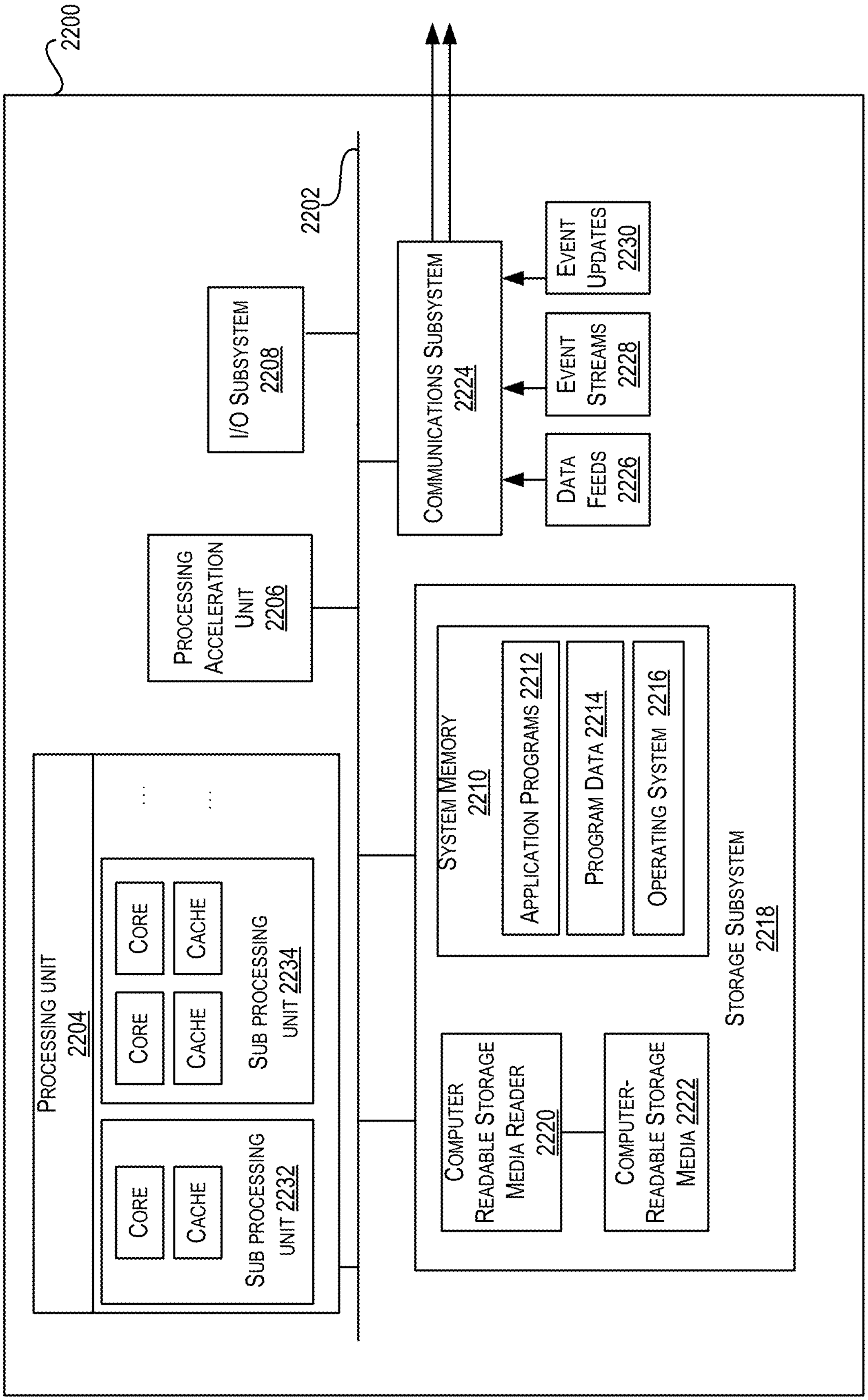
FIG. 22 is a block diagram illustrating an example computer system, according to at least one embodiment.

FIG. 22 illustrates an example computer system 2200, in which various embodiments may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2204 provide the functionality described above. Storage subsystem 2218 may also provide a repository for storing data used in accordance with the present disclosure.

As depicted in the example in FIG. 22, storage subsystem 2218 can include various components including a system memory 2210, computer-readable storage media 2222, and a computer readable storage media reader 2220. System memory 2210 may store program instructions that are loadable and executable by processing unit 2204. System memory 2210 may also store data that is used during the execution of the instructions and/or data that is generated during the execution of the program instructions. Various different kinds of programs may be loaded into system memory 2210 including but not limited to client applications, Web browsers, mid-tier applications, relational database management systems (RDBMS), virtual machines, containers, etc.

System memory 2210 may also store an operating system 2216. Examples of operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2200 executes one or more virtual machines, the virtual machines along with their guest operating systems (GOSs) may be loaded into system memory 2210 and executed by one or more processors or cores of processing unit 2204.

System memory 2210 can come in different configurations depending upon the type of computer system 2200. For example, system memory 2210 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 2210 may include a basic input/output system (BIOS) containing basic routines that help to transfer information between elements within computer system 2200, such as during start-up.

Computer-readable storage media 2222 may represent remote, local, fixed, and/or removable storage devices plus storage media for temporarily and/or more permanently containing, storing, computer-readable information for use by computer system 2200 including instructions executable by processing unit 2204 of computer system 2200.

Computer-readable storage media 2222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 2200.

Machine-readable instructions executable by one or more processors or cores of processing unit 2204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:

obtaining, by a cloud infrastructure orchestration system, a service plan defining a first order for executing a first set of releases as part of a first deterministic process for bootstrapping a service within a region of a cloud-computing environment, the service comprising an infrastructure resource and an application resource that provide cloud infrastructure functionality associated with a cloud service provider, a first release of the first set of releases corresponding to provisioning the infrastructure resource of the service, a second release of the first set of releases corresponding to deploying the application resource of the service, the service plan explicitly defining a set of external dependencies on a second infrastructure resource or a second application resource of another service of a plurality of services to be bootstrapped to the region;

obtaining, by the cloud infrastructure orchestration system, a manifest identifying a first configuration file that defines operations associated with executing the first release of the first set of releases and a second configuration file that defines operations associated with executing the second release of the first set of releases;

validating, by the cloud infrastructure orchestration system, the service plan, the service plan being validated based at least in part on the manifest;

based on validating the service plan, generating, by the cloud infrastructure orchestration system, a directed acyclic graph based at least in part on a plurality of service plans corresponding to the plurality of services comprising the service, the plurality of service plans comprising the service plan, the directed acyclic graph defining a second order for executing a second set of releases comprising the first set of releases, the second set of releases being associated with a second deterministic process for bootstrapping the plurality of services within the region of the cloud-computing environment, the second order for executing the second set of releases associated with bootstrapping the plurality of services within the region being determined based at least in part on the set of external dependencies of the service plan; and executing, by the cloud infrastructure orchestration system, one or more releases of the second set of releases associated with the second deterministic process for bootstrapping the plurality of services within the cloud-computing environment, the one or more releases being executed according to the second order based at least in part on traversing the directed acyclic graph.

2. The computer-implemented method of claim 1, wherein validating the service plan is further based at least in part on 1) determining that the service plan lacks any circular dependencies, 2) determining that each configuration file and artifact that is identified in the manifest is referenced in the service plan, and 3) determining that each configuration file and artifact that is identified in the service plan is referenced in the manifest, and wherein the service plan is validated prior to generating the directed acyclic graph.

3. The computer-implemented method of claim 1, wherein validating the service plan based at least in part on the manifest further comprises:

obtaining, by the cloud infrastructure orchestration system, static flock analysis data corresponding to the first configuration file identified by the manifest, the static flock analysis data indicating a first set of dependencies;

determining, by the cloud infrastructure orchestration system, a second set of dependencies based at least in part on the service plan; and determining, by the cloud infrastructure orchestration system, that the first set of dependencies agree with the second set of dependencies.

4. The computer-implemented method of claim 1, wherein the service plan identifies 1) a plurality of build milestones indicating respective states of the service during the first deterministic process for bootstrapping the service, and 2) an execution unit definition indicating a respective set of releases to be executed to transition from one build milestone to another, and wherein the method further comprises determining, by the cloud infrastructure orchestration system, that the service plan is consistent based at least in part on determining that a build milestone definition of the service plan agrees with the execution unit definition of the service plan.

5. The computer-implemented method of claim 1, further comprising:

determining, by the cloud infrastructure orchestration system, that the plurality of service plans are compatible based at least in part on 1) generating a directed graph based at least in part on the plurality of service plans 2) determining that the directed graph lacks cycles;

based at least in part on determining that the plurality of service plans are compatible, adding, by the cloud infrastructure orchestration system, the service plan to a set of service plans comprising the plurality of service plans and the service plan; and deriving, by the cloud infrastructure orchestration system, a version set identifying a plurality of configuration files to be during the second deterministic process for bootstrapping the plurality of services within the cloud-computing environment, the version set being derived based at least in part on the set of service plans, wherein the plurality of service plans used to generate the directed acyclic graph are identified by the version set.

6. The computer-implemented method of claim 1, wherein the directed acyclic graph is generated based at least in part on the service plan and a third configuration file that is associated with building a subset of resources of a second service and for which no corresponding service plan exists.

7. The computer-implemented method of claim 1, wherein the service plan further defines one or more capability publications to be executed upon completion of the first release, and wherein the computer-implemented method further comprises determining, by the cloud infrastructure orchestration system, that the plurality of service plans are compatible based at least in part on determining that no duplicate capability publications exist between the plurality of service plans.

8. The computer-implemented method of claim 1, wherein the service plan further comprises 1) a set of build milestones that individually identify a state of the service during the first deterministic process for bootstrapping the service within the region, and 2) a set of execution units that individually identify a process for transitioning from one respective build milestone to another through executing a subset of the first set of releases.

9. The computer-implemented method of claim 8, wherein the service plan identifies a capability or a skill to be published upon transitioning to a particular build milestone of the set of build milestones.

10. A cloud infrastructure orchestration system, comprising:

one or more processors; and one or more memories storing computer-executable instructions that, when executed by the one or more processors, cause the one or more processors to:

obtain a service plan defining a first order for executing a first set of releases as part of a first deterministic process for bootstrapping a service within a region of a cloud-computing environment, the service comprising an infrastructure resource and an application resource that provide cloud infrastructure functionality associated with a cloud service provider, a first release of the first set of releases corresponding to provisioning the infrastructure resource of the service, a second release of the first set of releases corresponding to deploying the application resource of the service, the service plan explicitly defining a set of external dependencies on a second infrastructure resource or a second application resource of another service of a plurality of services to be bootstrapped to the region;

obtain a manifest identifying a first configuration file that defines operations associated with executing the first release of the first set of releases and a second configuration file that defines operations associated with executing the second release of the first set of releases;

validate the service plan based at least in part on the manifest;

based on validating the service plan, generate a directed acyclic graph based at least in part on a plurality of service plans corresponding to the plurality of services comprising the service, the plurality of service plans comprising the service plan, the directed acyclic graph defining a second order for executing a second set of releases comprising the first set of releases, the second set of releases being associated with a second deterministic process for bootstrapping the plurality of services within the region of the cloud-computing environment, the second order for executing the second set of releases associated with bootstrapping the plurality of services within the region being determined based at least in part on the set of external dependencies of the service plan; and execute one or more releases of the second set of releases associated with the second deterministic process for bootstrapping the plurality of services within the cloud-computing environment, the one or more releases being executed according to the second order based at least in part on traversing the directed acyclic graph.

11. The cloud infrastructure orchestration system of claim 10, wherein the service plan identifies 1) a plurality of build milestones indicating respective states of the service during the first deterministic process for bootstrapping the service, and 2) an execution unit definition indicating a respective set of releases to be executed to transition from one build milestone to another, and wherein executing the computer-executable instructions further causes the one or more processors to determine that the service plan is consistent based at least in part on determining that a build milestone definition of the service plan agrees with the execution unit definition of the service plan.

12. The cloud infrastructure orchestration system of claim 10, wherein executing the computer-executable instructions further causes the one or more processors to:

determine that the plurality of service plans are compatible based at least in part on 1) generating a directed graph based at least in part on the plurality of service plans and 2) determining that the directed graph lacks cycles;

based at least in part on determining that the plurality of service plans are compatible, add the service plan to a set of service plans comprising the plurality of service plans and the service plan; and derive a version set identifying a plurality of configuration files to be during the second deterministic process for bootstrapping the plurality of services within the cloud-computing environment, the version set being derived based at least in part on the set of service plans, wherein the plurality of service plans used to generate the directed acyclic graph are identified by the version set.

13. The cloud infrastructure orchestration system of claim 10, wherein validating the service plan based at least in part on the manifest further comprises:

obtaining, by the cloud infrastructure orchestration system, static flock analysis data corresponding to the first configuration file identified by the manifest, the static flock analysis data indicating a first set of dependencies;

determining, by the cloud infrastructure orchestration system, a second set of dependencies based at least in part on the service plan; and determining, by the cloud infrastructure orchestration system, that the first set of dependencies agree with the second set of dependencies.

14. The cloud infrastructure orchestration system of claim 10, wherein the service plan further defines one or more capability publications to be executed upon completion of the first release, and wherein executing the computer-executable instructions further causes the one or more processors to determine that the plurality of service plans are compatible based at least in part on determining that no duplicate capability publications exist between the plurality of service plans.

15. A non-transitory computer-readable medium storing computer-executable instructions that, when executed by one or more processors of a cloud infrastructure orchestration system, cause the one or more processors of the cloud infrastructure orchestration system to:

obtain a service plan defining a first order for executing a first set of releases as part of a first deterministic process for bootstrapping a service within a region of a cloud-computing environment, the service comprising an infrastructure resource and an application resource that provide cloud infrastructure functionality associated with a cloud service provider, a first release of the first set of releases corresponding to provisioning the infrastructure resource of the service, a second release of the first set of releases corresponding to deploying the application resource of the service, the service plan explicitly defining a set of external dependencies on a second infrastructure resource or a second application resource of another service of a plurality of services to be bootstrapped to the region;

obtain a manifest identifying a first configuration file that defines operations associated with executing the first release of the first set of releases and a second configuration file that defines operations associated with executing the second release of the first set of releases;

validate the service plan based at least in part on the manifest;

based on validating the service plan, generate a directed acyclic graph based at least in part on a plurality of service plans corresponding to the plurality of services comprising the service, the plurality of service plans comprising the service plan, the directed acyclic graph defining a second order for executing a second set of releases comprising the first set of releases, the second set of releases being associated with a second deterministic process for bootstrapping the plurality of services within the region of the cloud-computing environment, the second order for executing the second set of releases associated with bootstrapping the plurality of services within the region being determined based at least in part on the set of external dependencies of the service plan; and execute one or more releases of the second set of releases associated with the second deterministic process for bootstrapping the plurality of services within the cloud-computing environment, the one or more releases being executed according to the second order based at least in part on traversing the directed acyclic graph.

16. The non-transitory computer-readable medium of claim 15, wherein the service plan further defines one or more capability publications to be executed upon completion of the first release, and wherein executing the computer-executable instructions further causes the one or more processors to determine that the plurality of service plans are compatible based at least in part on determining that no duplicate capability publications exist between the plurality of service plans.

17. The non-transitory computer-readable medium of claim 15, wherein validating the service plan based at least in part on the manifest further comprises:

obtaining, by the cloud infrastructure orchestration system, static flock analysis data corresponding to the first configuration file identified by the manifest, the static flock analysis data indicating a first set of dependencies;

determining, by the cloud infrastructure orchestration system, a second set of dependencies based at least in part on the service plan; and determining, by the cloud infrastructure orchestration system, that the first set of dependencies agree with the second set of dependencies.

18. The non-transitory computer-readable medium of claim 15, wherein the service plan identifies 1) a plurality of build milestones indicating respective states of the service during the first deterministic process for bootstrapping the service, and 2) an execution unit definition indicating a respective set of releases to be executed to transition from one build milestone to another, and wherein executing the computer-executable instructions further causes the one or more processors to determine that the service plan is consistent based at least in part on determining that a build milestone definition of the service plan agrees with the execution unit definition of the service plan.

19. The non-transitory computer-readable medium of claim 15, wherein executing the computer-executable instructions further causes the one or more processors to:

determine that the plurality of service plans are compatible based at least in part on 1) generating a directed graph based at least in part on the plurality of service plans and 2) determining that the directed graph lacks cycles;

based at least in part on determining that the plurality of service plans are compatible, add the service plan to a set of service plans comprising the plurality of service plans and the service plan; and derive a version set identifying a plurality of configuration files to be during the second deterministic process for bootstrapping the plurality of services within the cloud-computing environment, the version set being derived based at least in part on the set of service plans, wherein the version set comprises a plurality of version set items, a first version set item of the plurality of version set items being associated with a corresponding service plan, and a second version set item of the plurality of version set items lacking any service plan associations.

* * * * *